United States Patent

Holmes, Jr.

[15] 3,646,573

[45] Feb. 29, 1972

[54] CIRCUITS FOR INTERCONVERTING GROUPS OF PARALLEL FORM AND SERIAL FORM SIGNAL BITS

[72] Inventor: Lawrence Holmes, Jr., 108 Jones Blvd., Las Vegas, Nev. 89107

[22] Filed: Apr. 14, 1969

[21] Appl. No.: 853,988

Related U.S. Application Data

[62] Division of Ser. No. 475,728, July 29, 1965, Pat. No. 3,453,379.

[52] U.S. Cl. ....................178/4.1 R, 178/26 A

[51] Int. Cl. ....................H04l 17/00

[58] Field of Search ..............178/26 A, 4.1 R; 328/104, 105; 340/347 DD

[56] References Cited

UNITED STATES PATENTS

| | | | |
|---|---|---|---|
| 3,376,384 | 4/1968 | Achramowicz | 178/17.5 X |
| 3,310,626 | 3/1967 | Cassidy, Jr. | 340/347 X |
| 3,019,293 | 1/1962 | Schwenzfeger | 178/26 A |

FOREIGN PATENTS OR APPLICATIONS

| | | | |
|---|---|---|---|
| 1,018,604 | 1/1966 | Great Britain | 178/26 A |

*Primary Examiner*—Kathleen H. Claffy
*Assistant Examiner*—Thomas W. Brown
*Attorney*—Fryer, Tjensvold, Feix, Phillips & Lempio

[57] ABSTRACT

A system for linking a first typewriter with a remote typewriter or other data processing device, whereby the first typewriter transmits groups of binary signal bits indicative of typewriter operations and may operate in response to received groups of signal bits, includes a converter circuit for translating groups of synchronous signal bits into corresponding serial form sequences of bits for transmission and also includes a converter circuit for translating received serial form bits into parallel form. In parallel to serial conversion the component bits of a group are sequentially transmitted out of each of a plurality of bit storage devices without being shifted through any of the storage devices other than the single one which stored each bit. In serial to parallel conversion each successive incoming bit is transmitted directly into an individual bit storage device without being shifted through any of the others. In part, this is made possible by bit storage devices which assume one state when storing a mark bit and an alternate state when storing a space bit and can also assume a third state to control a gate, when a bit has been transmitted into or out of the particular storage device.

13 Claims, 41 Drawing Figures

INVENTOR.
Lawrence Holmes Jr.
BY
Fryer, Tjensvold,
Feix, Phillips & Lempio
Attorneys INVENTOR.
Lawrence Holmes Jr INVENTOR.
Lawrence Holmes Jr.

PATENTED FEB 29 1972 3,646,573

SHEET 04 OF 22

INVENTOR.

Lawrence Holmes Jr.

INVENTOR.
Lawrence Holmes Jr.

INVENTOR.
Lawrence Holmes Jr.

INVENTOR.
Lawrence Holmes Jr.

INVENTOR.
Lawrence Holmes Jr.

INVENTOR.
Lawrence Holmes Jr

INVENTOR.
Lowrence Holmes Jr.

INVENTOR
Lawrence Holmes Jr.

| Bi Wt | 1 | 2 | 4 | 8 | 16 | 32 | L/C | U/C |
|---|---|---|---|---|---|---|---|---|
| 0 | | | | | | | - | _ |
| 1 | 1 | | | | | | b | B |
| 2 | | 2 | | | | | w | W |
| 3 | 1 | 2 | | | | | 9 | ( |
| 4 | | | 4 | | | | q | Q |
| 5 | 1 | | 4 | | | | k | K |
| 6 | | 2 | 4 | | | | i | I |
| 7 | 1 | 2 | 4 | | | | 6 | ¢ |
| 8 | | | | 8 | | | y | Y |
| 9 | 1 | | | 8 | | | h | H |
| 10 | | 2 | | 8 | | | s | S |
| 11 | 1 | 2 | | 8 | | | 0 | ) |
| 12 | | | 4 | 8 | | | p | P |
| 13 | 1 | | 4 | 8 | | | e | E |
| 14 | | 2 | 4 | 8 | | | ' | " |
| 15 | 1 | 2 | 4 | 8 | | | 5 | % |
| 16 | | | | | | | | |
| 17 | | | | | | | | |
| 18 | | | | | | | | |
| 19 | | | | | | | | |
| 20 | | | 4 | | 16 | | = | + |
| 21 | 1 | | 4 | | 16 | | n | N |
| 22 | | 2 | 4 | | 16 | | . | . |
| 23 | 1 | 2 | 4 | | 16 | | 2 | @ |
| 24 | | | | | | | | |
| 25 | | | | | | | | |
| 26 | | | | | | | | |
| 27 | | | | | | | | |
| 28 | | | 4 | 8 | 16 | | j | J |
| 29 | 1 | | 4 | 8 | 16 | | t | T |
| 30 | | 2 | 4 | 8 | 16 | | ! | ° |
| 31 | 1 | 2 | 4 | 8 | 16 | | z | Z |
| 32 | | | | | | | | |
| 33 | | | | | | | | |
| 34 | | | | | | | | |
| 35 | | | | | | | | |
| 36 | | | 4 | | | 32 | , | , |
| 37 | 1 | | 4 | | | 32 | c | C |
| 38 | | 2 | 4 | | | 32 | a | A |
| 39 | 1 | 2 | 4 | | | 32 | 8 | * |
| 40 | | | | 8 | | 32 | / | ? |
| 41 | 1 | | | 8 | | 32 | 1 | L |
| 42 | | 2 | | 8 | | 32 | o | O |
| 43 | 1 | 2 | | 8 | | 32 | 4 | $ |
| 44 | | | 4 | 8 | | 32 | ; | : |
| 45 | 1 | | 4 | 8 | | 32 | d | D |
| 46 | | 2 | 4 | 8 | | 32 | r | R |
| 47 | 1 | 2 | 4 | 8 | | 32 | 7 | & |
| 48 | | | | | | | | |
| 49 | | | | | | | | |
| 50 | | | | | | | | |
| 51 | | | | | | | | |
| 52 | | | 4 | | 16 | 32 | f | F |
| 53 | 1 | | 4 | | 16 | 32 | u | U |
| 54 | | 2 | 4 | | 16 | 32 | v | V |
| 55 | 1 | 2 | 4 | | 16 | 32 | 3 | # |
| 56 | | | | | | | | |
| 57 | | | | | | | | |
| 58 | | | | | | | | |
| 59 | | | | | | | | |
| 60 | | | 4 | 8 | 16 | 32 | g | G |
| 61 | 1 | | 4 | 8 | 16 | 32 | x | X |
| 62 | | 2 | 4 | 8 | 16 | 32 | m | M |
| 63 | 1 | 2 | 4 | 8 | 16 | 32 | ] | [ |

Fig. 20

INVENTOR.
Lawrence Holmes Jr.
BY
Attorneys

INVENTOR.
Lawrence Holmes Jr.

INVENTOR.

Lawrence Holmes Jr.

INVENTOR.

Lawrence Holmes Jr

INVENTOR
Lawrence Holmes Jr

INVENTOR.
Lawrence Holmes Jr.

| BI WI | 1 | 2 | 4 | 8 | 16 | 32 | L/C | U/C |
|---|---|---|---|---|---|---|---|---|
| 0 | | | | | | | | |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| 11 | | | | | | | | |
| 12 | | | | | | | | |
| 13 | | | | | | | | |
| 14 | | | | | | | | |
| 15 | | | | | | | | |
| 16 | | | | | 16 | | D/S | |
| 17 | 1 | | | | 16 | | Sp | |
| 18 | | 2 | | | 16 | | B/S | |
| 19 | 1 | 2 | | | 16 | | TAB | |
| 20 | | | | | | | | |
| 21 | | | | | | | | |
| 22 | | | | | | | | |
| 23 | | | | | | | | |
| 24 | | | | 8 | 16 | | C/R | |
| 25 | 1 | | | 8 | 16 | | Bl.Rib. | |
| 26 | | 2 | | 8 | 16 | | OFF | |
| 27 | 1 | 2 | | 8 | 16 | | OPEN | |
| 28 | | | | | | | | |
| 29 | | | | | | | | |
| 30 | | | | | | | | |
| 31 | | | | | | | | |
| 32 | | | | | | | | |
| 33 | | | | | | | | |
| 34 | | | | | | | | |
| 35 | | | | | | | | |
| 36 | | | | | | | | |
| 37 | | | | | | | | |
| 38 | | | | | | | | |
| 39 | | | | | | | | |
| 40 | | | | | | | | |
| 41 | | | | | | | | |
| 42 | | | | | | | | |
| 43 | | | | | | | | |
| 44 | | | | | | | | |
| 45 | | | | | | | | |
| 46 | | | | | | | | |
| 47 | | | | | | | | |
| 48 | | | | | 16 | 32 | | U/S |
| 49 | 1 | | | | 16 | 32 | | Sp |
| 50 | | 2 | | | 16 | 32 | | B/S |
| 51 | 1 | 2 | | | 16 | 32 | | TAB |
| 52 | | | | | | | | |
| 53 | | | | | | | | |
| 54 | | | | | | | | |
| 55 | | | | | | | | |
| 56 | | | | 8 | 16 | 32 | | C/R |
| 57 | 1 | | | 8 | 16 | 32 | | Red.Rib. |
| 58 | | 2 | | 8 | 16 | 32 | | BELL |
| 59 | 1 | 2 | | 8 | 16 | 32 | | OPEN |
| 60 | | | | | | | | |
| 61 | | | | | | | | |
| 62 | | | | | | | | |
| 63 | | | | | | | | |

Fig. 35

INVENTOR.
Lawrence Holmes Jr.

INVENTOR.
Lawrence Holmes Jr

CIRCUITS FOR INTERCONVERTING GROUPS OF PARALLEL FORM AND SERIAL FORM SIGNAL BITS

This is a divisional application of copending U.S. application Ser. No. 475,728 of Lawrence Holmes, Jr. filed July 29, 1965, now U.S. Pat. No. 3,453,379.

The present invention relates to communication systems and more particularly to translator circuits for interconverting parallel form and serial form signals therein.

The present invention teaches a system for transmitting and receiving written messages wherein the system is a basic departure from the various teletype systems presently known in the art. By departing from known teletype designs the present invention is able to offer a system which eliminates many of the disadvantages inherent in prior art systems and for the first time makes available a written communication system which is suitable for the small businessman as well as the giant corporation. The present invention teaches a system of typewriter communication which does not include running mechanism, such as rotary scanners, and does not require start and stop pulses for each character.

This object is achieved in the present invention by placing several attachments onto a commercially available typewriter of a certain design (the attachments are all small enough to fit within the standard typewriter housing) whereby the typewriter generates an electrical signal each time it is operated, wherein the electrical signal uniquely identifies the operation which the typewriter is performing. The electrical signal which the typewriter generates is in the form of a six-bit binary character wherein all six bits are generated simultaneously. This signal is then directed to a compact, transmitreceive translator which transforms each character into serial form for transmission over a pair of wires. The transmission lines lead the signals to a second translator which is associated with a receive typewriter. This translator recreates a parallel-form signal from each serial-form signal and directs these signals to the receive typewriter. The typewriter attachments mentioned above enable the typewriter to respond to electrical signals in parallel form by performing the operation which the signal uniquely identifies. By equipping every typewriter to be used with the present invention with both transmit and receive components, and by providing translators capable of transforming parallel signals to corresponding serial signals, and serial signals to corresponding parallel signals, it is possible to transmit from any typewriter and receive with any other typewriter. This enables the typewriters to virtually converse with one another.

Another object of the present invention is to provide a translator for converting coded information in parallel form into corresponding information in serial form and vice versa.

Yet another object of the present invention is to provide a system for converting information in parallel from to information in serial form, and information in serial form to information in parallel form without using running mechanisms such as rotary scanners and stepping switches and thereby eliminate components which operate noisily, cause errors and require frequent maintenance.

In providing a communication system which is sufficiently reliable to provide accurate operation over prolonged periods of time without requiring constant maintenance and repair, the present invention teaches several new and novel electrical circuits for processing data. Many of these circuits will be recognized as having utility outside of the communications field and with devices other than typewriters.

Further and more specific objects and advantages of the present invention will be made apparent in the following specification wherein a preferred form of the invention is described by reference to the accompanying drawings.

Figures 7, 19:
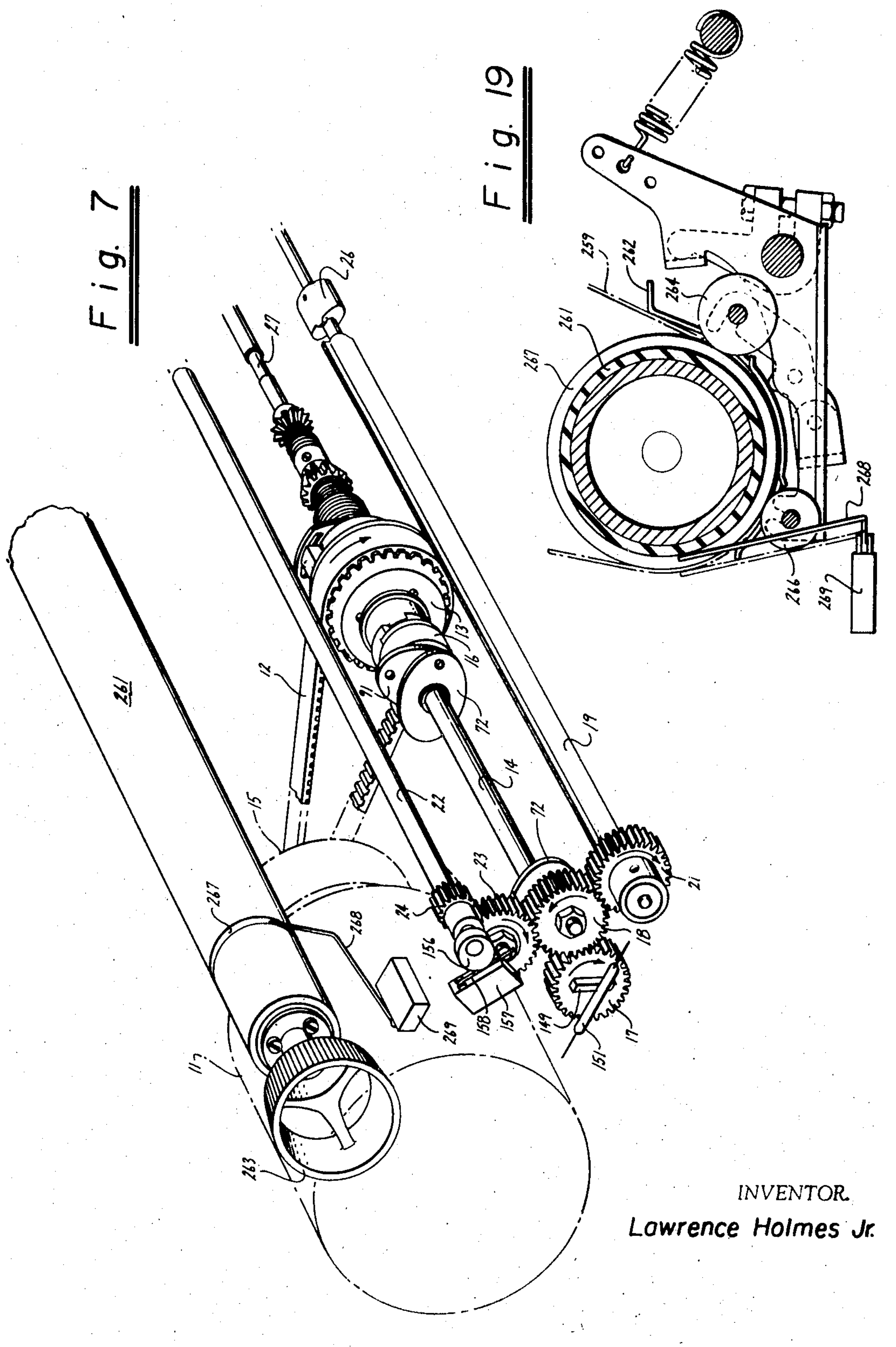
FIG. 7 is a perspective illustration of a typewriter platen in relation to the typewriter drive system.
Figures 10, 10A, 10B:
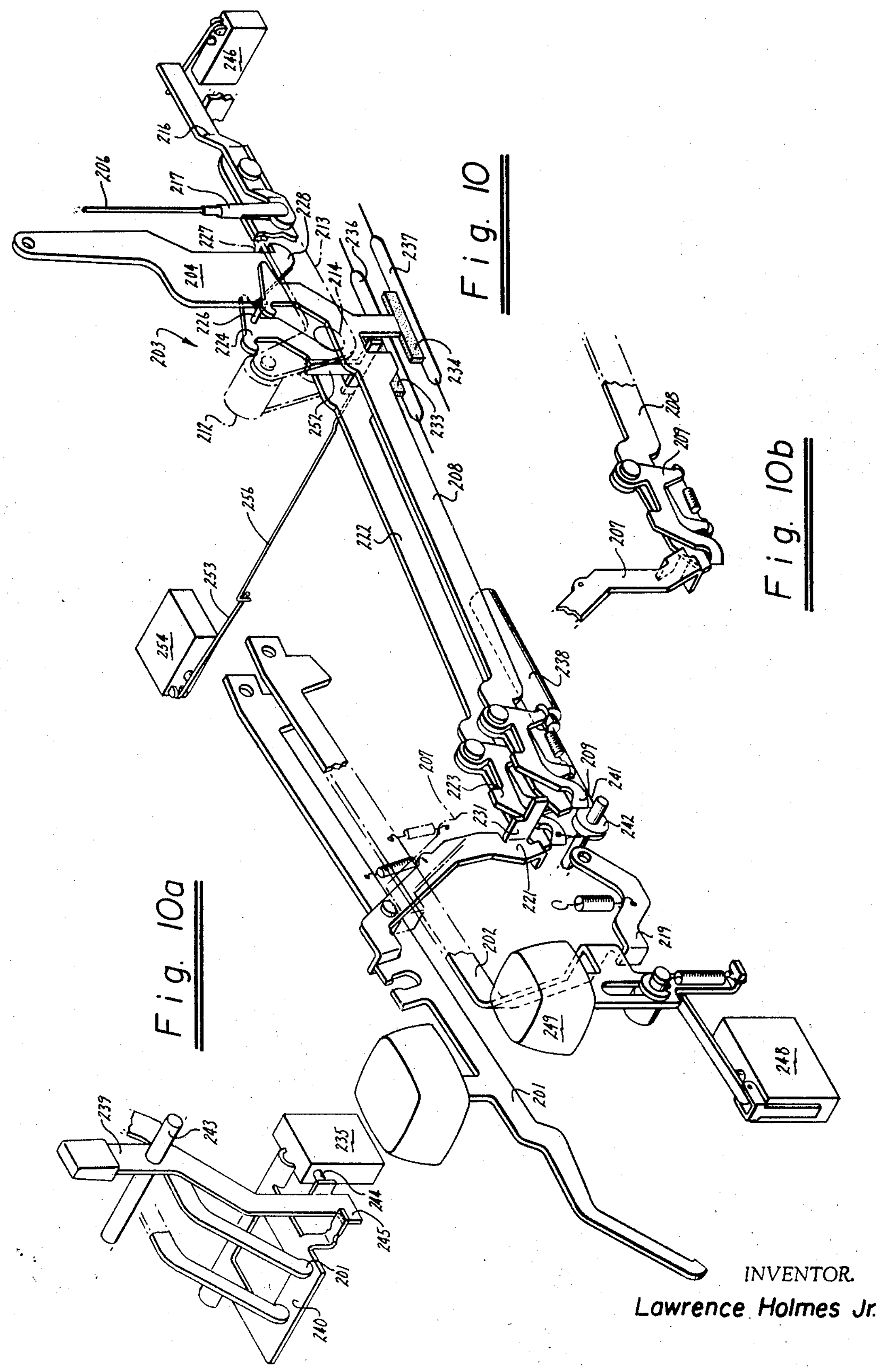
FIG. 10 is a perspective illustration of a typewriter carrier return and index control mechanism as modified by the present invention.
Figures 11, 11A:
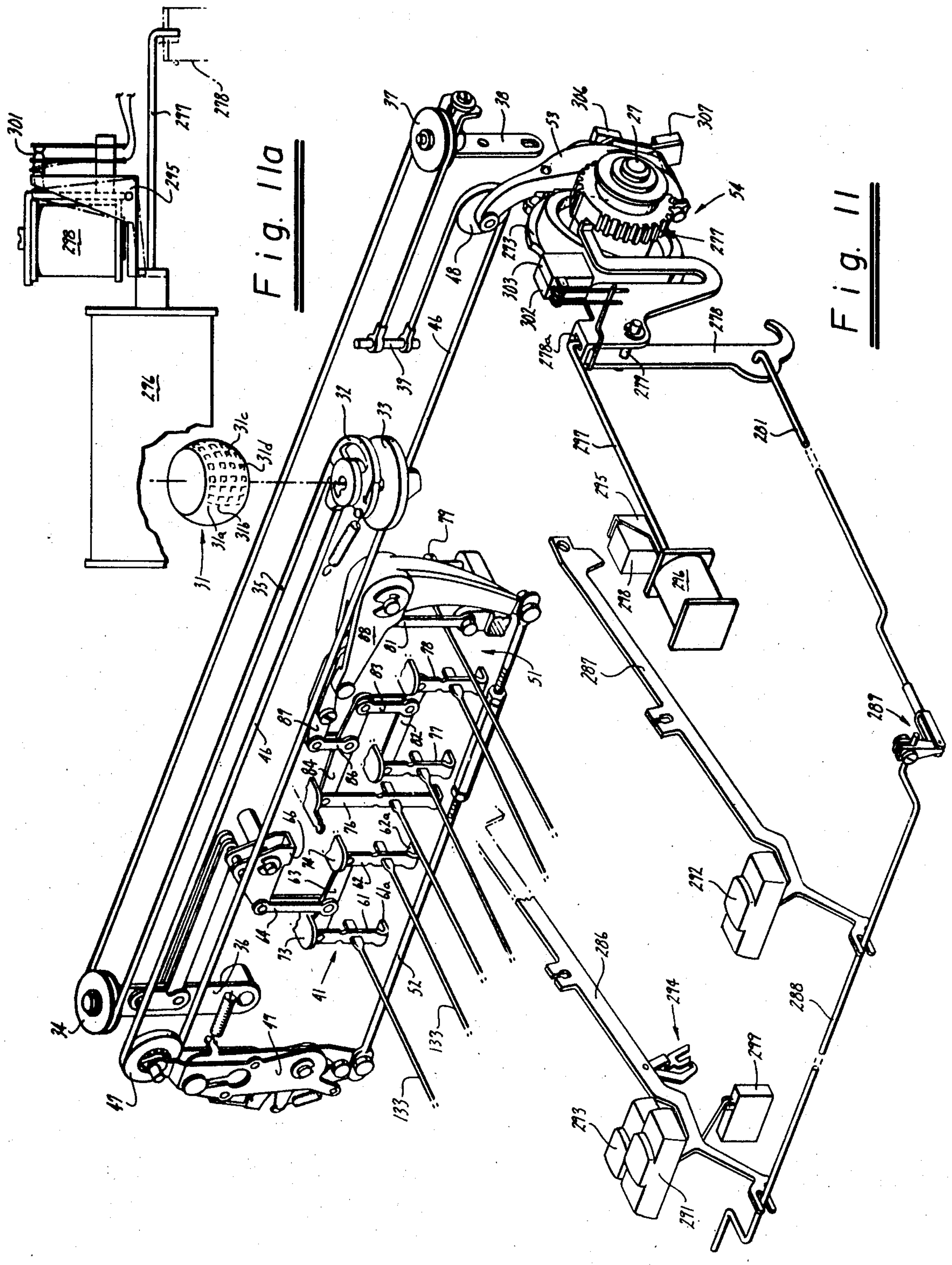
Figure 12:
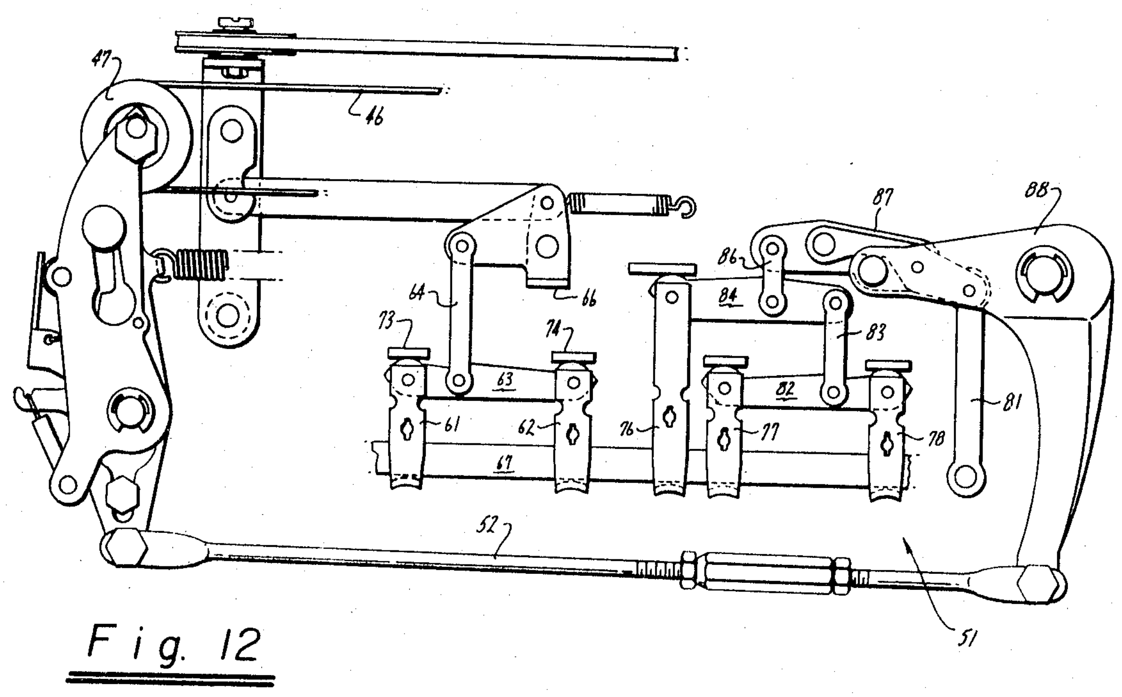
Figure 13:
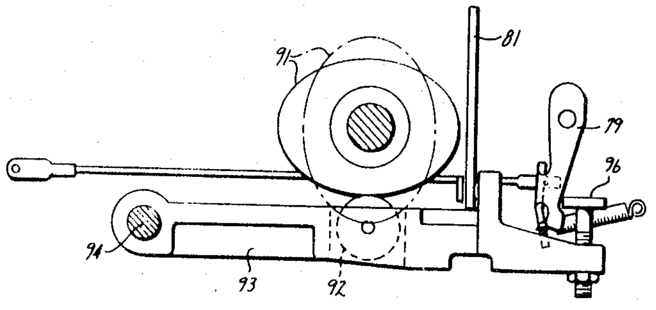
Figure 14:
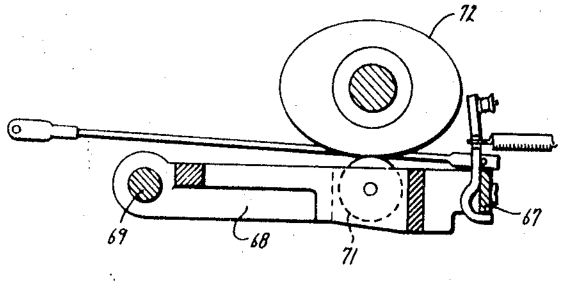
Figure 15:
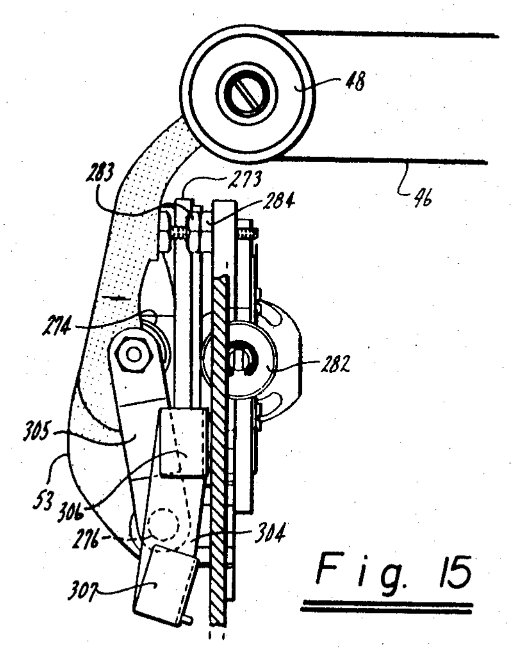
Figure 16:
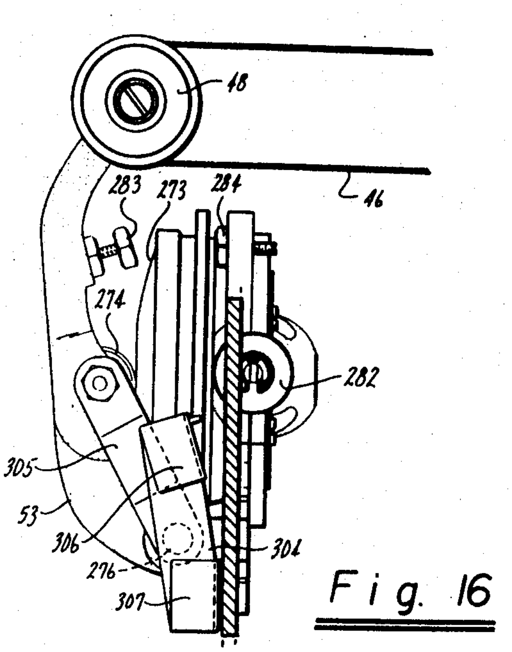
Figure 38:
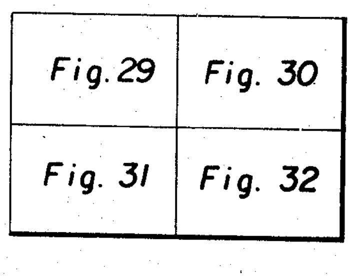
Figure 17:
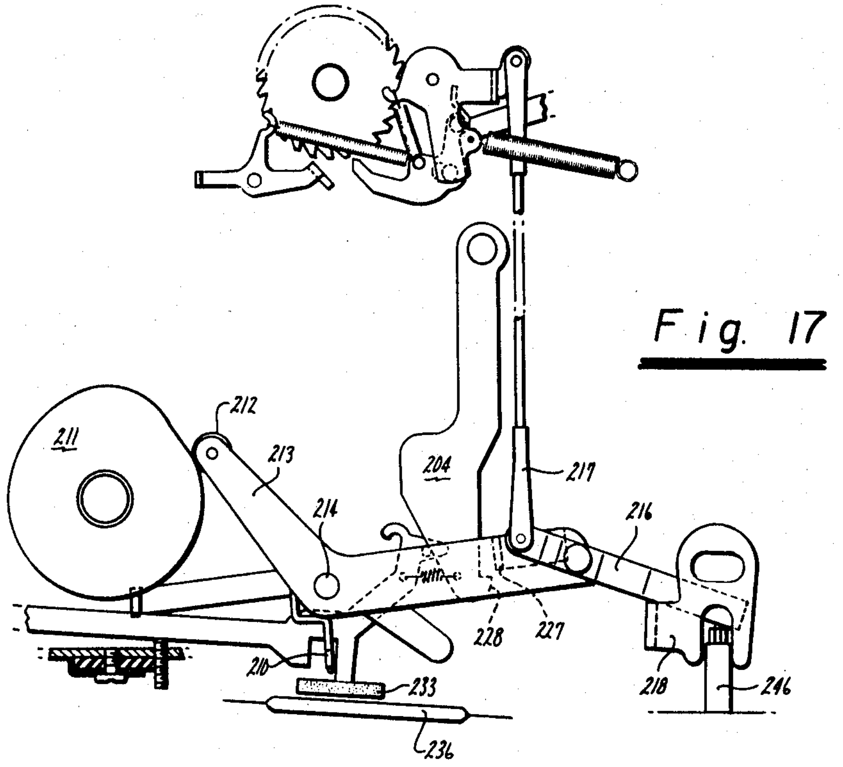
Figure 18:
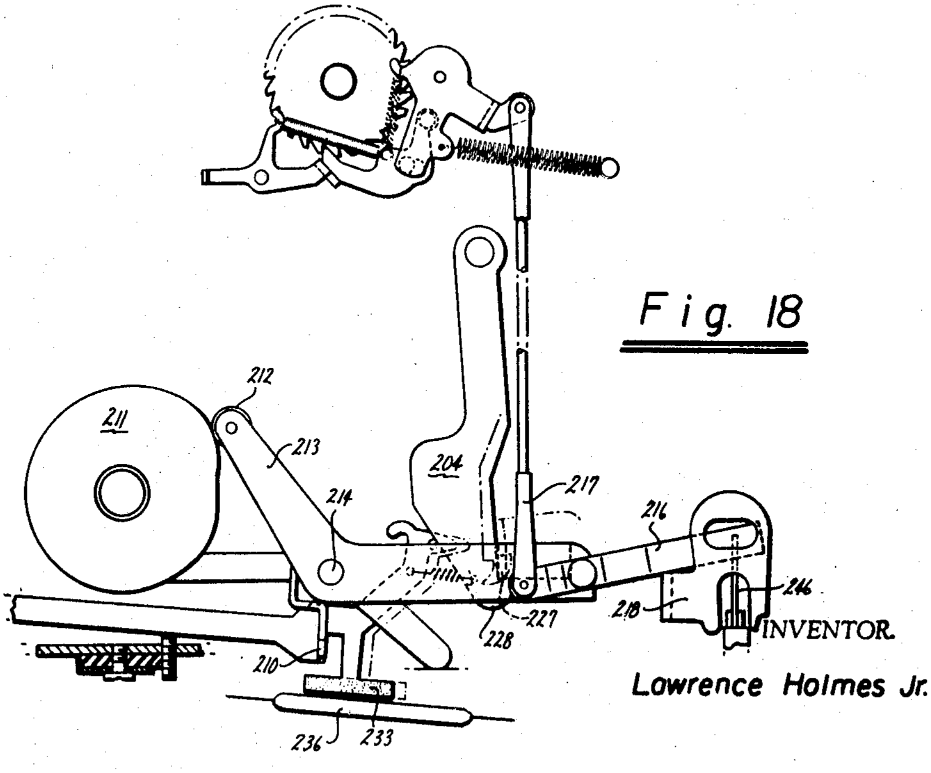
Figure 21:
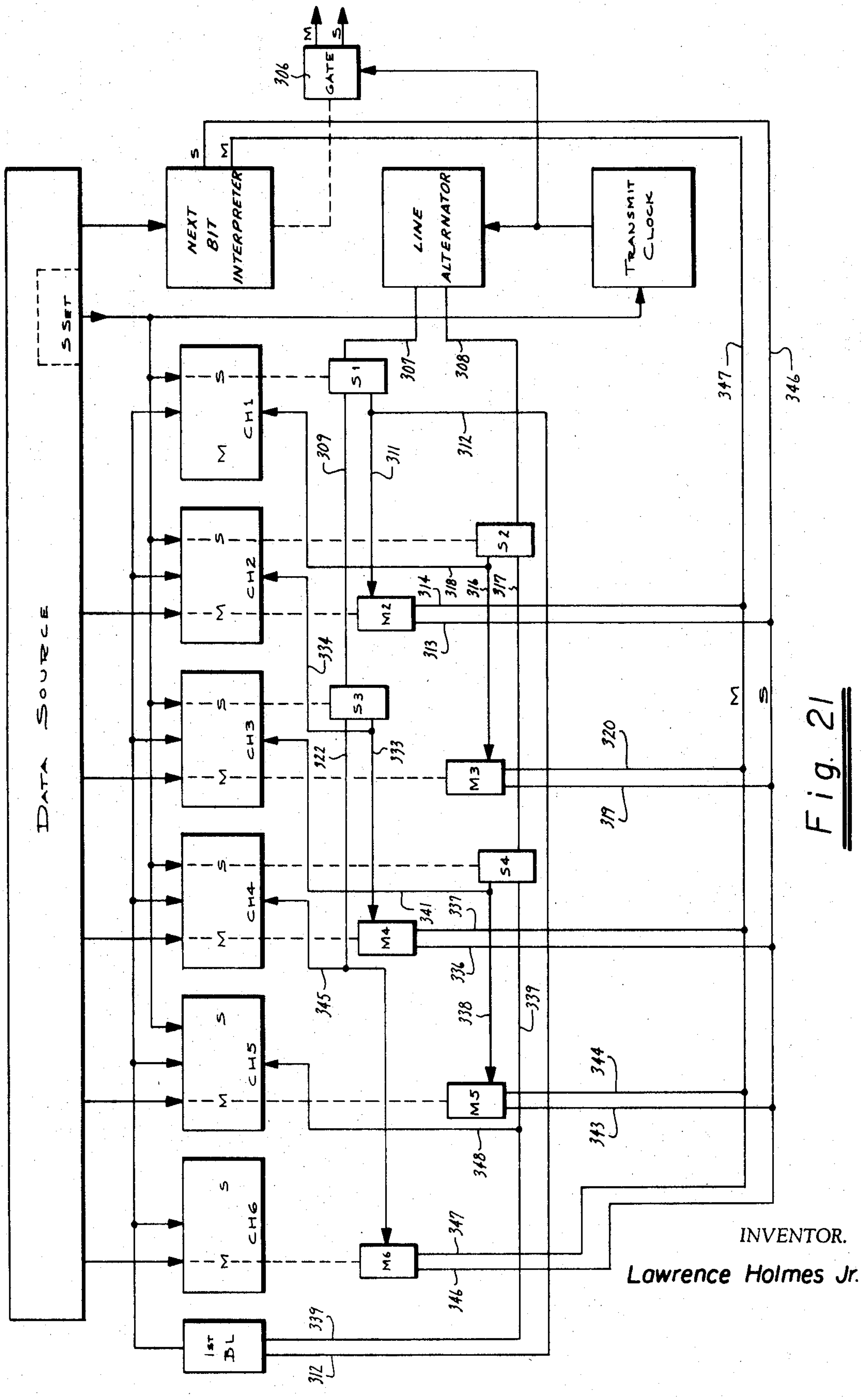
Figures 28, 33:
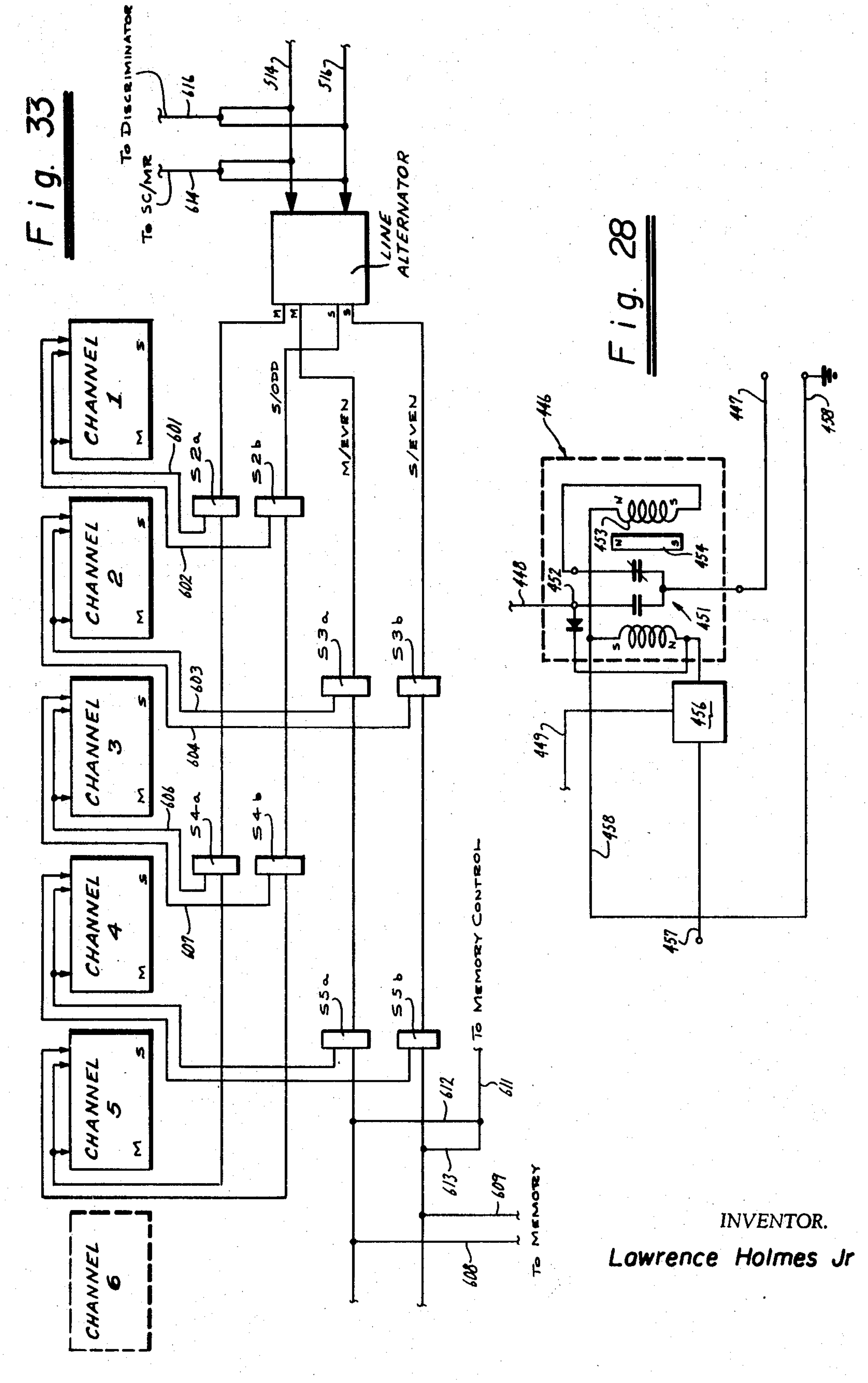
Figure 29:
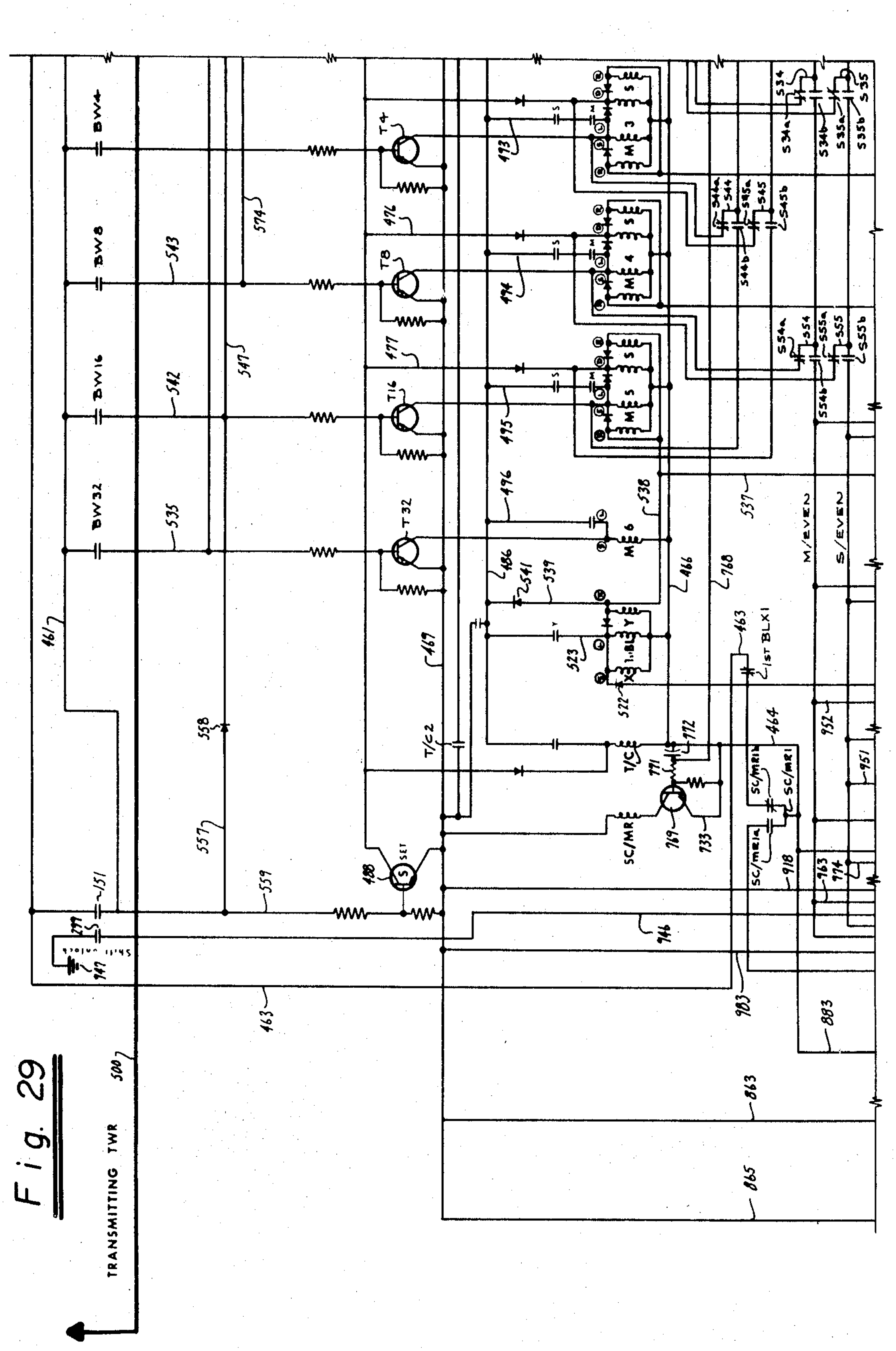
Figure 30:
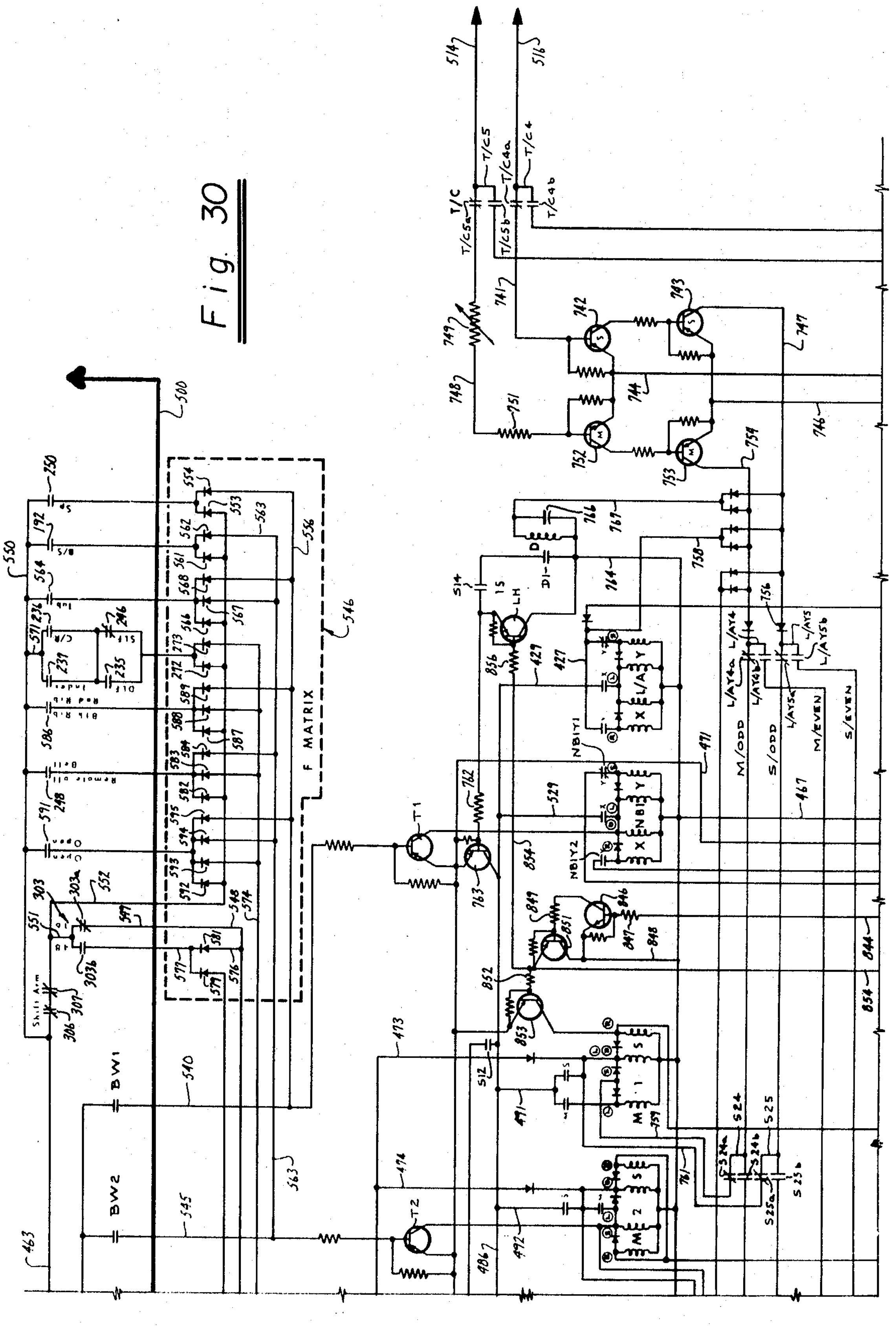
Figure 31:
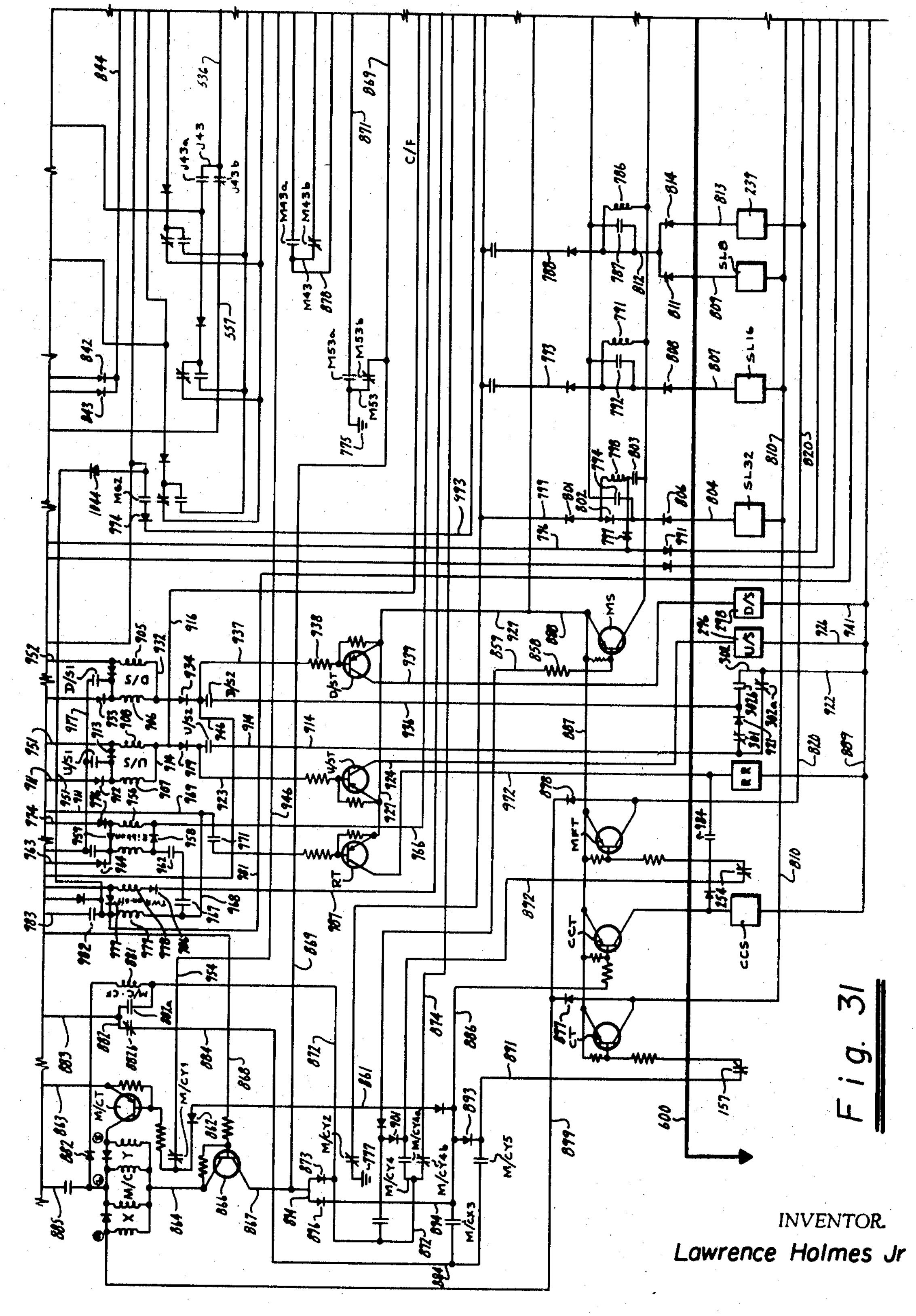
Figure 32:
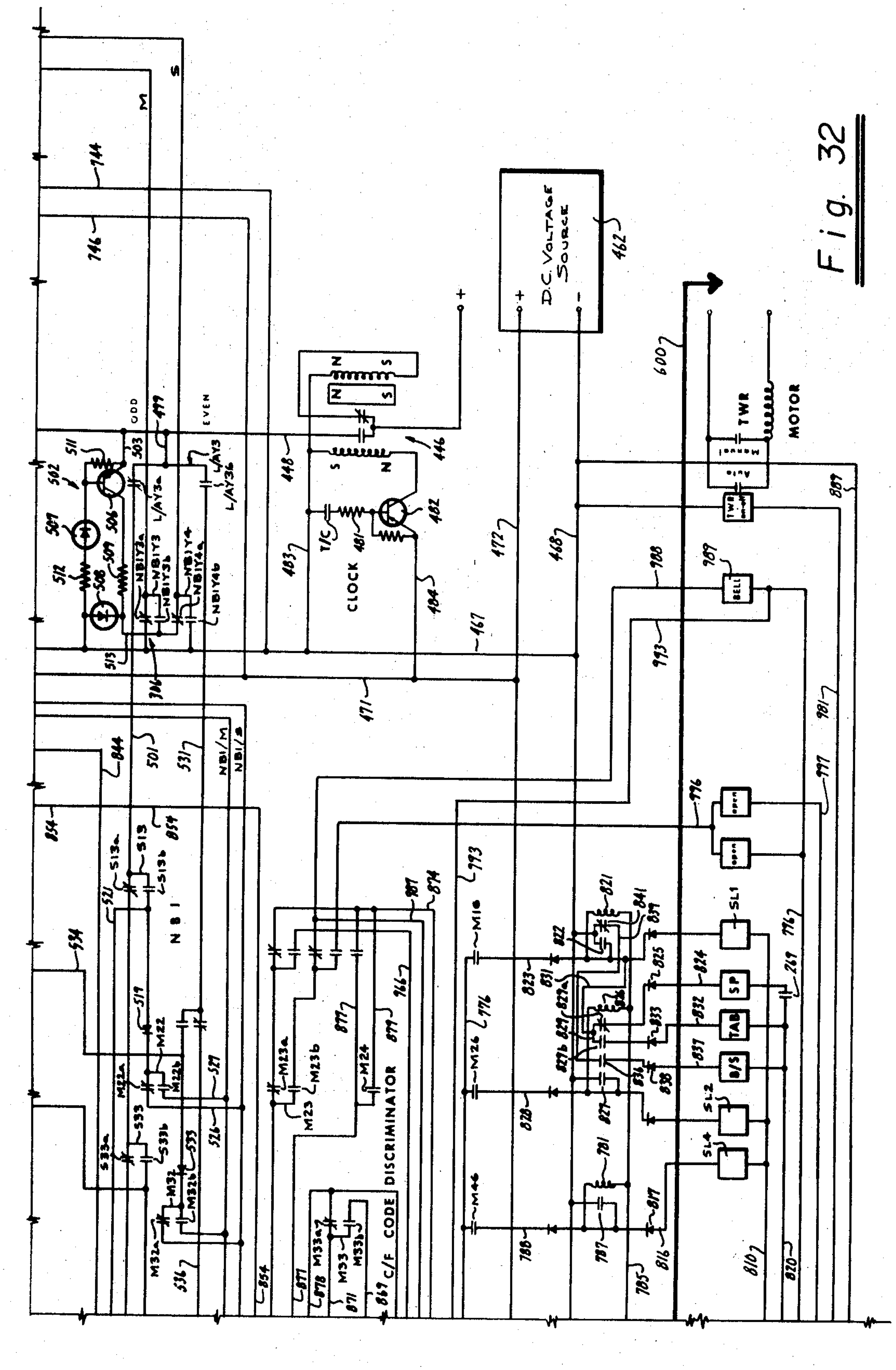
Figure 34:
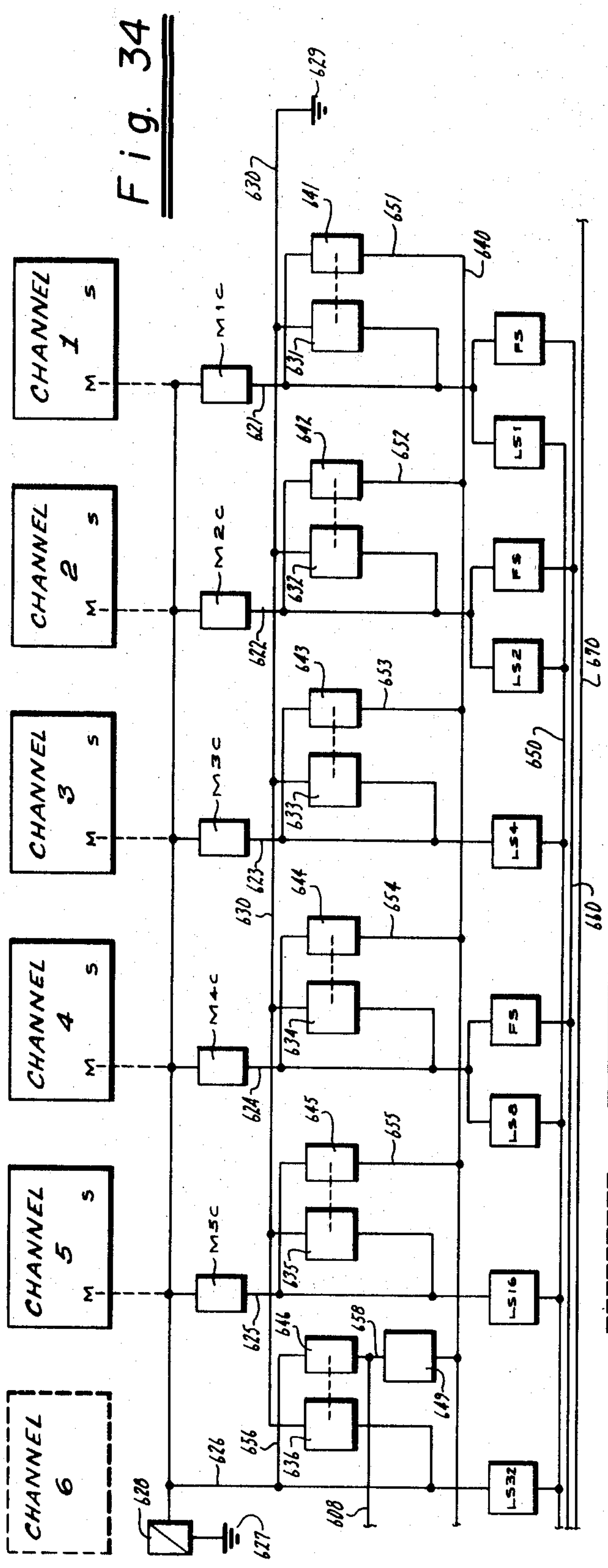
Figure 36:
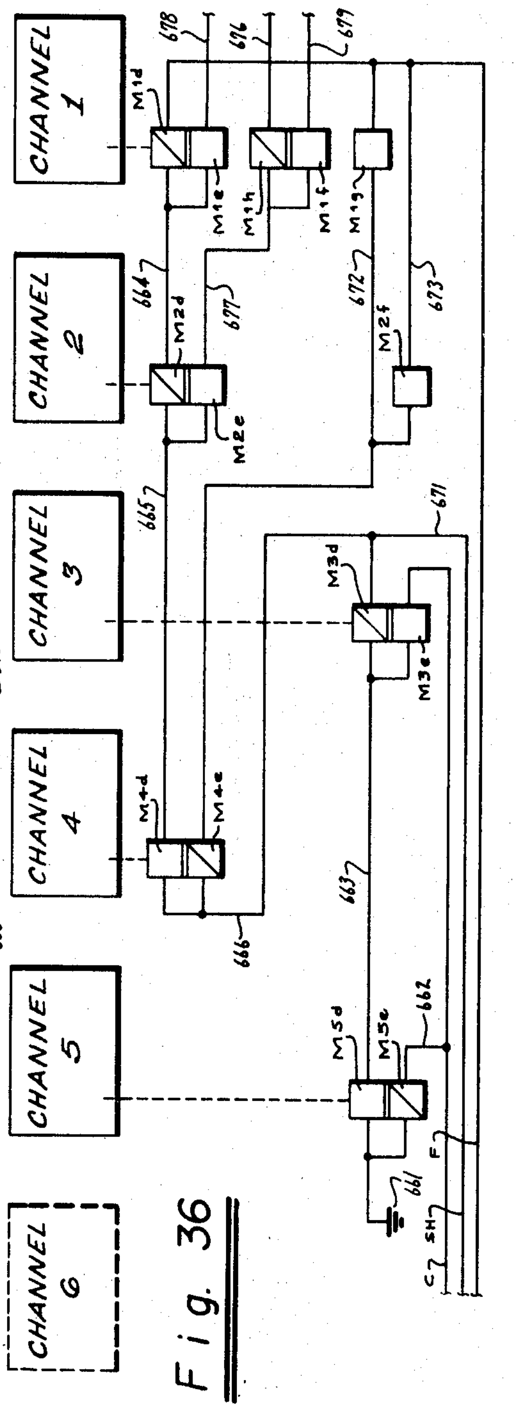
Figure 37:
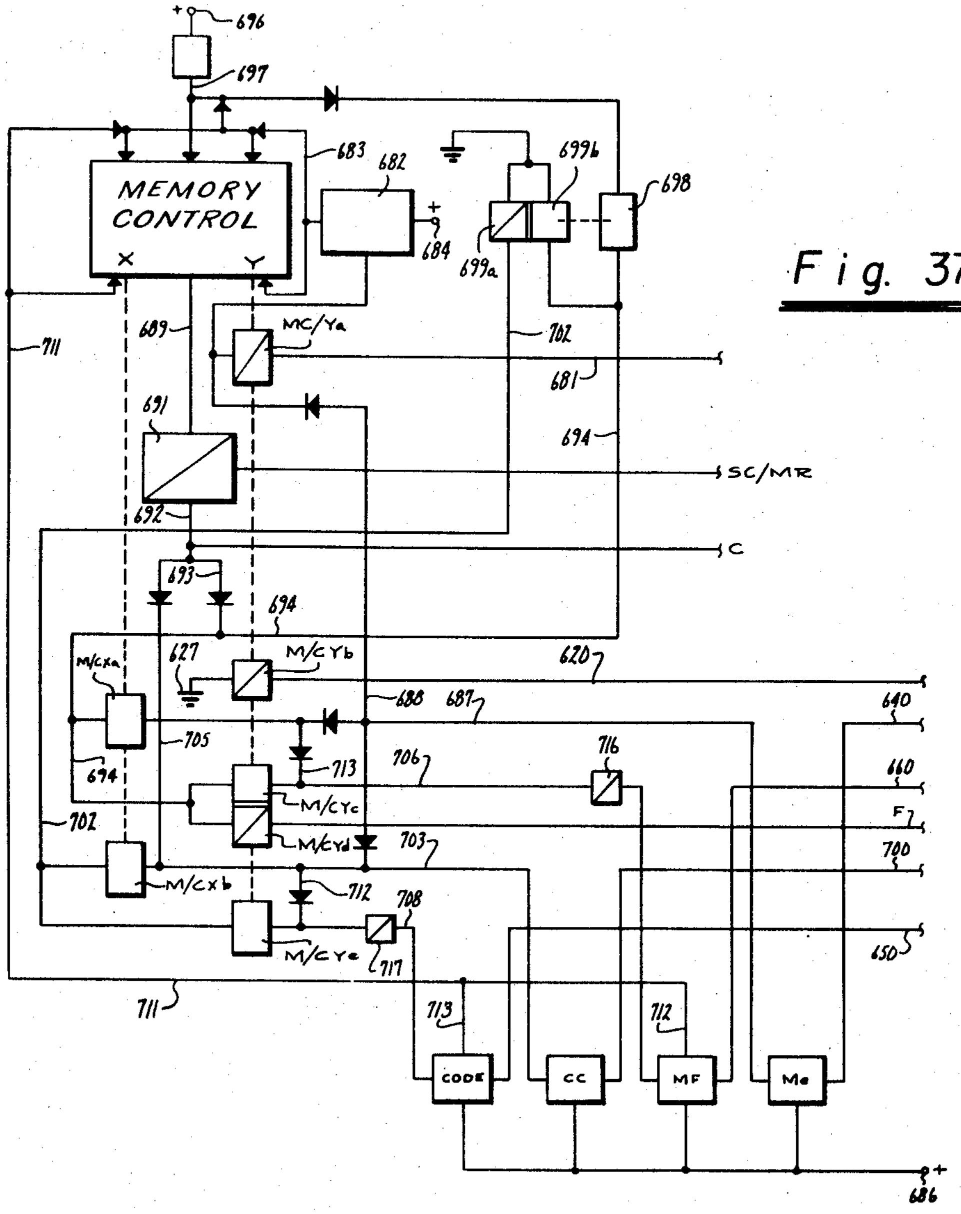

FIG. 10*a* is a perspective illustration of a line-feed control mechanism;

FIG. 10*b* is a portion of FIG. 10 set out alone for purposes of clarity;

FIG. 11 is a perspective illustration of portions of a typewriter character selection mechanism and case shift mechanism as modified by the present invention;

FIG. 11*a* is an enlarged side view of a portion of the case shift mechanism illustrated in FIG. 11;

FIG. 12 is a front view of a portion of a typewriter character selection mechanism;

FIGS. 13 and 14 are side views of portions of a typewriter character selection drive mechanism;

FIGS. 15 and 16 are side views of a typewriter case shift mechanism as modified by the present invention;

FIGS. 17 and 18 are side views of a typewriter index mechanism as modified by the present invention;

FIG. 19 is a vertical section through the platen of a typewriter paper feed mechanism as modified by the present invention;

FIG. 20 is a code chart for typewriter characters and symbols;

FIG. 21 is a block diagram illustrating the logic of the transmit portion of the present invention;

FIGS. 22–28 are electrical schematic illustrations of various subcircuits;

FIGS. 29–32 are portions of an overall electrical schematic illustration of the present invention and are related to each other as shown in FIG. 39;

FIG. 33 is a block diagram illustrating the logic of the input portion of the receiver of the present invention;

FIG. 34 is a block diagram illustrating the logic of the memory portion of the receiver of the present invention;

FIG. 35 is a code chart of the function operations of a typewriter of the present invention;

FIG. 36 is a block diagram illustrating the logic of the C/F code discriminator portion of the receiver of the invention;

FIG. 37 is a block diagram illustrating the logic of the memory control portion of the receiver of the invention;

FIG. 38 is a block diagram showing the relationship of FIGS. 29–32 to one another.

INTRODUCTION

Figure 1:
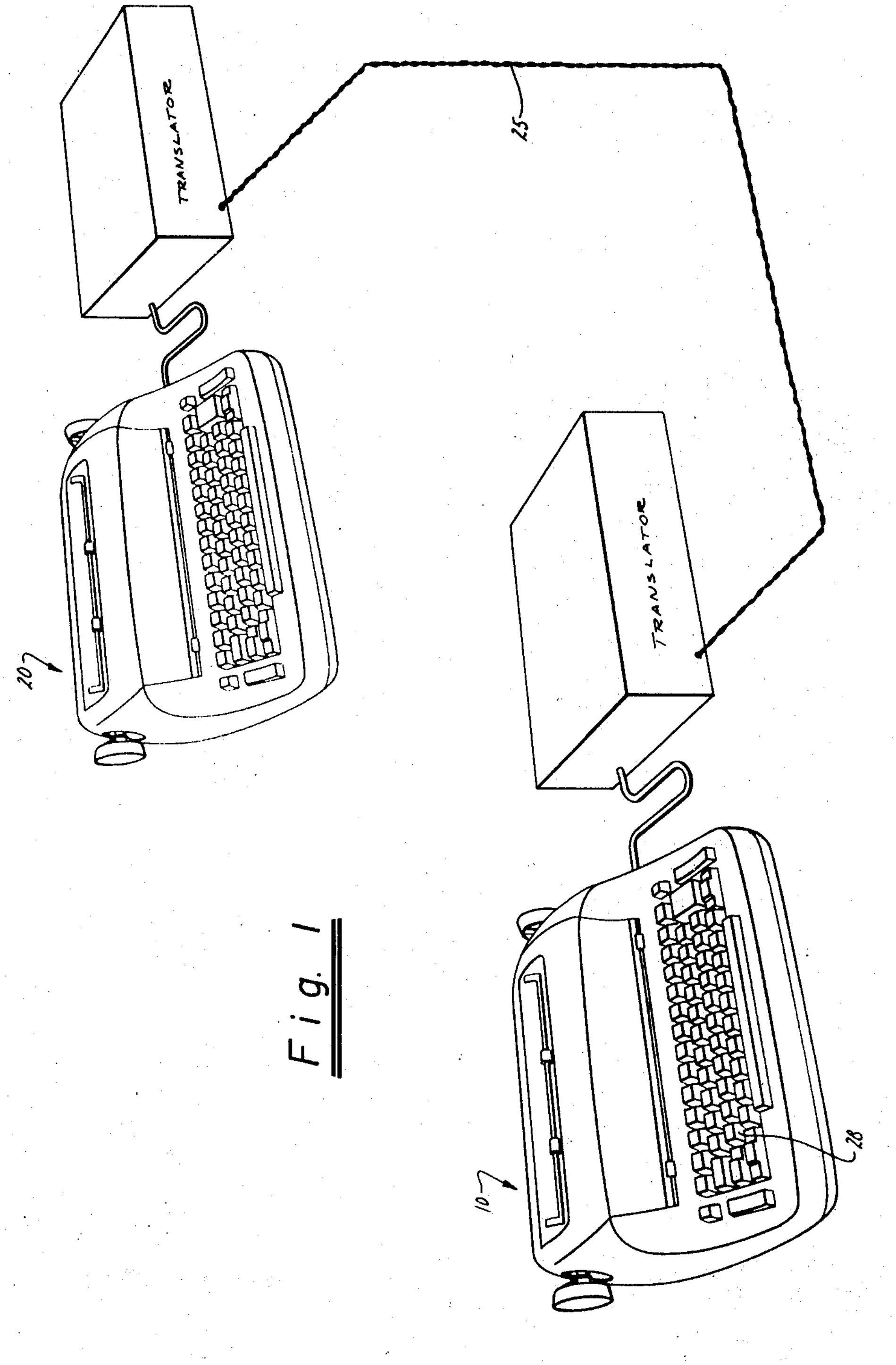
FIG. 1 is a perspective illustration showing the main components of a typewriter communication system as taught by the present invention.

Referring to FIG. 1, (i.e., present invention is designed to enable a typewriter 10 to operate one or more remotely located typewriters 20 wherein the typewriters are interconnected by a two-wire transmission system 25. Accordingly it is necessary that the transmit typewriter generate an electrical signal each time it operates to print a character or perform a function operation i.e., space, backspace, carrier return, index, case shift, etc.). The information which is contained in the electrical signal generated by the typewriter is transmitted over the two-line transmission system to a remote typewriter which is designed to respond to that particular electrical signal by performing an operation which corresponds to the operation which generated the signal. Accordingly, it is necessary to provide a typewriter with electrical signal generating capabilities.

Typewriters which generate a separate and distinct electrical signal for each distinct operation which they perform are known in the art and are capable of operation with the present invention. The electrical signal generating typewriters which are presently known in the art, however, are standard electric typewriters which are extensively modified. As a result, these typewriters are bulky and expensive. The present invention teaches an improved signal generating typewriter which takes advantage of a characteristic found only in the IBM electric typewriter known as the Series 72 Electric Typewriter and commonly referred to as the IBM Selectric. This typewriter is characterized by a type head which carries all of the characters which the typewriter prints. This generally spherically shaped type head is mounted on a mechanism which enables the head to be tilted and rotated to any one of the 88 unique positions which the head can assume. The mechanism which relates a particular key button 28 with one of the 44 lowercase or 44 upper-case head positions includes six latches which are used to generate a six-bit binary code in the form of an electrical pulse signal. While all of the typewriter operations which result in the printing of a letter or symbol include the operation of the latches mentioned above, the functions operations which are also necessary in operating a typewriter do not include the operation of the six latches, and thus special means must be provided to generate identifying codes for function operations.

Since it is most advantageous for a single typewriter to be capable of operating as a receiver as well as a transmitter it is necessary to equip the typewriter with means by which the typewriter can be made to operate in response to electrical signals.

Thus, the first portion of the description is directed to those attachments which the present invention adds to an IBM Selectric typewriter to make the typewriter identify each operation it performs by generating an identifying electrical pulse signal, and to enable the typewriter to be operated by electrical signals. Since typewriters of the present invention are designed to respond to electrical signals as well as generate them, a particular typewriter can only be identified as a transmit device or receive device on the basis of the particular function it is performing at any given time, and not by any inherent limitation. As previously mentioned, the IBM Selectric typewriter is advantageously adapted for use with the present invention without extensive modifications. The IBM typewriter, itself, however, is of a well-known design and no portion of the description relating purely to typewriters as writing machines forms a part of the present invention. The primary reason for the somewhat detailed description of the components of the IBM Selectric typewriter and their operation is to enable a better understanding and application for the novel attachments taught by the present invention, which do form an important part of the present invention.

TYPEWRITER OPERATIONS AND MODIFICATIONS

Referring now to FIG. 7, an electric typewriter motor 11 operates through a motor clutch 15 and a drivebelt 12 to provide the typewriter with the power necessary to carry out a selected print operation or function operation. The drivebelt 12 operates over a drive pulley 13 which is connected to a cycle shaft 14 through a cycle clutch 16. When the motor 11 is energized and operating, it continuously drives the pulley 13, but only rotates the shaft 14 when clutch 16 is conditioned to transmit torque. Mounted between the ends of shaft 14 are a plurality of cams 72, 91 the operation and function of which will be described in detail below. Secured to the end of shaft 14 is a gear 17 which meshes with a gear 18 that drives a filter shaft 19 through gear 21. The gear 17 also drives a print shaft 22 through an idler gear 23 and print shaft gear 24. Thus, each time a print cycle is initiated by a key button 28 being depressed the motor 11 drives the cycle shaft 14 which results in the filter shaft 19 and the print shaft 22 being driven for as long as the cycle clutch 16 connects the pulley 13 to the shaft 14. An escapement cam 26 on the filter shaft 19 initiates a function operation (space) to accompany each print operation and provides the only function operation which is initiated through the cycle clutch 16.

An operational cam shaft 27 also communicates with the drive pulley 13 and serves as the connection between the source of power 11 and those mechanisms which perform the various function operations.

As previously mentioned, the IBM Selectric typewriter has a print mechanism the operation of which is basically different than the more commonly known typewriters which employ a large number of individual key bars. In the more conventional typewriter paper is held to a platen which is secured on a carriage which is movable past a given fixed location at which a selected type bar strikes the paper. The IBM Selectric typewriter employs a stationary platen for the paper and has a carrier which supports a type head that moves relative to the paper. The type is all located on the type head and by properly positioning the type head relative to the paper prior to having the type head strike the paper, a selected character or symbol is printed. The type head has four rows of characters with all lower case characters on one hemisphere and all upper case characters on the other hemisphere. In order for a selected character to be printed it may be necessary to both rotate and tilt the type head. The mechanism which perform these functions are best shown on FIG. 11.

a. Character and Symbol Selection and Print Mechanism

Figures 8, 9:
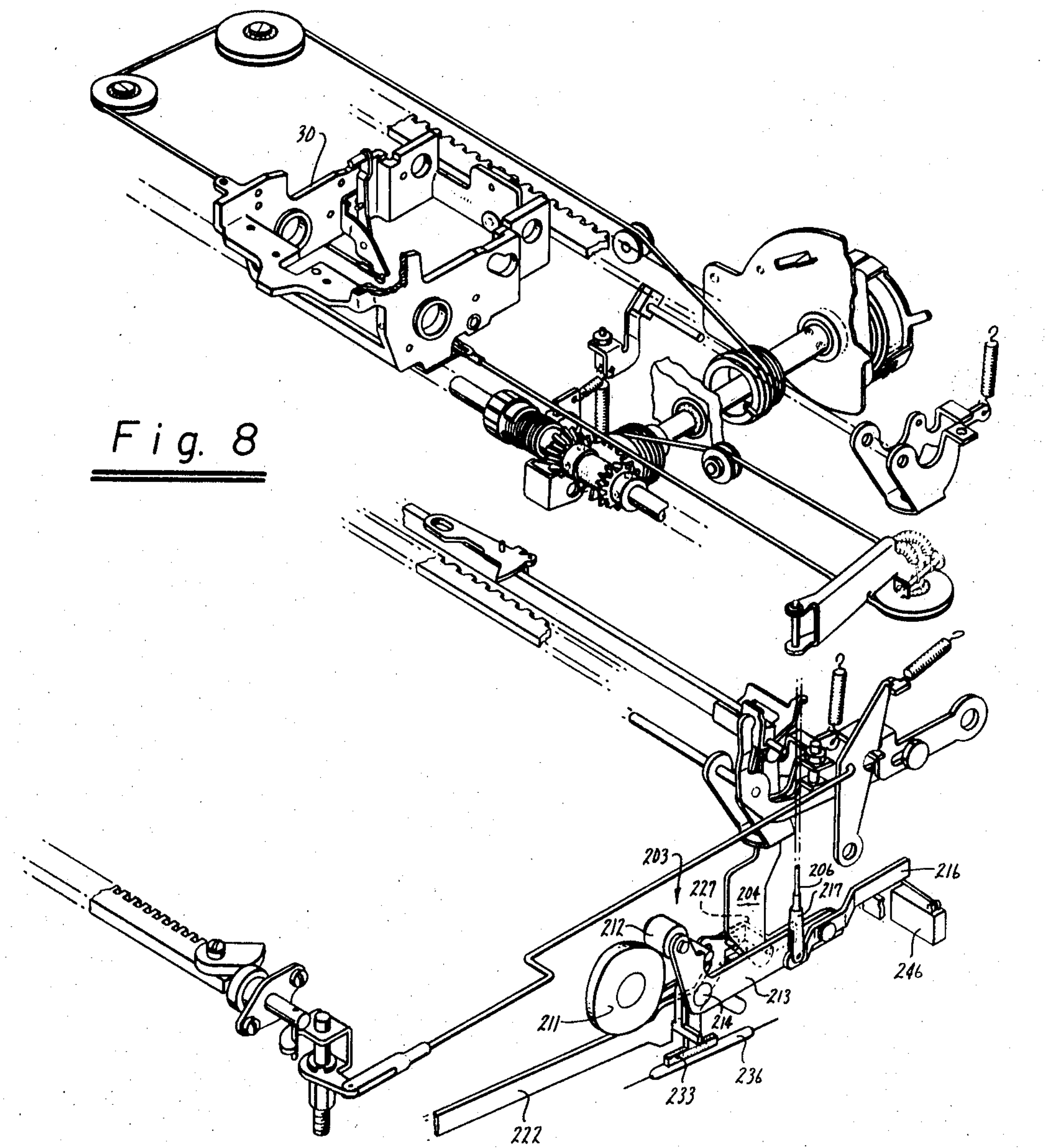
FIG. 8 is a perspective illustration of a typewriter carrier mechanism.
FIG. 9 is a perspective illustration of a portion of the carrier mechanism shown in FIG. 8 together with control mechanism therefor as modified by the present invention.

A type head 31 is connected (through mechanism not shown) to a tilt pulley 32 and a rotate pulley 33. Secured to the tilt pulley 32 is a steel band tilt tape 35. The tape 35 extends ground a pulley 34, which is mounted on a movable tilt arm 36, over a second pulley 37 which is mounted on a stationary arm 38. The end of the tape is anchored to a shaft 39 which is secured to a movable carrier 30 (see FIG. 8) on which the head 31 and pulleys 32 and 33 are mounted. Since both ends of tilt tape 35 are secured to the movable type head carrier 30, movement of the carrier does not by itself change the angular position of the tilt pulley 32. The angular position of the tilt pulley 32 is a function of the position of the tilt arm 36, which in turn is a function of the tilt mechanism 41. When the tilt mechanism 41 operates to change the tilt position of the type head 31 the tilt arm 36 is positioned to change the distance between pulleys 34 and 37. The change in distance between these two pulleys is compensated for by rotation of the tilt pulley 32 which produces a tilt movement of the head 31.

Secured to the rotate pulley 33 is a rotate tape 46 which extends over a rotate arm pulley 47 and a shift arm pulley 48 before being secured to the shaft 39. The shift arm pulley 48 is stationary except when a shift operation occurs and thus for the purpose of this discussion can be considered as stationary. The pulley 47 mounted on the rotate arm 49 is movable (along with the rotate arm) and provides the means for rotating the head 31 in much the same manner as movement of arm 36 resulted in tilt rotation of the head 31. Rotate mechanism 51 operates through a rotate link 52 to position the rotate arm 49 and thus the rotate arm pulley 47. Moving the pulley 47 relative to the pulley 48 is compensated for by rotation of the spring-loaded rotate pulley 33.

The pulley 48 is secured to the shift arm 53 which is controlled by the shift mechanism 54 to be in one of two positions. In its normal position the type head 31 is operating on the hemisphere which produces lower case characters and symbols, and in its shifted condition the position of the pulley 48 causes 180° rotation of the type head 31 whereby typing produces upper case characters and symbols.

Each time a character key lever button 28 is depressed both the rotate mechanism 51 and the tilt mechanism 41 operate to position the head 31 to that location which results in the printing of the selected character or symbol. The mechanism which translates the depression of a single key lever button 28 into the exact positioning of the head 31 necessary to produce the desired results will now be described.

Referring now to FIGS. 11–14, the tilt mechanism 41 comprises a pair of selector latches 61 and 62 each rotatably connected to one end of a cross lever 63. A link 64 is rotatably connected at one end to cross lever 63 and at its other end to the tilt bell crank 66. Link 64 is pinned to cross lever 63 at a location which is twice as far from selector latch 62 as from selector latch 61. Each of the latches 61 and 62 includes a forwardly extending end bottom portion 61*a* and 62*a*, respectively, and the latches are spring loaded to a position which positions portions 61*a* and 62*a* below a latch bail plate 67.

The latch bail plate 67 forms a portion of the latch bail 68 which is disposed for rotation about a shaft 69. The latch bail 68 carries a roller 71 which contacts a positive selector cam 72 which is mounted on the cycle shaft 14 (see FIG. 7). The positive selector cam 72 has a generally elliptical shape and thus provides a complete cycle of operation for each 180° of revolution. When the cam rotates 90° from the position shown in FIG. 14, the latch bail 68 is urged downwardly with the latch bail plate 67 urging the selector latches along with it. A further 90° rotation of the cam enables the latch bail to return to its initial position. After the initial 40° of rotation of cam 72, those selector latches not withdrawn are positively engaged and those selector latches withdrawn are cleared. At this time the selector latches can be released without disrupting the desired operation. This feature will be shown to be of considerably importance further in the description of the invention.

The type head 31 (FIG. 11) carries four circular rows of characters 31*a*, 31*b*, 31*c* and 31*d*. The head has a normal tilt position in which the characters of row 31*a* are in the print location. The operation of tilt mechanism 41 results in the characters of one of the other rows being moved to the print location. When both of the selector latches 61 and 62 are pulled downward by the latch bail plate 67, the link 64 moves down a distance equal to the distance moved by the latch bail plate and produces the maximum movement of tilt link 36 through the tilt bellcrank 66. This produces a change of three rows on the type head such that the characters in row 31*d* are located for printing. If prior to the latch bail plate 67 moving downwardly the selector latch 61 is urged in a direction which withdraws the lower extending portion 61*a* from below the latch bail 67, then only the selector latch 62 will move downwardly with the latch bail plate. When only the selector latch 62 moved downwardly, the cross link 63 rotates about the upper portion of selector latch 61 (the upward movement of selector latch 61 being halted by a stop 73) and the downward movement of link 64 is only one-third as great as when both selector latches were pulled down. This one-third greater movement of link 64 produces only a third as much movement in bellcrank 66 and consequently only a third as much movement in tilt link 36. Under these conditions the head tilts one row of characters to row 31*b*. If the selector latch 62 is withdrawn from below the latch bail plate 67 and selector latch 61 is the only latch urged downwardly, then the rotation of cross link 63 takes place about the top of latch 62 (stop 74 preventing upward movement of latch 62) and the movement of link 64 is twice as great as when latch 62 is urged downwardly, and two-thirds as great as when both latches are urged downwardly. This gives rise to a two-row tilt of the type head whereby the characters of row 31*c* are located for printing.

To summarize, when both latches 61 and 62 are withdrawn from below latch bail plate 67 prior to the latch bail being cammed downwardly no tilting occurs in the type head and the characters of row 31*a* are located for printing. When latch 62 is withdrawn from under the bail plate the head tilts to locate row 31*b* for printing; when latch 61 is withdrawn from below the bail plate the head tilts two rows to row 31*c*; and when neither of the latches is withdrawn from below the bail plate (thus both latches being urged downwardly with the latching bail) the head tilts to locate the characters of row 31*d* for printing.

The rotate mechanism 51 is somewhat more complex than the tilt mechanism due to the need to move to more than four different locations. The principle of operation however is basically the same. The rotate mechanism includes three selector latches 76, 77 and 78 plus a five-unit latch 79 which works through five-unit latch link 81. Each of the selector latches 76, 77 and 78 includes a forwardly extending bottom portion which is disposed below the latch bail 67 unless urged in a direction which withdraws it. The selector latches 77 and 78 are connected by a cross link 82 which in turn is secured by a first lever 83 to a second cross link 84. Also connected to the cross link 84 is the selector latch 76. The second cross link 84 is connected by a second lever 86 to a balance lever 87. The balance lever 87 is connected to the rotate bellcrank 88 which is connected through rotate link 52 to the rotate arm 49. It is the position of the rotate arm which determines the position of pulley 47 which in turn acts through tape 46 to angularly position the rotate pulley 33. And the angular position of pulley 33 determines the rotate position of head 31.

When both latches 76 and 78 are withdrawn from below the bail plate 67, such that latch 77 is the only latch urged downwardly, there results a rotation of bellcrank 88 which is one-fifth as great as the maximum rotation possible through the rotate mechanism 51. When latch 78 is the only latch urged downwardly the resulting rotation of bellcrank 88 is twice that achieved through latch 77 and thus two-fifths the maximum possible rotation. The same rotation of bellcrank 88 which is achieved when only latch 78 is urged downwardly is achieved when latch 76 is the only latch engaging the bail plate during its downward movement. Latch 76, however, is not used for the purpose of achieving a two-unit rotation. To achieve a three-unit rotation, latches 77 and 78 are both allowed to engage the bail plate on its downward movement and latch 76 alone is withdrawn. A four-unit rotation is accomplished by urging latches 76 and 78 down while withdrawing latch 77, and a five-unit, or maximum rotation occurs, when all three latches are allowed to engage the bail plate during its downward movement. Unlike the tilt mechanism, it is necessary in the rotate mechanism to produce rotation in both directions. The mechanism as described so far has only produced rotation of the bellcrank 88 in a single direction. For rotation in the opposite direction it is necessary to employ the five-unit latch system which will now be described with reference to FIG. 13.

The five-unit latch system has its own cam 91 which engages a roller 92 carried by a bail 93 which is mounted on a shaft 94 for rotation. The latch 79 is spring urged to a position which normally prevents the bail 93 from rising. A lug 96 is secured to the bail 93 and engages the bottom of the latch 79 unless the latch is urged out of its normal position. Thus for positive rotation of the bellcrank 88 the end of balance lever 87 connected to link 81 is held downwardly. When the link 81 is allowed to rise by virtue of latch 79 being withdrawn, there is an associated rotation of bellcrank 88 in a direction opposite to that produced by the selector latches being urged downwardly. If all of the latches 76, 77 and 78 are withdrawn from below the latch bail plate 67 and the five-unit latch is released to allow the link 81 to rise, a negative rotation of five units (the maximum negative rotation) occurs. If the selector latch 77, which as previously explained produces one unit of positive rotation, is allowed to remain below the bail plate 67 and thus move downwardly therewith at the same time the link 81 is allowed to move upwardly, the total negative rotation is reduced by one unit and thus a four-unit negative rotation is achieved. Thus, through the combination of the five-unit latch 79 and the positive selector latches, a negative rotation of one, two, three, four, or five units can be achieved. The mechanisms employed for withdrawing selector latches and for driving the bail plate downwardly will now be described with reference to FIGS. 2 and 6.

The selection of a character or symbol to be printed is made through a key lever 101, one end of which is rotatably mounted on a fulcrum rod 102 and the other end of which is supported by a leaf spring 103. Depression of the key button 104 associated with the key lever 101 causes the key lever to move downwardly until it engages a lower stop 106. Mounted directly below each key lever 101 is an interposer 107, one end of which includes an elongated hole 108 through which an interposer securing rod 109 passes. The elongated hole 108 allows the interposer to be moved a limited distance in the direction of its axis. The upper surface of the interposer includes a key lever pawl contact surface 111 at the top of an upwardly projecting finger 112. The surface 111 engages the key lever pawl 113 whenever the key lever is depressed and acts to transfer the downward motion of the key lever to the interposer 107. As the interposer moves downwardly, a downwardly extending clutch release lug 114 contacts a cycle bail 116 causing it to move downwardly.

As the cycle bail moves downwardly it engages the cycle clutch latch pawl 117 urging it downwardly so that it is able to slide under the cycle clutch keeper 118 which normally prevents the cycle clutch latch link 119 from moving toward the front of the typewriter (spring 103 being near the front while rod 102 is toward the rear) in which direction it is spring-urged by spring 105. With the pawl 117 disengaged from the keeper 118 the link can move under the force of spring 105, and in so doing disengages the cycle clutch latch 121 from the cycle clutch sleeve 122 allowing the cycle clutch to engage and thereby effectively connect the motor to the cycle shaft 14 for rotation thereof. Rotation of the cycle shaft 14 produces accompanying rotation of the filter shaft 19 which engages the end 123 of the interposer 107 when the interposer is in a downward position. As the filter shaft rotates it drives the interposer toward the front of the typewriter within the limits set out by the elongated hole 108 and the rod 109. It is this movement which operates to select a character or symbol for printing.

The filter shaft 19 also engages the cycle clutch latch restorer follower 124 which is connected to the cycle clutch latch-restoring arm 120. The filter shaft causes clockwise rotation of arm 120 which engages the cycle clutch latch bracket 121*a* and urges it in a direction which results in the cycle clutch 121 being put back to the condition in which it prevents the motor from being effectively connected to the cycle shaft.

Disposed directly below the interposer 107 are six selector bails 125–130. The selector bails are separated from one another by a distance which is slightly greater than the distance which the interposer is able to move within the limits set by the elongated hole 108 (see also FIG. 3). Extending downwardly from the underside of interposers 107 are zero to six selector lugs 131 which are affixed at any one of six possible locations along the underside of the interposer. Since there may be anywhere from zero to six selector lugs associated with an interposer, the number of selector bails associated with a given interposer may range from zero to six. There are 64 different unique combinations possible with the six bails and each interposer is associated with a different combination. In this way each key lever is associated with a different combination of selector bails through the selector lugs on an interposer 107.

When an interposer is driven toward the front of the typewriter by the filter shaft 19, it carries with it the selector bail or bails, if any, with which it is associated through its selector lug or lugs, if any.

Each selector bail has exclusively associated therewith a latch interposer 132 (only two of which are shown). Each latch interposer, in turn, is connected through a latch link 133 to one of the selector latches previously described with reference to FIG. 12. When a selector bail is moved towards the front of the typewriter it carries with it one of the latch interposers 132 which in turn operates through a link 133 to withdraw one of the selector latches from under the latch bail plate 67 of the latch bail 68 (see FIGS. 12 and 14). In this way each key lever is capable of selecting a different set of selector latches to be withdrawn from the latch bail and thus select a character or symbol for printing.

It is necessary for the operation of the present invention that the typewriter not only operate to print a character or symbol but also operate to generate an electrical signal which uniquely identifies the particular character or symbol selected for printing. It is further necessary for the typewriter to be capable of operating in response to electrical signals. This last-mentioned feature can be provided (and has in fact been provided in prior art devices) by simply associating a solenoid with each of the key levers and through the use of a matrix or other logic device induce the desired operation by operation of the solenoid urging the key lever downwardly. Such a system is not satisfactory, however, because it is costly and cumbersome.

The present invention provides for both the signal generating, and operation in response to electrical signals, in a unique manner which has the advantages of simplicity, accuracy and economy.

By detecting those of the six latches 61, 62, 76, 77, 78 and 79 which are withdrawn in order to print a selected character or symbol it is possible to state which of the 44 characters and symbols has been selected to be printed. This is true since each character occupies a unique position on the type head and each position on the type head is identifiable with a single combination of selector latches. If each of the six latches is arbitrarily assigned a binary weight (for example, latch 61 a binary weight of 1, latch 62 a binary weight of 2, latch 76 a binary weight of 4, latch 77 a binary weight of 8, latch 78 a binary weight of 16 and latch 79 a binary weight of 32) it is possible to assign a different number to each character and symbol, wherein the number is equal to the sum of the binary weights of the latches which are withdrawn in order to print that character or symbol. (A reciprocal code can be achieved by looking at the latches not withdrawn, rather than those withdrawn.) FIG. 20 illustrates a chart showing the binary weight of the various characters and symbols of a Selectric typewriter using the weighting system suggested above. By associating each of the six selector latches with an electrical signaling means which identifies those latches which have been withdrawn (or conversely those latches which have not been withdrawn) there will be generated each time a character is printed a six-channel electrical code signal representing a six-bit binary character which is uniquely identifiable with a single character or symbol which the typewriter is capable of printing.

Figure 2:
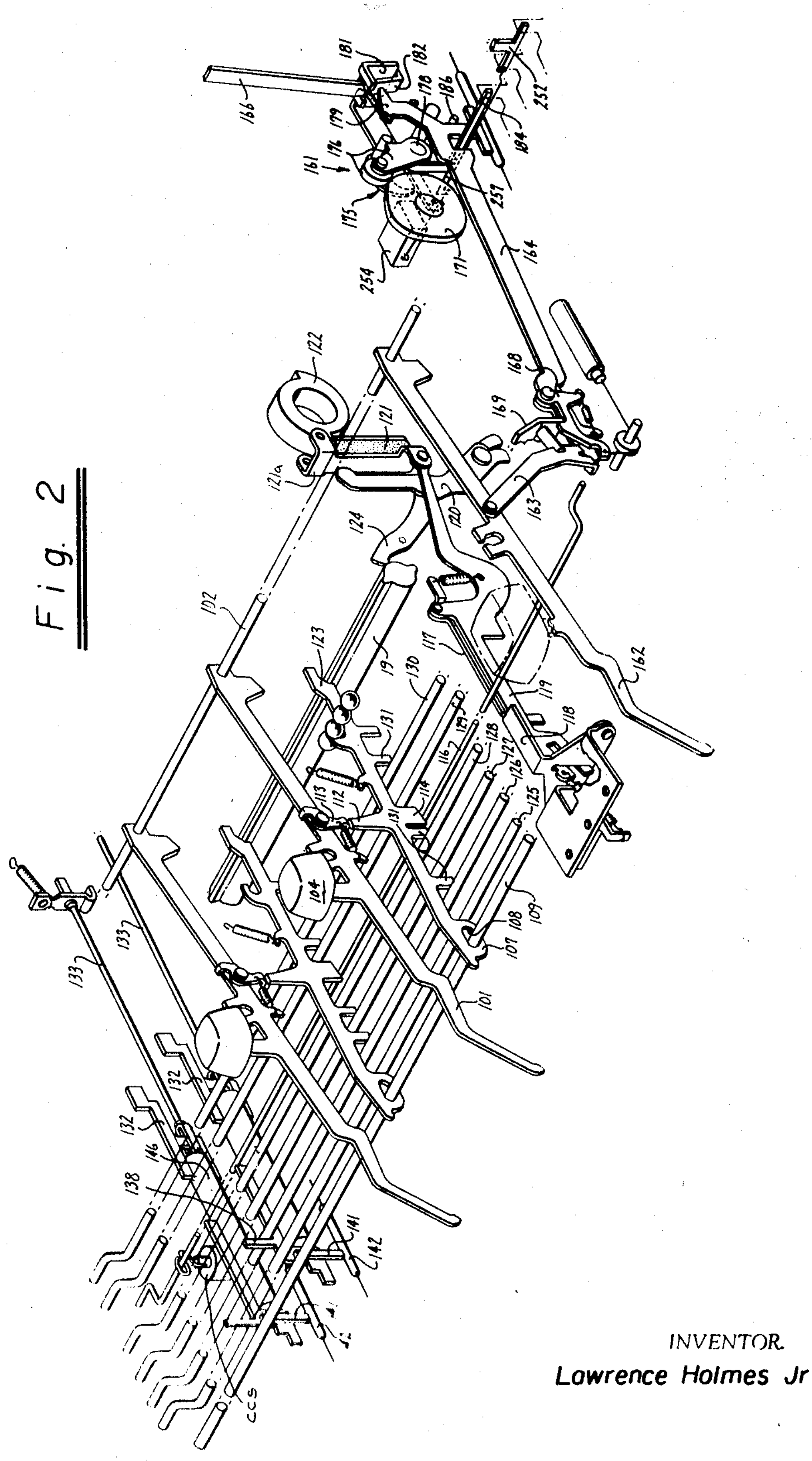
FIG. 2 is a perspective illustration showing the character selection and backspace selection portion of a typewriter as modified by the present invention.
Figures 3, 4:
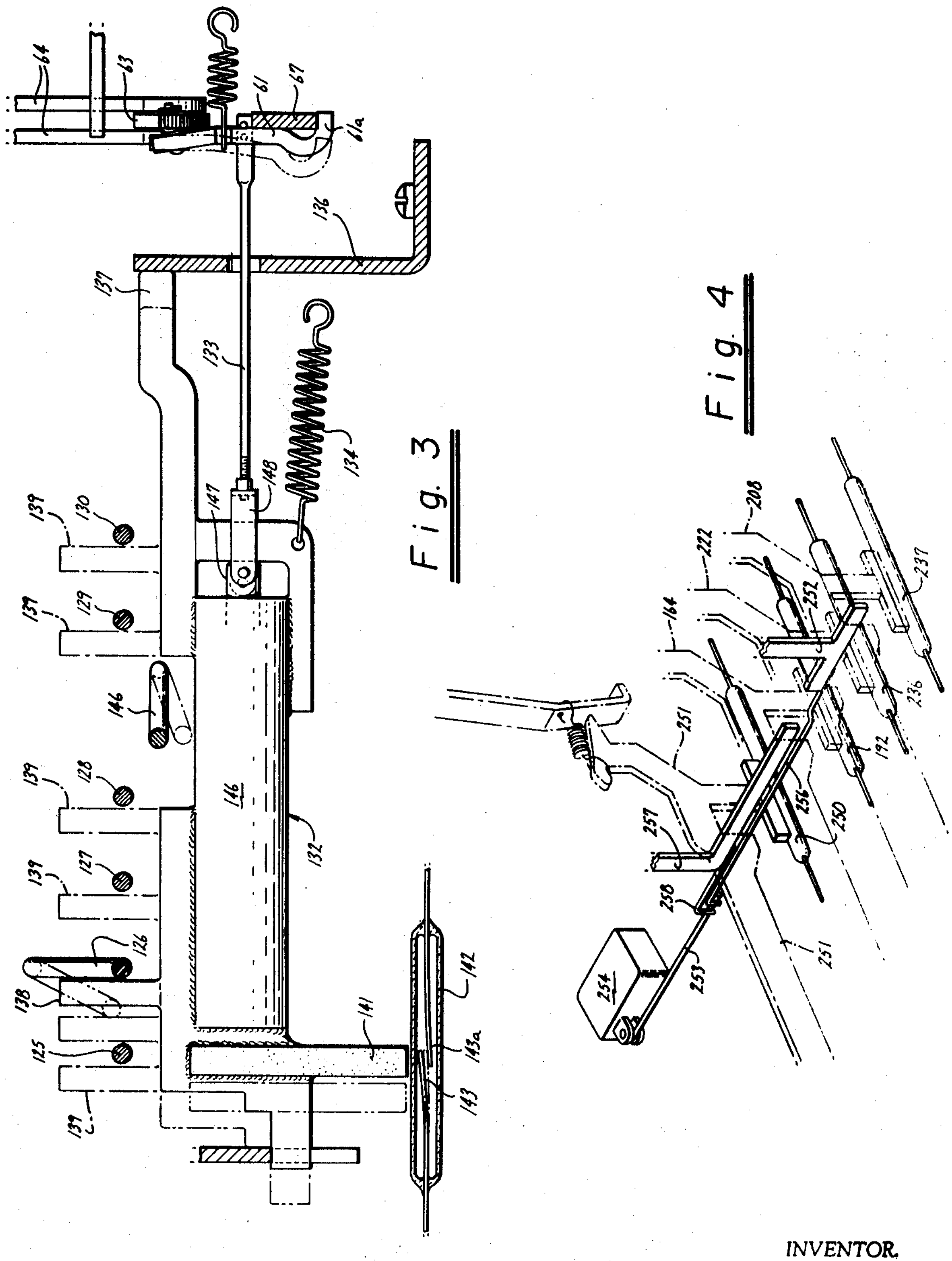
FIG. 3 is an enlarged side view of a typewriter latch interposer taken along lines III—III of FIG. 2.
FIG. 4 is an enlarged portion of FIG. 2 illustrating a typewriter operational control as modified by the present invention and wherein certain parts are shown in phantom.

Referring to FIGS. 2 and 3, each of the six latch interposers 132 (not all of which are shown) is urged toward its associated selector latch by spring 134. An upstanding stop 136 limits the movement of the interposer in the direction of its selector latch such that when the end 137 of the latch interposer contacts the stop 136 the selector latch 61 (for example) is disposed such that its forwardly extending lower portion 61*a* is situated below the latch bail plate 67. When these conditions prevail, the selector latch is urged downwardly when the latch bail is driven downwardly. The particular latch interposer illustrated in FIG. 3 is associated with selector bail 126 through its upstanding latch interposer lug 138. The phantom lines 139 represent the upstanding latch interposer lugs associated with the other five latch interposers. When interposer 107 is driven toward the front of the typewriter by filter shaft 19, selector bail 126 is carried with the interposer by selector lug 131. The connection between bail 126 and upstanding latch interposer lug 138 will result in the latch interposer 132 also moving toward the front of the typewriter. This operates to withdraw latch 61 from beneath the latch bail plate 67 and thus prevents the latch from being operated by the bail.

In order to indicate electrically that latch 61 or one or more of the other selector latches have been withdrawn from below the latch bail plate 67 each latch interposer 132 has a permanent magnet 141 integrally secured thereto and a glass-encapsulated reed switch 142 associated with the permanent magnet 141. Each switch 142 includes a pair of reed contacts 143 and 143*a* which are formed from a magnetic material and prestressed such that the overlapping ends of the contacts do not touch one another in the absence of any magnetic influence. When the magnet 141 is disposed adjacent the overlapping ends of the contacts, they become temporarily magnetized and their overlapping ends assume like polarities and thus repel one another. Under these conditions the contacts do not touch.

When the interposer 132 is in its normal position (the end 137 of the interposer abutting the stop 136) the magnet 141 is positioned adjacent the overlapping ends of the contacts 143 and 143*a*. When the interposer is moved toward the front of the typewriter, in response to a selector bail contacting the interposer's upstanding lug, the magnet 141 moves away from the overlapping ends of the contacts toward the front of the typewriter (phantom lines). As the magnet 141 is carried toward the front of the typewriter, it passes away from contact 143*a* and the significant magnetization lies in contact leaf 143. The magnetic field of contact leaf 143*a* becomes more closely associated with contact leaf 143 than with magnet 141, and contact leaf 143*a* assumes the same polarity as contact leaf 143. This results in the overlapping ends of the contacts having unlike magnetic polarities causing the two contacts to attract each other and make contact. When the latch interposer 132 returns to its normal position, as shown in FIG. 3, permanent magnet 141 returns to its position adjacent the overlapping ends of contacts 143 and 143*a*. The contacts 143 and 143*a* assume like signs and thus are forced open by this reversal of polarity association, which quickly overcomes any unlike-signs residual magnetism.

Thus each of the six latch interposers has associated therewith a switch which is normally open (contacts not touching) when the interposer is in its normal position and which closes (contacts touch) when the interposer is urged away from its normal position. By electrically detecting which of the interposer switches have closed and which remain open during a print cycle it is possible to know which of the characters or symbols is being printed. The particular manner in which the condition of the interposer switches is detected and used in the present invention will be described in detail below.

The particular arrangement of permanent magnets 141 and glass encapsulated switches 142 as set out above, provides a novel means for transducing the condition of selector latches into electrical signals and thus generating information signals. The specific means set forth has the distinct advantage over the prior art of requiring a minimum number of additions to the existing typewriter equipment.

As mentioned above, in addition to providing components which generate electrical signals that identify a particular character or symbol print operation it is also necessary to provide means by which the typewriter can be operated by electrical signals. As the foregoing description of the typewriter operation indicates, the depression of the key lever button 104 ultimately results in a specific combination of selector latches being withdrawn from their normal position together with the release of the cycle clutch latch. For the purpose of enabling this same combination of events to occur in response to electrical signals, each latch interposer 132 is provided with an electrically operated solenoid 146 which includes a longitudinally movable piston 147. The latch link 133 which connects the selector latch 61 (for example) to the latch interposer 132, is connected to the piston 147 by a clevis pin 148. When unenergized, the solenoid 146 and its piston 147 act as a rigid member so that the link 133 moves leftwardly with the latch interposer, thus enabling the typewriter to operate in its normal manner. Movement of the entire latch interposer, however, is only necessary to the extent that it results in the selector latch 61 being withdrawn from the latch bail plate 67. Thus the operation of the latch interposers is accurately simulated by any means which operates to withdraw selector latches. When the solenoid 146 is electrically energized its piston 147 retracts and draws the link 133 toward the front of the typewriter causing the associated selector latch to be withdrawn. Thus, while the latch interposer does not move, the selector latch is nonetheless withdrawn. By knowing which selector latches must be withdrawn in order to print a given character or symbol it is possible to direct an electrical signal to the typewriter which will be operative to select a desired character. The printing of this selected character or symbol is induced by removing the cycle clutch latch at approximately the same time that the specified selector latches are withdrawn.

A cycle clutch solenoid CCS is attached to the cycle bail 116 and operates when energized to pull the cycle bail downwardly. The downward movement of the cycle bail results in the same operation as previously described with reference to the clutch release lug 114.

The solenoid CCS operates in response to an electrical signal as part of the remotely operated machine. Separate means must be provided to generate such an electrical signal from a transmitting machine. To perform this signal-generating function there is provided on the cycle shaft gear 17 (see FIG. 7) a cycle shaft magnet 149 and an associated shaft switch 151 of the glass encapsulated reed variety previously described with reference to the latch interposers. When the cycle clutch is in its latched (disengaged) condition the magnet 149 is at right angles to the reed contacts of the switch 151 and thus provides no magnetic influence on the reeds. Under these conditions the switch is open. When the cycle clutch is unlatched the cycle shaft 14 rotates and the magnet 149 is positioned with relation to the switch so as to close the switch during the same interval the latch interposer switches (if involved) are closed. When magnet 149 approaches a position which is parallel to the position of switch 151 it causes the ends of the contacts thereof to have opposite magnetic polarities and attract one another. Under these conditions the contacts will touch and the switch will be closed. Thus each 180° cycle of shaft 14 results in a brief closing of switch 151. In the present embodiment all involved switches close at approximately 15° and open at 40° of rotation of shaft 14. At approximately 40° the latch interposers release and the remaining 140° of rotation of cycle shaft 14 is devoted to continuing to position the type head, printing and returning it to home position.

Thus through the use of only seven switches (six latch switches and one cycle shaft switch) and seven solenoids (six latch interposer solenoids and one cycle clutch solenoid) it is possible to electrically detect the fact that a typewriter is preparing to print a character or symbol and to determine precisely which character or symbol it will print and, further, the typewriter is capable of responding to electrical signals generated from a typewriter similarly equipped by operating the cycle clutch mechanism and withdrawing those selector latches necessary to position the type head in the precise manner necessary to print the desired character.

The present invention addresses itself primarily to the task of detecting the condition of the switches, transmitting that information over a two-wire transmission system and energizing those solenoids of a receive typewriter which will induce it to accurately and precisely imitate the operation of the typewriter at which the signal was generated. The particular manner in which the signal is generated and received, however, is also a portion of the present invention in view of the many advantages which accrue to performing the generating and receiving functions in the precise manner described above.

Referring to FIG. 7, a cam 156 is secured to the end of the print shaft 22 for rotation therewith. Associated with the cam 156 is a switch 157 (preferably a microswitch) which includes an actuating arm 158 that engages the cam 156. The cam 156 rotates one complete revolution for each 180° of revolution of cycle shaft 14 (180° of cycle shaft 14 corresponding to a complete print cycle). Early in the revolution of cam 156 (30° to 40°) switch 157 is actuated to an open condition from its normally closed condition. Later in the revolution of cam 156 (at approximately 120°), switch 157 is returned to its normal condition (closed). Switch 157 performs a function which is related to the memory section of the electrical signal translator which will be described in detail below.

b. Function Operation Mechanisms

In addition to the above-described print cycle, a typewriter necessarily performs several function operations. Like the print operation, function operations must be electrically identified and capable of being induced by electrical signals. The following description will explain how the IBM Selectric typewriter operates in performing a backspace, carrier return, index (line space), case shaft, space, and paper feed in order that it may be fully understood how the present invention advantageously equips the typewriter with means for electrically signifying that one or more of such operations is occurring, and with means by which the typewriter responds to electrical signals by performing one or more of these function operations.

Figures 5, 6:
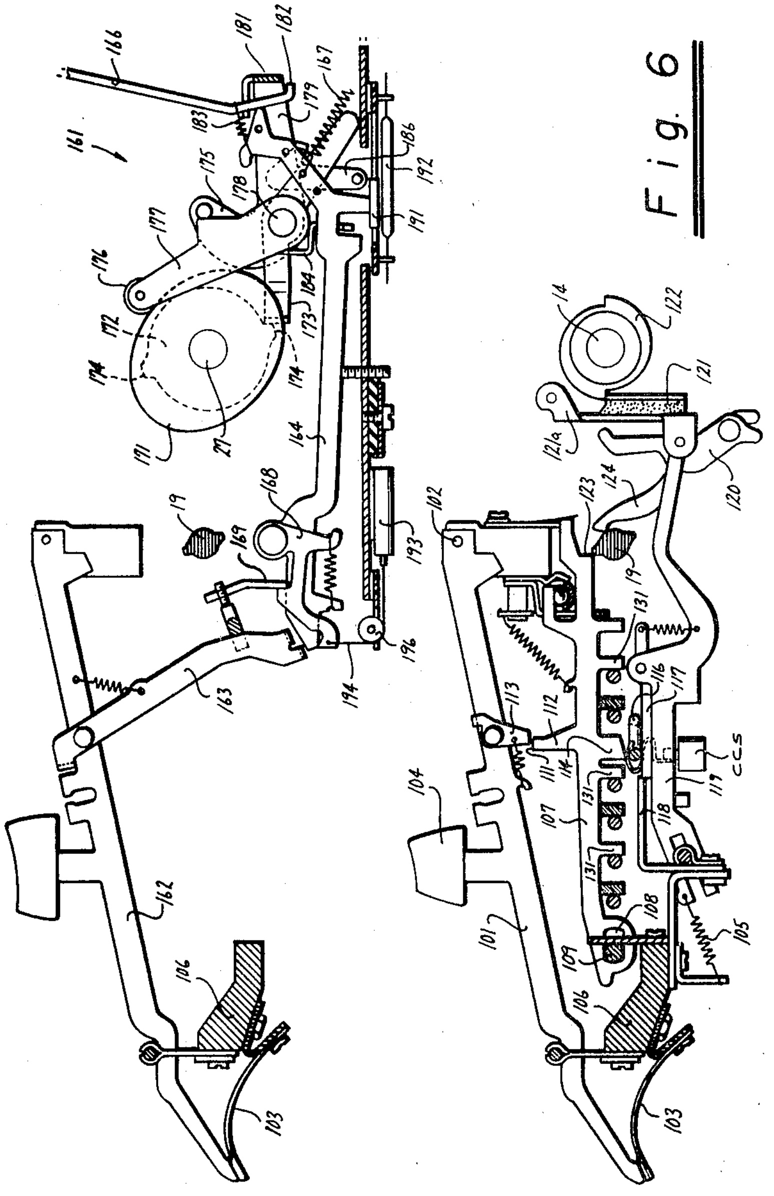
FIG. 5 is a side elevation taken generally along lines V—V of FIG. 2.
FIG. 6 is a side elevation taken generally along lines VI—VI of FIG. 2.

Referring now to FIGS. 2 and 5, the space/backspace operational control mechanism 161 is mechanically associated with a manually operable key lever 162 through key lever pawl 163 and interposer 164. The space operation has associated therewith a separate key lever, key lever pawl, interposer, and operational latch 166. Likewise, the backspace operation has associated therewith a separate key lever, key lever pawl, interposer, and operational latch. Both functions, however, share the operational control mechanism 161 which provides the power for carrying out one of the functions. A description of the operation of the control mechanism 161 to actuate the operational latch 166 is accurate for either space or backspace and thus the description which follows pertains with equal accuracy to both the functions.

A spring 167 is attached to the interposer 164 and urges the interposer toward the rear of the typewriter. An interposer latch 168 rotatably secured to the interposer 164 is spring loaded to rotate in a clockwise direction and engages the key lever pawl guide bracket 169 preventing the spring 167 from moving the interposer. When the key lever 162 is depressed, key lever pawl 163 engages the end of interposer 164 urging it downwardly and disengaging the latch 168 from the key lever pawl guide bracket 169 enabling the spring 167 to move the interposer toward the rear of the typewriter. This movement of the interposer 164 initiates the function of the operational control mechanism. The function of the operational control mechanism includes returning the interposer to its initial condition by urging it toward the front of the typewriter. As the interposer so moves, the front surface of the latch 168 acts as a cam which causes the latch to rotate until the key lever pawl guide bracket is reengaged.

The operational control mechanism includes an operational cam 171 which is mounted on a clutch wheel 172 that in turn is secured to the operational shaft 27 (see FIG. 7). The clutch 172 operates to prevent rotation of the cam 171 as long as clutch release arm 173 engages one of the diametrically opposed clutch wheel latch members 174. A roller 176, carried by a cam follower 177, engages the peripheral surface of the cam 171 and causes the cam follower to rotate about its pivot joint 178 when the cam rotates. The cam follower 177 engages a cam follower lever 175 which includes the horizontally extending arm 179. At one end of the arm 179 and extending at right angles therefrom is an operational latch engaging plate 181. Plate 181 is disposed slightly above and slightly in front of the lower forwardly extending portion 182 of the operational latch 166. Thus when the cam 171 causes the cam follower 177 to rotate in a clockwise direction, the cam follower lever arm 179 is urged downwardly. If the end 182 of operational latch 166 is urged under the plate 181 prior to the arm 179 rotating downwardly, the operational latch will be urged downwardly with the cam follower arm and induce the mechanism to which it is attached to perform the function which it is designed to perform (space or backspace).

The rearward end of the interposer 164 engages the lower portion of the operational latch 166 and is maintained in contact therewith by a spring 183. When the interposer 164 moves rearwardly in response to actuation of key lever 162, the operational latch 166 is urged rearwardly under the plate 181 and in position to be actuated. At the same time that the rightward motion of the interposer 164 urges the operational latch 166 rearwardly it also engages the clutch release arm lever 184 which disengages the clutch release arm 173 from the clutch wheel latch member 174 permitting the cam 171 to rotate. As the cam rotates, the cam follower 177 rotates clockwise engaging the cam follower lever 175 causing it to rotate clockwise whereby plate 181 is driven downwardly engaging the end 182 of the rearwardly urged operational latch 166.

As the cam follower arm 179 rotates clockwise, an interposer restoring lever 186 affixed to the arm 179 and extending in a generally downward vertical direction, engages the interposer 164 and drives it back towards its initial position. This movement of interposer 164 back to its initial position occurs prior to the clutch wheel latch member 174 rotating a full 180° whereby the other clutch wheel latch member engages the clutch release arm 173 causing the cam to stop after 180° of rotation. As previously explained, the interposer latch 168 reengages the key lever pawl guide bracket 169 whereby the mechanism is reset for operation the next time the key lever 162 is depressed. Both the space and backspace mechanisms operate through the operational control mechanism 161. Only that mechanism associated with the operational latch which has been urged rearwardly, however, will operate in response to the cam 171 rotating 180°. The other mechanisms will not be actuated as plate 181 will pass in front of the lower portion of their operational latch without driving it downwardly.

While only a single operational latch 166 and single interposer 164 have been illustrated, it has been pointed out above that there is a separate interposer and operational latch for the space function and a separate interposer and latch for the backspace function. In fact, the characteristics that distinguish between a space and backspace function taking place is that when the space function takes place the interposer associated exclusively with the space function moves rearwardly, then returns during the functional cycle. When a backspace function cycle takes place only the interposer exclusively associated with the backspace mechanism moves rearwardly, then returns during the functional cycle. For the purpose of providing means for electrically detecting the occurrence of a space or backspace function operation, and for determining which of the two is occurring both the space and backspace interposers have a permanent magnet, such as magnet 191, secured thereto. Disposed directly below each magnet is a glass encapsulated reed switch, such as switch 192, of the kind previously described with respect to the latch interposer 132. When the interposer is in its latched position, the magnet position enables the magnet to magnetize the contacts of the switch so that they repel one another and the switch is open. When the interposer latch is released and the magnet moves rearwardly, the magnet magnetizes the contacts of the switch to unlike signs and the contacts attract each other and are able to touch one another whereby the switch is closed. Since the switches can only close when a space or backspace operation occurs, it is possible by detecting the condition of the switches to determine whether or not one of the two functional operations is taking place.

In order to initiate a space or backspace operation in response to an electrical signal an electrically operated solenoid 193 is connected to the interposer latch 168 by a wire 194 that passes over a pulley 196. When the solenoid is energized it pulls the wire 194 causing the latch 168 to rotate in a counterclockwise direction releasing it from the key lever pawl guide bracket 169 in precisely the same manner as the latch is released when the key lever 162 is depressed. Thus by directing an electrical signal to the solenoid associated with the backspace interposer latch it is possible to initiate a backspace operation and by electrically energizing the solenoid associated with the space interposer latch it is possible to initiate a space operation.

As soon as any function interposer has been unlatched the solenoid may be deenergized since the mechanical operation has been triggered and further solenoid energization serves no purpose. In fact, the solenoid may be deenergized on the initial movement of the interposer and prior to the commencement of the cycling of the function mechanism.

Referring now to FIGS. 9, 10, 17 and 18, the carrier return key lever 201 and index key lever 202 operate through the same operational control mechanism 203 to actuate the carrier return operation latch 204 and the index pawl carrier link 206, respectively. The carrier return and index functions are not totally independent of one another inasmuch as a carrier return function includes an index function (line feed) and thus operation of the key lever 201 results in both carrier return operation latch 204 and index pawl carrier link 206 being actuated simultaneously. The index key lever 202 operates to actuate index pawl carrier link 206 alone to make it possible to line feed without accompanying carrier return.

The operational control mechanism 203 is similar to the operational control mechanism 161 previously described in detail with reference to FIG. 5. Thus the index key lever 202 has connected thereto a key lever pawl 207 (see FIG. 10*b*) which engages the end of the index interposer 208 when the key lever is depressed. The interposer 208 carries an interposer latch 209 that is released when the interposer is urged downwardly by the pawl 207 and which when released enables the interposer to move rearwardly (in the direction of the index pawl carrier link 206). The rearward movement of the interposer 208 results in rotation of the cam 211 which is mounted on a clutch wheel that rides on the operational cam shaft 27 (neither of which are shown) in much the same manner as the cam 171 and clutch wheel 172. A roller 212 carried by a cam follower 213 rides on the peripheral surface of the cam 211 causing rotation of the cam follower 213 about its pivot point 214. Pivotally connected to the end of cam follower 213 is a multiplying lever 216 one end of which is secured through a clevis pin 217 to the index pawl carrier link 206 and the other end of which is associated with a multiplying lever stop 218 which limits the movement of that end of the multiplying lever.

Rotation of the cam 211 produces reciprocating movement of the cam follower 213 which in turn imparts a reciprocating motion to the index pawl carrier link 206 through the multiplying lever 216 whereby the mechanism attached at the other end of the index pawl carrier link 205 is operated to produce a line space. The operational control mechanism 203 includes an interposer restoring lever 210 which operates during the rotation of the cam to relatch the interposer 208.

An index repeat lever 219 is positioned for actuation by the index key lever 202 when the key lever is depressed beyond the point necessary to merely unlatch the interposer 208. Since it forms no part of the present invention, the mechanism which is connected to the index repeat lever 219 will not be shown or described but it should be understood that depression of the lever 219 produces repeated indexing as long as the key lever is maintained in that depressed condition.

When the carrier return key lever 201 is depressed, a carrier return key lever pawl 221 secured to the key lever 201 engages the carrier return interposer 222 and urges it downwardly releasing the carrier return interposer latch 223 thus enabling the interposer to move rearwardly (toward the carrier return operational latch 204). The end 224 of interposer 222 carries a carrier return operational latch actuator 226 which engages the carrier return operational latch 204 and carries it along with the interposer 222 when the interposer latch 223 releases the interposer.

The cam follower 213 has secured thereto a carrier latch engaging plate 227 which has a normal position slightly above and slightly in front of the projecting end portion 228 of the carrier return operational latch 204. The plate 227 is urged downwardly when the cam operates the cam follower, and if the interposer 222 has not been released from its latch 223 the plate 227 will not engage the end portion 228 of latch 204. If the interposer 222 has moved in response to its latch being disengaged, however, the carrier latch 204 will be positioned by operational latch actuator 226 to a position below the plate 227 just prior to the plate moving downwardly and will thus be urged downwardly along with the plate 227 as the cam follower responds to the rotation of the cam 211. The downward motion of the latch 204 results in the carrier return mechanism secured to the other end thereof (see FIG. 9) being operated resulting in the carrier returning to its home position. The operation of the cam 211 in response to release of interposer latch 223 results in a reciprocating motion of link 206 which is identical to that produced when the interposer 208 is unlatched in response to depression of the index key lever 202. Thus each carrier return operation necessarily includes a line space operation since the link 206 is operated each time the cam follower 213 is driven by the cam 211 which as fully explained, occurs in response to depression of carrier return key lever 201.

The carrier return key lever pawl 221 includes an index interposer latch release lever 231 which unlatches the index interposer latch 209 when the key lever 201 is urged downwardly below the position necessary to merely initiate a carrier return operation. While the release of interposer 208 is not necessary to induce both a carrier return and index function, it is necessary if repeated indexing is desired in response to depression of key lever 201.

Thus, an index operation in response to depression of the index key lever 202 is uniquely characterized by the movement of the single interposer 208 while the carrier return and index operation (not repeat) is characterized by the movement of single interposer 222. Thus by detecting the movement of interposers 208 and 222 it is possible to positively determine whether an index operation or a carrier return operation is taking place. Accordingly, the carrier return interposer 222 has affixed thereto a permanent magnet 233 and the index interposer 208 has affixed thereto a permanent magnet 234. Disposed directly below the magnet 233 is a glass encapsulated reed switch 236 and disposed directly below the magnet 234 is a similar glass encapsulated reed switch 237. Both of the switches are magnetized by their respective magnets to repel the contacts when the interposers are in their latched position whereby the reed contacts are separated from one another and the switches are open. When an interposer becomes unlatched and moves rearwardly, the magnet changes its position relative to its associated switch and magnetizes the reed contacts thereof to attract one another and the switch thus closes. In this way the present invention provides switching means which accurately reflect whether or not a particular typewriter function operation has been initiated. As in the previously discussed typewriter functional operations and character print operation the means for detecting particular operations as taught by the present invention does not require any modification of the existing typewriter equipment and the necessary attachments are of a relatively simple nature. Most importantly the attachments which enable the typewriter to electrically identify the operation which it is performing in no way interfere or alter the normal operation of the typewriter as a stenographic machine.

In order for the typewriter to perform a carrier return and index operation in response to electrical signals, the interposer 222 has associated therewith a solenoid 238. The solenoid 238 is associated with the interposer 222 through a wire 241 which is connected to the actuating portion of the solenoid and passes over a pulley 242 before connecting to the end of the interposer latch 223. When the solenoid 238 is electrically energized the wire 241 pulls the latch 223 downwardly releasing the latch and enabling the interposer 222 to move rearwardly. To the interposer the result is identical with that produced by depressing the key lever 201. Again, once the interposer is unlatched further solenoid energization is not required.

In addition to switches 236 and 237 there is also a normally closed switch 246 (preferably of the microswitch variety)

disposed below the multiplying lever 216 such that the switch actuating arm 247 contacts the arm 216 and is urged downwardly each time the arm operates as part of the line feed operation. The switch 246 is part of the electrical circuitry which enables the receive typewriter to single line feed or double line feed depending on the condition of the line feed control 239 (FIG. 10a) of the transmit typewriter.

A switch 248 is located below the index key lever button 249 and is actuated each time the key lever is depressed. Switch 248 is a part of the electrical circuit to be described below and serves as a remote OFF switch while the transmit typewriter is in lower case for turning off a remote typewriter and ringing the signal bells at the transmit and remote typewriters while the transmit typewriter is in upper case.

Because of the fact that it is possible to line feed by actuation of the carrier key lever 201 many typewriters do not include a separate index key lever. The only disadvantage of not having a separate index control is that all indexing operations must start with a carrier return. Thus in the present invention the key lever 202 is disconnected from the interposer 208 and employed instead as a remote OFF and bell button. Since this disables the typewriter from indexing without first carrier returning, it is unnecessary to provide electrically responsive means for initiating indexing without carrier return and thus no separate solenoid is provided for latch 209.

The single line feed and double line feed control (see FIG. 10a) includes a manually positionable control lever 239 (of the transmit typewriter) mounted on a shaft 243 and having two positions—one for single line feed at the receive typewriter and one for double line feed at the receive typewriter. By selecting one position or the other the transmit operator is able to single line feed or double line feed at the remote typewriter regardless of the line feed conditions selected for the transmit typewriter. In the single line feed position the lever 239 contacts the actuator button 244 of double line feed switch 235, and removes a stop lug 245 from below the repeat bail 240. In the double line feed position the actuator 244 is released and the repeat bail is prevented from operating by lug 245. The significance of the two sets of conditions will be made clear in the description below.

Referring now to FIG. 4, the switch 192 associated with backspace interposer 164, switch 236 associated with carrier return interposer 222 and switch 237 associated with index interposer 208 together with a switch 250 which is associated with the space interposer 251 previously described are all physically disposed in close proximity to one another by virtue of the close grouping of the interposers associated with the four functional operations described above. A T-shaped switch-actuating plate 252 is operatively associated with the carrier return and index interposers (see also FIG. 10) in such a way that movement of either interposer due to being unlatched results in movement of the switch plate 252. The plate 252 is mechanically associated with the actuating arm 253 of a function memory release control switch 254 through an extension arm 256 which is rigidly secured to the plate 252 at one of its ends and in abutting relationship to the actuating arm 253 at its other end. When the plate 252 is moved in response to movement of either interposer 222 or interposer 208 moving, the switch 254 is actuated by virtue of its actuating arm 253 being moved by the arm 256. An L-shaped actuating plate 257 is operatively associated with the space and backspace interposers (see also FIG. 2) and is mechanically associated with the switch actuating arm 253 through an extension arm 258 and operates to actuate the switch 254 when either the backspace interposer or space interposer moves during a function operation. Thus, whenever one of the four functional operations described above is initiated through unlatching of an interposer the function memory release control switch 254 (FMR) is actuated. The purpose of this switch will be made clear during the detail description of the translator which will be set out below.

As previously mentioned, shift arm 53 (see FIGS. 11, 15 and 16) has two possible positions, one of which corresponds to the type head 31 being positioned for lower case printing while the other corresponds to the head being positioned for printing in upper case. The position of shift arm 53 is dependent upon the position of a cam 273, the camming surface of which engages a roller 274 carried by the shift arm 53. The shift arm is pivotally mounted on a shaft 276 for movement away from or toward the rotate arm pulley 47 for the purpose of operating the rotate pulley 33.

The cam 273 is mounted on the operational shaft 27 but does not rotate therewith unless a clutch mechanism generally indicated as 277 secures the cam to the shaft. A shift release arm 278 is mounted for rotation about a shaft 279 and operates in its normal position to maintain the clutch mechanism 277 in that position which prevents the cam 273 from rotating with the shaft 27. When the shift release arm 278 is disengaged from the clutch mechanism as by a shift release link 281 being pushed toward the rear of the typewriter, the cam is connected to the shaft 27 resulting in 180° of rotation of the cam.

The cam 273 is disc shaped and has a peripheral thickness which varies from that shown in FIG. 15 to that shown in FIG. 16. When the narrowest peripheral thickness of the cam is disposed between the shift arm cam roller 274 and a roller 282, the band 46 is able to urge the pulley 48 toward the rotate arm pulley 47 until the shift arm adjustment screw 283 contacts a stop 284.

When the clutch release arm allows the cam to rotate with the shaft 27 the thickest peripheral portion of the cam 273 is disposed between the roller 274 and the roller 282 causing the arm 53 to rotate in a counterclockwise direction (as illustrated in FIG. 16) thus shifting the pulley 48 away from the pulley 47 and thereby inducing the head 31 to assume the upper case position.

When the shift release arm 278 is urged back to its lower case position (the position shown in FIG. 11) from an upper case position, the cam once again is allowed to rotate with the shaft 27 until the lower case position is once again achieved at which time the clutch between the shaft and the cam operates to prevent further rotation of the cam.

The shift mechanism is operated by depressing either shift key 286 or shift key 287 both of which engage a shift bail 288 which connects to shift release link 281 through a bellcrank arrangement 289. When the shift release arm 278 is in its lower case position and bail 288 is rotated in response to either key lever 286 or 287 being depressed, the rotation of the bail is transferred through bellcrank 289 to link 281 causing the shift arm 278 to rotate counterclockwise (as illustrated) about its shaft 279. This places the shift arm 273 in its upper case position which as previously described results in the cam 273 urging shift arm 53 to its upper case position. As long as the key lever is maintained in its depressed condition the release arm 278 will stay in its upper case condition and the head 31 will also remain in that position which produces upper case characters and symbols. Release of the key lever causes the bail 288 to rotate back to its rest position which in turn causes the release arm 278 to resume its lower case position which as previously described causes the cam 273 to rotate back to that position which places the shift arm 53 in its lower case position.

When either key lever 286 or key lever 287 is depressed in response to pushing key lever button 291 or 292, respectively, the shift which results therefrom will only be maintained as long as pressure is applied to the key lever button. A third key lever button 293, however, associated with shift key lever 286 has associated therewith a lock mechanism 294 which operates to hold the key levers 286 and 287 in a partially depressed condition after pressure is released from the key lever button 293. To release the lock mechanism 294 it is necessary to depress the key button 291 or key button 292 as if to initiate an upshift.

Interlocking mechanisms are provided in an unmodified Selectric typewriter to prevent a space function or case shift from occurring during any print operation, and vice versa.

However, any of the functions together with the case shift may occur concurrently. As an example, if the space key lever and the case shift key lever are operated at the same time the typewriter will respond by performing both a space operation and change of case (180° rotation of type head) simultaneously. The effect of this is that the typewriter has performed the two operations in one cycle period of the typewriter. The important significance of this inherent feature of the typewriter will be explained later with reference to the case verification principle.

In order for the shift mechanism 54 to be responsive to electrical signals a solenoid 296 is connected to the shift release arm 278 through a solenoid link 297. When the solenoid is energized it retracts the link 297 causing a rotation of the link 278 which is identical with the rotation which it experiences when one of the key levers 286 or 287 is depressed. Mechanically associated with the solenoid 296 is a relay 298 which operates through lever 295 to maintain the solenoid in a retracted position even after the termination of the energization which initially retracted the solenoid. Thus when the solenoid is energized for the purpose of placing the shift arm 53 in an upshift position, the relay 298 operates on the solenoid to maintain the shift arm in that position until a downshift signal is received. When the shift mechanism is changed from an upshift to a downshift condition, the relay 298 receives an electrical signal which causes the lever 295 to be drawn upwardly, which releases the solenoid. The shift release arm 278 is then able to rotate back to its lower case position.

Because of the fact that the present invention teaches a system wherein a given typewriter may be a transmitting typewriter one moment and a receiving typewriter the next, certain problems arise which are not present in a machine which is exclusively a transmit or receive machine, or which is simply used as a nontransmitting typewriter. Such a problem arises in connection with the shift mechanism of the typewriter. If, for example, the receive typewriter, which last received an upshift, is locked in upper case through mechanism 296, 297 and 298 and then the typewriter becomes the transmit typewriter, the following situation occurs. The relay 298 is holding the solenoid 296 in its upper case condition and will release it only upon receipt of an electrical signal. The mechanical upper case release does not override the relay solenoid upper case mechanism and thus the receive typewriter which has now become the transmit typewriter can only transmit in upper case. In order to overcome this problem a switch 299 is disposed below the key lever 286 and actuated whenever the key lever 286 is depressed. As will be more fully explained below the switch 299 is electrically associated with the relay 298 such that actuation of the switch causes the relay to release the solenoid 296 and thereby enables the transmit typewriter to operate in lower case.

Due to the flexibility of shift bail 288 the left shift key lever 286 never bottoms in its stroke when the shift occurs as the result of depressing right shift key button 292 or energization of upshift solenoid 296. The shift unlock switch 299 is disposed so as to remain in its normal state in both lower case and upper case conditions until downward finger pressure is exerted on key button 291 to bottom the key lever 286. This is the same technique an operator would use to release mechanical lock 294.

Another problem occurs when an attempt is made to remotely downshift a receive typewriter which has been left in a locked upper case position. Normally the electronic equipment associated with a system of the type described herein is designed to virtually eliminate upshift signals which occur when a typewriter is already in an upshift condition. For most operations this is satisfactory since it is a redundant signal and normally employed only as a case shift in the event that the typewriters are not properly case coordinated. Since the only way that a typewriter can be released from a locked upper case position is by actuation of the key levers as if to effectuate an upshift, the very signal needed to unlock the typewriter is eliminated by the accompanying electronic system. In order to overcome this problem a switch 301 is disposed in conjunction with the relay 298 and operated by lever 295. As will be more fully described below, the switch 301 is disposed in an electrical circuit which allows an upshift signal to operate the solenoid 296 when the switch is not actuated and which prevents an upshift signal from operating the solenoid 296 when the switch is actuated. Since the switch 301 is not actuated when the shift mechanism is either in lower case or locked in upper case by mechanism 294, the present invention provides means for unlocking a remote typewriter which has been locked in upper case through shift lock mechanism 294.

An elongated hole 278a is provided in shift release arm 278 to permit manual shifting without carrying upshift solenoid 296 piston to lock position. This means no electrical source is necessary to unlock the typewriter upshift solenoid 296 while in ordinary typing operation.

Mounted in close proximity to the shift arm 278 are a pair of switches 302 and 303 which are actuated each time the shift arm rotates about its shaft 279. A precise explanation of the operation of switches 302 and 303 will be set out below when the translator is described.

Mounted on the shift arm brace 305 is a switch bracket 304 which has a microswitch 306 and 307 mounted on either end. The microswitches 306 and 307 are mounted on the bracket 304 in such a manner that the actuating button of switch 306 is engaged when the shift mechanism is in its downshift condition (FIG. 15) while in that same condition the actuating button of switch 307 is unacted upon. When the shift mechanism is in its upshift condition (FIG. 16) the button of switch 307 is actuated and the actuating button of switch 306 is unacted upon. By disposing switch 306 in electrical series with switch 307 and making both of the switches normally closed switches, it is clear that in either the upshift or downshift states one of the switches is open and the circuit is noncontinuous. The only time that the two switches are both in their normal (closed) condition is that brief time when the shift mechanism is changing from an upshift to a downshift or vice versa. Thus the switches 306 and 307 operate to identify the fact that a shift is occurring and as will be more fully explained below the switch 302 operates prior to the actual cycling of the shift mechanism to determine if the impending shift is an upshift or a downshift.

Referring now to FIGS. 7 and 19, paper 259 is placed in the typewriter by placing it between the typewriter platen 261 and a deflector 262 and then manually rotating the platen by turning the handle 263. As the platen rotates, the paper is drawn between the platen surface and a rear feed roller 264 which firmly holds the paper to the platen and causes the paper to advance as the platen is turned. As the paper advances from the roller 264 it passes between a front feed roller 266 which directs the paper upwardly in position to receive the type head which strikes the platen during the print cycle.

For the purposes of the present invention the platen 261 is provided with a circumferential groove 267 which receives the actuating arm 268 of a switch 269 that is disposed in close relationship to the platen. When there is no paper in the machine the actuating arm 268 falls into the groove 267 and places the switch in an open condition. When paper is placed into the machine it forces the actuating arm 268 out of the groove 267 and causes the switch to close. As will be fully described in detail below, the translator circuit associated with the present invention makes it possible for a transmit typewriter to determine whether or not the switch 269 of a receive typewriter is open or closed and thus whether or not the receive typewriter is equipped with paper and in condition to receive a message. This provides a very important feature in that it prevents a message from being transmitted while the transmitting operator believes paper is in the remote typewriter. Without the benefits of this feature of the present invention it is possible for a message to be transmitted in the full belief that it has been received and the receive typewriter in no way even indicate that a message had been received but not recorded.

The foregoing description teaches an economical and highly advantageous means for modifying an IBM Selectric typewriter in a manner which results in the typewriter emitting an electrical signal each time it performs a print or function operation. The modifications taught above also make it possible for the typewriter to respond to electrical pulses by performing any of the print or function cycles which it is capable of performing in response to a manual signal. The particular modifications set forth above form a portion of the present invention but are not required for the overall system which is taught by the present invention. Thus those typewriters presently known in the art which generate electrical signals characterizing their operation and which are capable of responding to electrical signals by performing their various operations can be employed as part of the overall system of the present invention to the extent they are compatible with those components of the invention yet to be described.

The description which follows teaches that portion of the present invention which enables the signals generated by a transmitting typewriter to be conveyed over a two-wire transmission system such as telephone wires to a receive typewriter and effectively energize those solenoids necessary to induce the desired typewriter operation. Since a transmit typewriter characterizes a print operation by the condition of seven different switches and it is necessary for as many as seven solenoids of the receive typewriter to be energized simultaneously, it becomes apparent that in order for the typed information to be electrically transmitted over a two-wire transmission system some type of translating system must be electrically interposed between the typewriters.

TRANSLATOR

If selector latches 61, 62, 76, 77, 78 and 79 are arbitrarily assigned binary weights of 1, 2, 4, 8, 16 and 32 respectively, a code chart can be constructed which uniquely identifies each character and symbol that the typewriter prints by a particular number, where the number associated with a character or symbol is arrived at by adding the binary weights of all latches withdrawn during the print cycle of that character or symbol. A code chart constructed in this way is set out in FIG. 20 wherein of the 64 possible binary combinations, 44 are employed to uniquely identify the 44 upper case and 44 lower case characters and symbols carried by the type head. From the chart, it can be seen, for example, that the lower case letter *n* is printed when the latches having binary weights of 1,4 and 16 are withdrawn. And, in fact, when latches 61, 76 and 78 are withdrawn, the remaining latches produce the necessary rotation and tilting of head 31 to dispose the lower case *n* in a position to be printed. Due to the fact that the code is predicated on those latches which are withdrawn, instead of those latches which remain, the code, in fact, represents the discarded information as opposed to the information used. This is somewhat more advantageous due to the fact that it is the removal of corresponding latches in a remote typewriter which is the final result desired.

As previously described, a switch is associated with each of the selector latches and is changed from its normally open condition to a closed condition when the latch is withdrawn. By definition, an open switch is referred to as a "space" and a closed switch is referred to as a "mark" whereby every character is defined as a certain combination of marks and spaces. The letter *n* reading from the lowest binary weight to the highest is given by the following combination of marks and spaces: mark, space, mark, space, mark, space. Since all of the latches which are withdrawn during the print cycle of a particular character are withdrawn simultaneously, the particular mark-space pattern which defines that character is generated in parallel form which is not suitable for transmission over a two-line system. Accordingly, it is necessary for the parallel, six-bit (each space and each mark being considered a single bit) character to be translated into a six-bit serial pulse train which preserves the mark-space arrangement which defines the character which is being printed at the transmit typewriter and which is to be printed at the remote typewriter. To perform this function the present invention teaches a parallel-to-serial translator of a unique design having many advantages over parallel-to-serial translators now known in the art, most of which employ shift registers of one variety or another.

a. Transmit Logic

Referring now to FIG. 21, a transmit typewriter is characterized in general terms as a data source which is disposed to present information to six separate information channels. When the typewriter performs a print cycle, the switch associated with latch 61 provides information to channel 1 (CH. 1), the switch associated with latch 62 provides information to Channel 2 (CH. 2), the switch associated with latch 76 provides information to Channel 3 (CH. 3), the switch associated with latch 77 provides information to Channel 4 (CH. 4) and the switches associated with latches 78 and 79 provide information to Channels 5 and 6 (CHs. 5 and 6), respectively. Each channel is comprised of a space side (S) and a mark side (M) wherein each side has a normal state (not energized) and a set (energized) state. Except for CHs. 5 and 6, the space side of each channel has associated therewith a gate which is capable of directing an input signal presented thereto to one of two output paths. The particular path to which a gate directs an input signal depends on whether or not the space side of the channel with which the gate is associated is in its normal state or in its set state. The particular channel with which an S-gate is associated is identified by the numeral associated therewith. Thus, gate S1 is the gate which is associated with the S side of CH. 1 and operates in accordance with conditions thereof. In a like manner, the M-side of each channel, with the exception of CH. 1, has associated therewith a gate which directs an input signal to one of two possible paths depending on the condition of the M-side of the channel with which that particular gate is associated. The numerals associated with the M-gates identify the channel with which that gate is operatively associated.

Each time the data source (typewriter) generates a character, a signal is sent to an S-set device which responds to the signal by setting (energizing) the S-side of each of the channels (with the exception of CH. 6 which has no S side). At the same time that the S-set device is setting the S-side of each channel, the data source directs a signal to the M-side of each channel which is associated with a latch that has been withdrawn. Thus, using the example of the letter *n* which the chart of FIG. 20 shows to be expressed by a mark in CHs. 1, 3 and 5 and a space in CHs. 2, 4 and 6, the M-side of CHs. 1, 3 and 5 receive signals from the data source which are set. Actually, CH. 1 does not receive mark signals from the data source. That mark signal associated with CH. 1 is diverted to the Next Bit Interpreter (NBI) for reasons which will be made clear below.

Thus, channels represent a space condition (their associated latch has not been withdrawn) by having only their space side set, and a mark condition (their associated latches withdrawn) by having both their mark and space sides set.

At the same time that the S-set device energizes the S-side of the channels it also sends a signal to the Transmit Clock which responds thereto by generating a train of evenly spaced pulses all of the same polarity. The pulses from the Clock are directed to an output gate 306 which is capable of transmitting a mark (positive) pulse in response to a clock pulse or a space (negative) pulse in response thereto. Whether a mark or space pulse is generated in response to a clock pulse is determined by the Next Bit Interpreter. The NBI is a device having two states, one of which can be considered a normal state and the other a set (energized) state wherein the output gate 306 transmits a mark signal when the NBI is set and a space signal when the NBI is not set. The first pulse out of the Clock must induce the gate 306 to transmit a pulse which corresponds to the information associated with CH. 1. In our example of the letter *n*, CH. 1 is in a mark condition and thus the NBI must be energized when the first clock pulse is generated. In order for the NBI to be so properly energized, the mark information from the data source is not directed to CH. 1 but diverted to the NBI instead. A mark signal from the data source to the NBI results in the NBI being energized. Having been energized by the mark signal from the data source, the NBI conditions the gate 306 to transmit a mark signal in response to the first clock pulse and in this way the information associated with CH. 1 and the first transmitted pulse correspond to one another.

Simultaneously with the first clock pulse going to gate 306 it also goes to a Line Alternator, L/A, which operates to direct the clock pulse alternately to one of two output paths 307 and 308. The L/A directs the first pulse from the clock to path 307 which leads to the input of the S1 gate. The S1 gate has an output path 309 and an output path 311 to which the incoming pulse can be directed. When the S-side of CH. 1 is set, the S1 gate directs all incoming pulses to its path 311 and blocks them from path 309. Conversely, when the S-side of CH. 1 is not set all pulses coming into gate S1 are directed to path 309 and prevented from entering path 311. The path 311 has an associated branch path 312 which leads to the First Bit Latch device, 1st BL, which responds to a pulse by providing continuing energization for those sides of the channels which have been set (all S sides and selected M sides) so that the data source can be isolated from the information channels to prevent subsequent data generated by the data source from interfering with the data in the translator which has not yet been transmitted.

Thus, the first pulse from the clock passes through the Line Alternator, L/A, to the S1 gate from which it travels to the 1st BL which provides a source of energy for maintaining the information in the channels. Besides energizing the 1st BL, the pulse which passes through the S1 gate also enters the M2 gates which is associated with the S1 gate by the path 311. The M2 gate has a pair of output paths 313 and 314 which lead to the S side and M side of the NBI respectively. A pulse which passes over path 313 to the NBI places the NBI in its normal state such that the gate 306 is conditioned to respond to a clock pulse by transmitting a space signal. A pulse travelling over path 314 operates to energize the NBI which in turn conditions the gate 306 to respond to a clock signal by transmitting a mark signal. The M2 gate directs the incoming pulse to path 313 if the M-side of CH. 2 is not set and to path 314 if the M-side of CH. 2 has been set. Since the latch associated with CH. 2 is not withdrawn during the print cycle of the letter *n* the M-side of CH. 2 has not been set, and the pulse from S1 passes through gate M2 to path 313.

Thus the results after the first pulse from the clock is the transmission of the mark signal, the energization of the 1st BL, and the conditioning of the NBI to its normal state for the purpose of placing the gate 306 in condition to transmit a space signal.

The second pulse out of the clock is directed to the gate 306 which responds thereto by the transmission of a space signal by virtue of the NBI having been placed in its normal state. At the same time, the second pulse passes through the L/A to the path 308 which directs it through the S2 gate. The S2 gate has a pair of output paths 316 and 317 to which the incoming pulse can be directed. When the S-side of CH. 2 is set, the S2 gate directs incoming signals to path 316 and prevents them from entering path 317. A branch path 318 off of path 316 leads to the S-side of CH. 1 and a pulse transmitted over this path operates to deenergize (reset) the S-side of CH. 1 and place it in its normal state. The line 316 leads to gate M3 which has a pair of output paths 319 and 320 which leads to the S-side and M side of the NBI, respectively. Thus, the second pulse travels over path 308 to path 316 from which it branches off to the path 318 to reset the S-side of CH. 1. The pulse also travels over path 316 and enters the gate M3 from which it emerges on path 320 which leads to the M-side of the NBI. Since the M-side of CH. 3 was set, the M3 gate directed the incoming pulse to path 320. Had CH. 3 been in a space condition the M-side would not have been set and the incoming pulse to M3 would have been directed to path 319. Since the NBI receives a pulse from the M-path it becomes energized and thus conditions the gate 306 to transmit a mark signal in response to the next clock pulse.

The second pulse is thus seen to have performed three distinct operations which can be characterized as having connotations of past, present and future. The second clock pulse operated to deenergize the S-side of CH. 1 and in that regard operated on the past. It provided the pulse which initiated the transmission of the number 2 pulse to represent the condition of CH. 2 and in this regard is associated with the present. Its operation in conditioning the NBI has future connotations since the condition of the NBI determines what the gate transmits in response to the subsequent (in this case third) pulse. As will be seen from the following description, each pulse, with the exception of the first and last, operates to perform three distinct operations one of which is associated with the past, the other with the present and the third with the future.

The third pulse out of the clock is directed to the gate 306 and results in the transmission of a mark signal due to the NBI having been energized by the second pulse. The L/A directs the third pulse to path 307 and gate S1. By virtue of the fact that the second pulse deenergized the S-side of CH. 1, gate S1 is in its normal state and thus directs the input pulse thereto to path 309. Path 309 acts as the input to gate S1 which directs input signals to one of its two output paths 322 and 333. When the S3 gate is energized by virtue of the S-side of CH. 3 being energized, input signals are directed to path 333 which has a branch path 334 leading to CH. 2. The path 333 itself leads to gate M4 which has a pair of output paths 336 and 337 which lead to the space path and mark path, respectively, of the NBI. When the M4 gate is energized by virtue of the mark side of CH. 4 being energized, incoming signals are directed to path 337. When the M4 gate is not energized, incoming signals are directed to path 336. Thus, the third clock pulse enters gate S3 from which it travels over path 334 to deenergize CH. 2 and over path 333 to gate M4 from which it is directed to path 336 which leads to the space side of the NBI deenergizing the NBI and conditioning the gate 306 to transmit a space signal in response to the next clock signal.

Thus, the first three pulses from the clock have induced transmission of a mark, space and mark signal, in that order, corresponding to the mark, space, and mark conditions of CHs. 1, 2 and 3, respectively.

The fourth clock pulse is directed to gate 306 which responds thereto by transmitting a space signal due to the NBI having been deenergized by the third pulse. At the same time, the fourth clock pulse passes through the L/A to path 308 which leads to gate S2. Since the third pulse operated to deenergize the S-side of CH. 2, the S2 gate is deenergized and directs the incoming pulse to path 317 which leads to gate S4. Gate S4 has a pair of output paths 338 and 339 with input signals being directed to the former when the S-side of CH. 4 is set and to the latter when the S-side of CH. 4 is not set. A branch path 341 off of path 338 leads to CH. 3 and pulses directed over this path operate to reset the S-side of that channel. Thus, the signal which enters gate S4 is directed to paths 338 and 341 resulting in the resetting of the previously set S-side of CH. 3 and the presentation of a pulse to the gate M5 to which path 338 leads. Gate M5 has a pair of output paths 343 and 344 which lead to the space and mark sides, respectively, of the NBI. When the M5 gate is energized in response to the mark side of CH. 5 being energized, incoming pulses are directed to path 344 while path 343 receives the incoming pulses when the mark side of CH. 5 is not in a set condition. Since the mark side of CH. 5 is set for the letter *n*, the pulse traveling over path 338 passes through gate M5 to path 344 and operates to set the NBI and thereby condition gate 306 to transmit a mark signal in response to the next clock pulse.

The fifth clock pulse passes through gate 306 as a mark signal and passes through the L/A to the path 307. Gates S1 and S3 having been reset, the pulse travels over paths 309 and 322 to gate M6 to which path 322 leads. The pulse also travels over branch path 345 off of path 322 to CH. 4 for the purpose of resetting the S-side of that channel. Gate M6 has a pair of outputs 346 and 347 which lead to the space side and the mark side of the NBI respectively. When the M-side of CH. 6 has been set, pulses coming into gate M6 are directed to path 347 while path 346 receives pulses when the M-side of CH. 6 has not been set. Since our example does not include a CH. 6 mark condition, the gate M6 is in its normal state and the incoming signal passes over path 346 to the space side of the NBI causing it to be reset and thus condition the gate 306 to respond to the next clock pulse by transmitting a space signal.

It is noted that there is no S5 gate corresponding to the S-side of CH. 5. This is due to the fact that the fifth pulse is the last odd pulse in the six channel system illustrated in FIG. 21. Thus, there is no subsequent odd pulse to direct around CH. 6 and the necessity for an S-gate does not exist. This will be true of the penultimate channel in any system regardless of the number of channels employed.

The sixth pulse out of the Clock passes through gate 306 and as a space signal, corresponding to the space condition of CH. 6, and is simultaneously directed through the L/A to path 308 leading to gate S2. Gates S2 and S4 have been previously set to their normal state and thus the pulse travels over paths 317 and 339 to the 1st BL to which path 339 leads. A branch path 348 off of path 339 leads to CH. 5 and a pulse transmitted over that path results in the S-side of CH. 5 being reset. Since the S-side of CH. 5 does not operate an associated S-gate it would be possible to completely eliminate the S-side of CH. 5 and thus the connection therewith of the 1st BL and also path 348. As will be apparent in the description which follows, however, the S-side of CH. 5 is essential to proper operation of the translator as a receiving device and thus is a present for that purpose.

The effect of the sixth pulse on the 1st BL is to release the 1st BL from the channels whereby the channels are conditioned to receive another character from the data source.

In the foregoing description it becomes clear that each time a pulse is generated by the Clock an output is transmitted from gate 306 and the output is a mark or a space signal in accordance with the information which the data source placed in the six information channels. Thus, the first pulse transmitted from gate 306 corresponds to the information in CH. 1, the second pulse to the information in CH. 2 and so on through CH. 6. It is clear that the number of channels is merely a matter of choice which will be dictated by the needs of the system with which the present invention is employed and in no way affects the overall logic or theory of the present invention. In fact, the clock pulse current requirements do not increase as channels are added to the system.

There are several circuits or devices presently known in the art which can perform the functions of the channels and their S and M gates, the NBI, the S set, the 1st BL, the L/A, the Clock, and the gate 306. The present invention teaches a particular set of circuits and devices, some of which are new and novel, for realizing the functional operation described above. The preferred embodiment, to be described in detail, has many advantages over other means for realizing such a device but does not necessarily limit the invention to this one approach.

Thus, to summarize the transmit portion of the translator: as the typewriter cycles it supplies information to the channels of the translator and this information is employed to generate a series of pulses which is a sequence of mark and space signals which correspond to the sequence of mark and space signals which form the parallel information provided by the data source. A print cycle on a typewriter takes approximately 64.5 ms. The total time required by the translator of the present invention to translate the parallel information into serial information and transmit this information to a second translator which translates the information back into parallel information, is approximately 50 ms. This 50 ms. time for translation is achieved using the particular components which will be described below. By virtue of the ability of the present invention to operate considerably faster than an associated typewriter, it is apparent that the present invention has solved the serious problem of the typewriter overrunning the transmission system and thereby limiting the ultimate transmission speed of information by such a system.

The transmit logic of the present invention is a contribution to the art aside from its relation to the overall communication system taught herein. The transmitter is a parallel-to-serial converter which has many advantages over shift registers which are popularly used for converting purposes. The logic of the transmitter teaches a converter which does not tax the driver pulses as a function of the number of channels. Since each incoming pulse goes directly to the channel with which it is associated and no other, the energy requirements of information pulses is totally independent of the number of channels in a system. This makes it possible to design systems with very large numbers of channels without creating a serious problem as to the energy level of information pulses.

The logic of the transmitter also teaches, for the first time, a converter which does not require a counter to inform the system when a complete code character has been converted. The complete elimination of a counter greatly simplifies the converter and thereby reduces its cost while increasing its reliability. Also, the gates associated with the converter of the present invention operate, on the average, only one third as often to convert a six-bit code as the corresponding gates of a shift register. This becomes even more significant as channels are added. This results from the arrangement whereby each channel operates only once for each code conversion.

The foregoing description of the transmit portion of the translator of the present invention was made with reference to a typewriter character print cycle which was characterized by the operation of a six-latch system having six switches associated therewith. When a function operation is performed by the typewriter, generally only a single switch is operated as a result thereof and this single switch does not in itself provide enough information to enable it to be sent directly to the translator. Accordingly, it is necessary that each switch which identifies a particular functional operation be associated with a matrix which is described in U.S. Pat. No. 3,453,379. The output of this matrix is a six-bit signal suitable for properly energizing the channels of the transmit portion of the translator in essentially the same manner described above. Once the channels are properly energized the operation of the transmitter proceeds in the identical manner described above.

b. Transmit Circuits

The logic circuit of FIG. 21 is advantageously realized with the use of control modules formed from glass encapsulated reed switches disposed within multiple wound coils. The use of glass encapsulated reed switches within multiple wound coils for logic circuit operations is well known in the art, although it is a technique which has found relatively widespread use in only the last several years. Switching circuits employing coil-operated glass reed switches are extremely versatile, small, quiet and relatively low cost and are most advantageously used in situations which do not call for extremely high-speed operation. In the present invention the output from the clock is set at 120 pulses per second which is a speed well within the capability of glass reed switches thus making it unnecessary to employ less versatile and more costly solid-state switches. Because of the fact that glass reed switches' lives are extended in circuit operations which do not require load switching (in most instances there is no voltage potential on the individual switch elements during contact transfer), these switches are capable of operating over long periods of time with high degrees of reliability. These circuits are often referred to as dry switching circuits.

The control modules used in the present invention employ single-wound coils, as well as double-wound coils, which surround glass reed switches, some of which are normally open and some of which are normally closed, as well as single-pole double-throw switches which are the equivalent of two parallel switches one of which is open when the other is closed and vice versa.

When a normally open, single-pole, single-throw glass reed switch is disposed within a double-wound coil, for example, and one of the windings is energized, the switch closes. The switch can be open or restored to its normal state in one of two ways. Either the energized winding can be deenergized in which case there is no source of a magnetic field to act upon the glass reed switch, or else the other and oppositely polarized winding of the double-wound coil can be energized for the purpose of counteracting the effect of the winding which was initially energized to close the switch. Thus when both windings of a double-wound coil (each winding developing an oppositely polarized magnetic field to the other) are energized they cancel the effect of one another and the switch assumes its normal condition. When a winding is energized for the purpose of counteracting an associated winding, it is referred to as a buck-down coil and the entire coil module is said to have been bucked-down. The primary logic of FIG. 21 is advantageously realized through the use of glass reed-coil modules as will be seen from the following description. With regard to certain of the switches it is advantageous, however, to employ a small number of solid-state switching devices where a load must be switched.

The schematic symbol which is most widely used to indicate a glass encapsulated reed switch is a pair of spaced-apart parallel straight lines which are perpendicular to the lines representing the circuit conductors in which the switch is electrically disposed. It is recognized that this same symbol has been used to represent a capacitor, but confusion is avoided in the present application by using a straight line and an arched line in spaced-apart opposing relationship to represent a capacitor as has become the symbol more widely used in the past several years. A glass-encapsulated reed switch which is normally open is represented by a pair of spaced-apart parallel straight lines as mentioned above, while a normally closed switch is represented by the same two spaced-apart parallel straight lines with a single slash line drawn through the two parallel lines. Because of the fact that a single coil (whether it be single-wound or double-wound) will usually surround a plurality of switches, and these switches are almost always in circuits remote from the circuit of the coils which determine their state, it becomes necessary to adopt an identification convention which will make it readily apparent which switches are associated with which coils. Thus, all of the switches which are associated with the S-side of CH. 1 (i.e., which change their state when the S-side of CH. 1 is energized and which are in their normal state when the S-side of CH. 1 is not energized) are identified as S1*n* switches where the number *n* is used to distinguish between the several switches which may be operated by the S-side of the CH. 1. Similarly, the switches associated with the M-side of CH. 2, for example, are identified as M2*n* switches. A similar convention is adopted for the other modules (i.e., NBI, L/A, etc.) and will be explained as the need arises.

Figure 22:
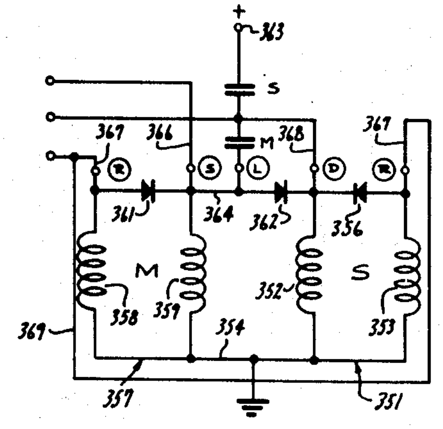

FIG. 22 illustrates a circuit which is advantageously employed to perform the functions previously described as being performed by CHs. 2 through 5. CHs. 1 and 6 employ a somewhat different circuit which will be described below. Referring now to FIG. 22, the S side 351 of the channel includes a double-wound coil comprised of winding 352 and 353. The windings are wound on a common core with voltage applied in opposite directions so that when both windings are energized, they cancel (buck down) the effect of one another. The windings are electrically joined at one end by a conductor 354, which is grounded, while the other ends are connected through a diode 356. The diode is oriented such that it presents a low-resistance current path from winding 353 to winding 352 and a high-resistance path in the opposite direction.

The M-side 357 of the channel includes a double-wound coil comprised of windings 358 and 359, which are wound on a common core such that when both windings are energized they cancel the effect of one another. One end of each winding is connected to ground through conductor 354 while the other ends are joined through a diode 361 which is oriented to establish a low resistance path from winding 358 to winding 359 and a high resistance path in the opposite direction. Diodes 361 and 356 are electrically connected through a diode 362 which is oriented to establish a low resistance current path in the direction of diode 356 from diode 361. A normally open M switch (a switch which is controlled by the windings of side 357 of the channel) and a normally open S switch (a switch which is controlled by the windings of side 351 of the channel) are electrically joined in series between a positive voltage source 363 and the conductor 364 which joins diode 361 to diode 362. The circuit between source 363 and conductor 364 is commonly referred to as the latch line circuit and identified by an L in a circle. Both the M-side 357 and the S-side 351 of the channel can be set (one winding of each energized) by a single pulse on the set line 366 (the set line being identified by an S in a circle). The set line is electrically connected to conductor 364 and a pulse on the set line is directed down the winding 359 of the M-side of the channel and winding 352 of the S side of the channel. Diodes 361 and 356 prevent the windings 358 and 353, respectively, from receiving the set pulse. As the pulse energizes the windings 359 and 352 the switches associated with each side of the channel are changed from their normal state to their energized state. Thus the M and the S switches close. When the M switch and S switch close a complete circuit is established between the source of potential 363 and the line 364 whereby windings 359 and 352 are provided with a source of energization which continues after the duration of the set pulse ends. The voltage magnitude of the set pulse is designed to be approximately equal to the magnitude of the voltage magnitude of the source 363 so that when the S and M switches change from an open to a closed state (which occurs during the duration of the set pulse) they are not required to switch a load. All of the other switches associated with the M and the S sides of the channel (which are not shown in FIG. 22) also change from their normal state to their energized state and remain so energized as long as only one of the windings of the coil with which they are associated is energized.

Reset conductors 367 (indicated by an R in a circle) are electrically connected by conductor 369 and together therewith connect the diode-isolated winding 358 of coil 357 with the diode-isolated winding 353 of coil 351. When both sides of the channel are set and a pulse is established on the reset conductors 367 the pulse travels down windings 358 and 353 and operates to buck-down the associated coils 359 and 352 and thus restore the switches associated with the coils to their normal state (the channel is reset). When both the M and S sides of the channel have been bucked down, the M and S switches both open whereby the latch line no longer makes a source of potential available to windings 359 and 352. An important feature of the reset line is that a pulse established thereon is not exclusively directed to windings 358 and 353, but is also available to windings 359 and 352. This is important to insure that the coils remain bucked down for the duration of the reset pulse.

A direct conductor 368 (identified by a D in a circle) electrically connects the juncture between the M and S switches with the juncture between diodes 362 and 356. When a pulse is established on the direct line 368 it operates to energize the winding 352 of S coil 351 exclusively and thus set only the S side of the channel. The connection between the S switch and winding 352 by the direct conductor enables the winding 352 of S-coil 351 to be latched to source 363 even though the M switch remains open. Thus, a pulse on direct conductor results in the S-side of the channel setting while the M side remains unset. In order to reset the S-side when it has been set by a pulse on the direct conductor, the reset conductor 367 is again pulsed resulting in winding 353 bucking-down winding 352 whereby the S-switch is opened and no longer provides a path between the winding 352 and the voltage source 363.

It should be noted that as either the M-latch switch or the S-latch switch begins to open there is no arc since as either switch opens and the resistance in that particular circuit increases as the result of the contact separation the voltage potential for windings 352 and 359 is supplied through reset conductors 367 until the end of the reset pulse.

By properly directing pulses to either the set, reset or direct conductors of the channel it is possible to perform all of the functions which CHs. 2–5 were described as performing in the description given above with reference to FIG. 21.

Figure 23:
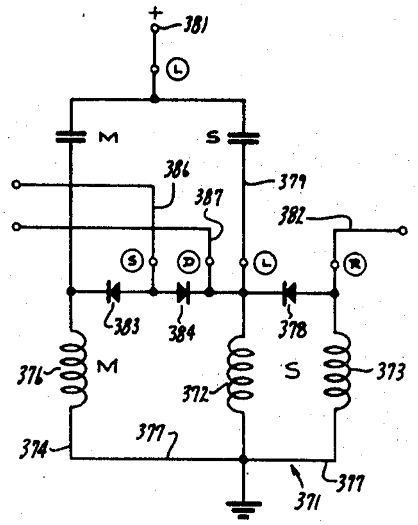

Referring now to FIG. 23, CH. 1 includes a space side 371 including a double-wound coil comprised of windings 372 and 373, and a mark side 374 which includes a single-wound coil 376. The space side of CH. 1 is similar to the space sides of CHs. 2–5 in that one end of each winding is grounded through a conductor 377 and the other ends of the windings are connected through a diode 378 which is disposed to provide a high-resistance current path in the direction of winding 373 from winding 372. Connected to the winding 372 at its nongrounded end is a latch line 379 which includes an S-switch that is normally open and separates the latch line from a voltage source 381. The nongrounded end of winding 373 is connected to a reset line 382.

One end of coil 376 is connected through line 377 to ground while the other end is connected to diode 378 through a pair of series-connected diodes 383 and 384 wherein the anodes of these diodes are connected to each other and the cathode of diode 381 is connected to the winding 376, and the cathode of diode 384 is connected to winding 372 and the cathode of diode 378. A set line 386 is electrically connected between the diodes 383 and 384 while a direct line 387 is connected between the diodes 384 and 378. An M-switch, which is normally open, is electrically disposed between the source 381 and the nongrounded end of coil 376. As previously described with reference to FIG. 21, CH. 1 does not receive mark signals from the data source and thus it is not necessary to provide CH. 1 with means for storing a mark signal during the transmit cycle. The single mark coil 376 which is present in the CH. 1 is for receiving purposes and its operation will become clear when the receive portion of the invention is described. Thus when the translator operates as a transmitter, CH. 1 receives only an S-set signal which results in a pulse on direct line 387 and winding 372. A pulse through winding 372 results in it being latched to source 381 due to the S switch closing. A pulse on the reset line 382 operates to energize winding 373 which bucks-down winding 372 and causes the S-switch to open and remove the source from the S-side of the channel. A pulse signal on set line 38 results in both the mark and space sides of the channel being set, and since the reset line 382 does not operate to reset the M-side of the channel, the only way of resetting the M-side of CH. 1 is to remove the source of voltage from the latch line, and thereby open the M switch. As will be shown in detail below, the circuit of the preferred embodiment of the present invention includes means for removing the source 381 and thereby resetting the coil 376.

Figure 24:
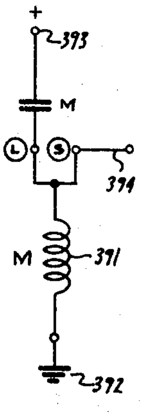

Referring to FIG. 24, CH. 6 is formed from a single coil 391 which is electrically disposed between ground 392 and a source of voltage 393 with an M-switch electrically disposed between the source 393 and the coil. The line in which the M switch is disposed acts as a latch line while a line 394 connected to the ungrounded end of coil 391 acts as a set line. A pulse on the set line operates to energize coil 391 and thus close the M-switch which is normally open. This results in the coil being latched to the source 393. There is no reset line since there is no buck winding and once again the only means for resetting the coil is to remove the source 393.

The previous description of the operation of CH. 6 stated that it does not need a space side for operation as part of the transmitter. The description of the receive portion of the translator which will be given below shows the CH. 6 does not enter into the receive function and thus the needs of the transmit operation dictate the design of CH. 6.

Figure 25:
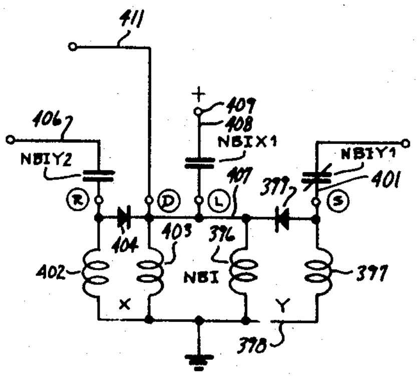

Referring to FIG. 25, the NBI has an X side and a Y side each including a double-wound coil. The double-wound coil of the Y side is comprised of a winding 396 and a winding 397 which are connected at one end by a conductor 398 leading to ground, and at their other end by a diode 399, the anode of which is connected to winding 397 and the cathode of which is connected to winding 396. Electrically connected between diode 399 and winding 397 is a set line 401 which includes a normally closed Y switch NBIY1. The double-wound coil which forms the X side of the NBI comprises a winding 402 and a winding 403 which are joined at one end by conductor 398 which lead to ground. The other ends of windings 402 and 403 are joined through a diode 404 which presents a high-resistance current path from winding 403 to 402 and a low-resistance current path in the opposite direction. Electrically connected between diode 404 and winding 402 is a reset line 406 which includes a normally open Y switch NBIY2. The diodes 404 and 399 are electrically joined by a conductor 407 to which a latch line 408, leading to a voltage source 409, and a direct line 411 are electrically joined. The latch line includes normally open switch NBIX1 which is controlled by the X side of the NBI.

When the set line 401 of the NBI is pulsed; the diodes 399 and 404 direct the pulse down windings 397, 396 and 403. The presence of a pulse in both windings 396 and 397 prevents the Y-side of the NBI from setting while the X-side sets by virtue of the fact that the single winding 403 is energized while winding 402 is not. The setting of the X-side operates to close the switch NBIX1 providing a source of potential to the winding 403 which is not terminated when the pulse ends. As long as the pulse is in the circuit, windings 396 and 397 buck each other and prevent the Y-side from setting. When the pulse ends, however, the latch line 408 supplies a source of potential to winding 396 which is not available to winding 397 and the Y-side sets. Thus, while the set pulse is in the circuit only the X-side of the NBI sets, while when the pulse ends the Y side also sets.

When the Y-side of the NBI sets, the normally closed NBIY1 switch opens and the normally open NBIY2 switch closes. This prevents a pulse on the set line 401 from bucking-down the Y-side of the NBI and makes it possible to buck-down the X-side by applying a pulse to the reset line 406.

When the NBI is in its normal, unset state and a pulse is directed over the direct line 411 both the X and Y side of the NBI set in response to the pulse energizing windings 403 and 396. Unlike the situation when a pulse is presented over the set line 401, both sides set as the pulse enters the system and remain set after it terminates, due to source 409 being latched to windings 403 and 396 by the latch line 408. The reason for providing these two different methods of energizing both sides of the NBI is related to the potential conditions which exist in the circuit and which must be accounted for to prevent a switch operating under load conditions. A more complete explanation of the reason for providing two means for energizing the X and Y sides of the NBI is best given together with the description of the NBI in relation to the other subcircuit and will, therefore, be postponed until that description is given.

Assuming both the X- and Y-sides of the NBI being set, a pulse on the reset line 406 operates to energize winding 402 which bucks down winding 403 causing the latch switch NBIX1 to open and thereby remove the source of potential from windings 403 and 396. At the termination of the reset pulse the NBI is restored to its normal state and is in condition to respond to a set pulse in the manner previously described.

Figure 26:
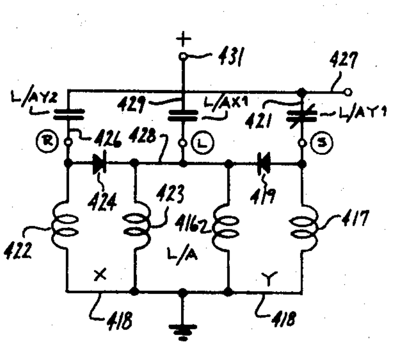

Referring now to FIG. 26, the L/A includes a Y-side formed from a double-wound coil comprising winding 416 and winding 417 which are joined at one end to a conductor 418 that leads to ground. The other ends of the windings are joined by a diode 419 which is oriented to provide a high-resistance path in the direction of winding 417 from winding 416. Electrically connected between diode 419 and winding 417 is a set line 421 which includes a normally closed switch L/AY1.

The L/A also includes an X-side comprising a double-wound coil formed by windings 422 and 423 which are joined at one end to conductor 418 which leads to ground. The other ends of the windings 422 and 423 are joined by a diode 424 which is oriented to provide a high-resistance path in the direction of winding 422 from winding 423. Electrically connected between diode 424 and winding 422 is a reset line 426 which includes a normally open switch L/AY2. The input to the set line and reset line is provided over a common line 427. Thus the L/A operates not as a function of where a pulse is applied but as a function of its condition when a pulse is applied. The diodes 424 and 419 are electrically joined by a conductor 428 to which a latch line 429, including a normally open switch L/AX1, is electrically joined. Assuming the circuit is completely unenergized, a pulse on line 427 will pass down the set line 421 from which the diodes 419 and 424 direct the pulse down windings 416, 417 and 423. The presence of the pulse in both of the Y-windings prevents the Y-side from setting but the X-side is conditioned to set whereby the latch line switch L/AX1 closes making a voltage source 431 available to conductor 428. When the pulse ends, winding 423 remains energized by virtue of the voltage provided down latch line 429 and the Y-side sets by virtue of the energization to winding 416 which is provided with current through the latch line. Winding 417 cannot receive energization from the latch line due to diode 419 and thus the termination of the pulse results in deenergization of winding 417 whereby the single energized winding in the Y-side of the L/A enables that side to set. When the Y-side sets, switches L/AY1 and L/AY2 switch from their normal state to their set state and become opened and closed, respectively.

The next pulse presented to line 427 is directed down the reset line (switch L/AY1 is now open) from which it is directed down windings 422, 423 and 416. The presence of energization in both windings 422 and 423 causes the X-side of the L/A to be bucked-down which results in switch L/AX1 being restored to its normal state and thus isolating the source 431 from the windings. As long as the reset pulse is in the circuit, winding 416 is energized while winding 417 is not energized and the Y-side remains set until the pulse terminates. The X-side of the L/A resets immediately, however both windings become energized and buck one another. Thus at the termination of the reset pulse the L/A is restored to its normal state and the next pulse received operates in the manner described above. Thus the L/A changes its condition each time a pulse is directed to line 427.

The reason for having one portion of the L/A circuit bucked down immediately upon the presence of a reset pulse and the other portion reset at the termination of the pulse is to insure that all switching takes place under noload condition.

Figure 27:
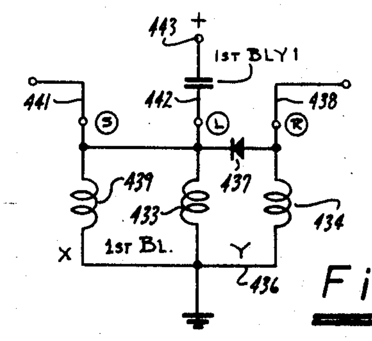

Referring now to FIG. 27, the 1st BL includes a double-wound coil Y side and a single coil X side. The Y-side is formed from a pair of windings 433 and 434 which are joined at one end to a conductor 436 which leads to ground. The other ends of the windings are connected through a diode 437 which is oriented to provide a high-resistance path in the direction of the winding 434 from winding 433. Electrically connected between the winding 434 and diode 437 is a reset line 438.

A single-wound coil 439 electrically connected at one end to conductor 436 and at its other end to a set line 441 and diode 437 forms the X-side of the 1st BL. A latch line 442, including normally open switch 1st BLY1, is connected between diode 437 and coil 439 at one end and at its other end is connected to a voltage source 443.

A pulse on set line 441 operates to energize coil 439 and winding 433 resulting in both the X and Y side of the 1st BL being set. The setting of the Y-side operates to close the normally open switch 1st BLY1 thereby latching coil 439 and winding 433 to the source 443. When both sides are set, a pulse on reset line 438 operates to energize windings 433 and 434 resulting in the Y-side of the 1st BL being bucked-down which operates to restore switch 1st BLY1 to its normally open state whereby the source 443 is isolated from the winding 433 and the coil 439 and the 1st BL resumes its normal condition. It is to be noted that coil 439 is energized by a reset pulse, such that the X-side holds onto the reset pulse and actually resets only upon termination of that pulse. The Y-side on the other hand, terminates at the leading edge of the reset pulse. This difference is mainly for the purpose of insuring that all switching is dry.

One of the several novel subcircuits taught by the present invention is that which performs the function of a clock as previously described. The Clock (pulse generator) serves as the primary source of output pulses which are transmitted over the two-wire communication system and thus is required to generate six whole evenly spaced pulses for each typewriter operation. A most convenient source of electrical pulses having the time requirements of the present invention is found in common 60-cycle line voltage sources. By full-wave rectification, a 60-cycle line source is converted into a pulsing DC source which generates six pulses every 50 milliseconds.

One of the problems in using this readily available source of properly timed pulses is the possibility of starting a series of pulses with a partial pulse. Since the typewriter operator is obviously unable to time the operation of the typewriter so as to have the data source operate the S-set device at precisely that moment which occurs between the pulses of the pulsed DC source, some other means must be provided by which the clock begins operation only at the beginning of a pulse and not during a pulse. By designing a Clock to operate in this manner it is possible that the transmit operation will be slowed down by the time required to wait for a partial pulse to pass so that the next complete pulse can be emitted as the first pulse. Since the maximum time of such a delay is something less than one complete pulse (which is approximately 8⅓ ms.) the total time for a complete transmit operation under the most adverse circumstances is approximately 58⅓ ms. This is enough less than the 64½ ms. required to complete a typewriter cycle to insure that the transmitter is cleared and ready to receive the next character in sufficient time.

Referring to FIG. 28, the Clock 446 has an input of full wave rectified 60-cycle voltage over conductor 447 and directs that voltage to its output conductor 448 when a signal indicating that a character code is to be transmitted is present on conductor 449. The primary element of the Clock 446 is a form C (single pole, double throw) glass encapsulated reed switch 451 which is enclosed within a double-wound coil comprising windings 452 and 453. In addition to the windings 452 and 453, the switch 451 is influenced by the presence of a permanent magnet 454 to maintain its operated state (i.e., the normally closed side is open and the normally open side is closed). The orientation of the winding 453 is such that when it is energized it produces a magnetic field which adds to that of the magnet 454 in influencing the switch to maintain its operated state. The winding 452 is oriented in the opposite direction to winding 453 and thus when it is energized it creates a magnetic field which partially (½) bucks the magnetic field of magnet 454 and winding 453. The important relationship between the two windings and permanent magnet is that the magnetic field produced by the winding 452 is not sufficient to buck both the energized winding 453 and the magnet 454 to the extent of releasing the switch to change from its operated state to a normal state. The magnetic field of winding 452 is sufficient, however, to counteract the effect of the permanent magnet 454 alone to the extent of releasing the switch to assume a normal state.

One end of the winding 452 is electrically connected to a gate 456 which communicates with a source of DC voltage 457 and enables the voltage to energize the winding 452 when the gate is open. The normal state of the gate is closed. The conductor 449 leads to gate 456 and when a signal is transmitted over conductor 449 it operates to open gate 456 and enables the DC voltage 457 to energize winding 452. A complete circuit is formed through conductor 458 to which the other end of winding 452 is electrically connected and which leads to ground. The conductor 447 which carries the full wave rectified voltage is electrically connected to the input of the form C switch 451 which directs that voltage through the normally open (biased closed) side of the switch which in turn is electrically connected to the winding 453. The other end of winding 453 is connected to conductor 458 which leads to ground thereby forming a complete electrical circuit. The output conductor 448 is connected to the biased open side of switch 451 and can only produce output pulses when the switch changes from its operated state to its normal state.

As long as no signal exists on conductor 449 winding 452 is not energized and all pulses on conductor 447 travel through the biased closed side of switch 451 to the winding 453 from which they continue through conductor 458 to ground. As long as a pulse is traveling through the circuit just described, both the magnet 454 and the winding 453 operate to maintain the switch in its operated state. Thus, if during the existence of a pulse in the circuit, conductor 449 transmits a signal to gate 456 which results in winding 452 being energized, the switch will not at that time change its state since the energization of winding 452 is only sufficient to buck the effect of magnet 454 thus leaving the field produced by energized winding 453 to maintain the switch in its operated state. Once the winding 452 is energized, however, it remains energized. Thus when the pulse traveling through the winding 453 terminates the winding 453 will be deenergized and the winding 452 will be able to sufficiently buck the permanent magnet 454 to release the switch to assume its normal state. The subsequent pulses on line 447 will be directed to output line 448 by virtue of the switch 451 having changed to its normal state. Only by termination of the signal on conductor 449 can the switch 451 be reoperated by the biasing magnet.

Thus, the clock is prevented from issuing an output pulse until any partial pulse in this system is cleared. After any partial pulse is cleared, the next pulse becomes the first signal pulse.

When the clock is used in a circuit which is capable of cutting short the last output pulse (by closing gate 456 during the last pulse) the clock can be made to hold to the last pulse by addition of conductor 450 between conductor 448 and the juncture of gate 456 and coil 452. Once the last pulse starts (or any pulse, for that matter) the coil 452 is insured of energization for the remaining duration thereof and since the switch 451 can only change state when coil 452 is deenergized, the output pulse cannot be cut short.

The relative simplicity of the circuit gives it economic and reliability advantages not to be found in any other circuit capable of performing a similar function.

Having described the overall logic of the transmit portion of the translator of the present invention with reference to FIG. 21 and the preferred embodiment of the various functional components thereof with reference to FIGS. 22 through 28, a detailed description of the precise manner in which the functional components are operatively associated with one another, for the purpose of translating parallel information into serial information and transmitting that serial information, will now be described with reference to FIGS. 29 through 32 which combine as shown in FIG. 39 to form one electrical schematic illustration.

c. Overall Transmit Circuit

The six switches labeled BW1, BW2, BW4, BW8, BW16 and BW32 above the line 500 are the six glass encapsulated reed switches which are associated with the six selector latches of the transmit typewriter. One such switch is shown in FIG. 3 and was previously described in detail. All of the components shown above line 500 are components which are physically mounted on the transmit typewriter while those components illustrated below the line 600 are the components physically mounted on the receive typewriter with the components shown between the lines 500 and 600 being separately housed and forming the translator of the present invention. As has been previously mentioned, each typewriter is designed to act as both a transmit and receive typewriter and, therefore, each typewriter which operates with the present invention will include all of the components shown above the line 500 and below line 600.

The six switches associated with the selector latches are numbered in a way which identifies the binary weight which they represent in accordance with the arbitrary binary weights which have been ascribed to the various selector latches as previously discussed. Thus, the letter *n* which the chart of FIG. 20 indicates as being characterized by the total binary weight of 21 is electrically present in the translator when switches BW1, BW4, and BW16 close. It follows that the switches which must close to represent a particular character or symbol are readily obtainable by reference to the chart of FIG. 20.

All of the selector latches associated switches are normally open and electrically connected to a common conductor 461. The conductor 461 is electrically connected to one end of the normally open cycle clutch switch 151 (see FIG. 7) the other side of which leads to the negative side of a 24 volt DC power supply 462 via conductor 463, conductor 464, conductor 466, conductor 467, and conductor 468. The other side of each BW switch is electrically connected through a current limiting resistor to the base of a transistor. Switch BW1 is electrically connected to transistor T1, switch BW2 is electrically connected to transistor T2, switch BW4 is electrically connected to transistor T4, switch BW8 is electrically connected to transistor T8, switch BW16 is electrically connected to transistor T16, and switch BW32 is electrically connected to transistor T32. The emitter of each of the aforementioned transistors is electrically connected to a conductor 469 which electrically communicates through conductors 471 and 472 with the positive terminal of the DC voltage supply 462. The collector of transistor T1 is electrically connected to the set line of the NBI, the collector of transistor T2 is electrically connected to the set line of NBI, the collector of transistor T2 is electrically connected to the set line of CH. 2, the collector of transistor T4 is electrically connected to the set line of CH. 3, the collector of transistor T8 is electrically connected to the set line of CH.4, the collector of transistor T16 is electrically connected to the set line of CH.5 and the collector of transistor T32 is electrically connected to the set line of CH.6. The T-transistors operate as normally open switches between the set lines of the channels and the positive voltage on conductor 469. When their base circuits find ground through their associated BW switch, the transistors conduct and energize their associated channel. Thus, when a print operation takes place, one or more of the BW switches will close (except for the hyphen which is represented by all spaces). Those channels associated with a closed BW switch will receive a set pulse and thus both their M and S sides will set.

The S-set device of FIG. 21 is advantageously realized by transistor 488 the emitter of which is electrically connected to the conductor 469 which carries a source of positive potential. The collector of transistor 488 is electrically connected to a set line 489. Conductors 473, 474, 475, 476 and 477 connect the direct lines of CHs.1, 2, 3, 4 and 5, respectively, to the set line 489. Each of the aforementioned lines between set line 489 and CHs. 1–5 includes a diode which is oriented to allow current to flow from the set line to the channel but to prevent current flow in the opposite direction. As previously described with reference to FIG. 22, a signal on the direct line of a channel results in the S side of that channel being set. Thus when the base of the S set transistor 488, which is connected through a conductor 559 to switch 151, finds ground through switch 151, the S set transistor conducts whereby the positive potential on conductor 469 is established on S-set line 489 resulting in the S-side of Chs.1–5 being set. Thus the S-side of all of the channels (with the exception of CH.6 which has no S side) are set regardless of whether or not the BW switch associated therewith has closed. On the other hand, only those channels associated with a BW switch which has closed have their mark sides set.

Electrically disposed between the S-set line 489 and the conductor 466 is the series circuit of a diode 479 and a transmit control coil T/C. The diode 479 is oriented to allow current to flow from S-set line 489 through coil T/C and prevent current from flowing in the opposite direction. Thus, when S-set line 489 is electrically connected to the conductor 469, which carries a positive voltage, current will flow through coil T/C to conductor 466 which leads to the negative terminal of the power supply.

The coil T/C has associated therewith a number of switches which are operated when the coil is energized. One such switch, T/Cl, is electrically disposed in series with a resistor 481 in the base leg of a transistor 482 which acts as a gate that operates in conjunction with the clock circuit 446. One side of normally open switch T/Cl is connected to resistor 481 which in turn is connected to the base of transistor 482, while the other end of the switch is connected to a conductor 483 which is electrically joined to conductor 467 which leads to the negative terminal of voltage source 462 via conductor 468. The emitter of transistor 482 is electrically connected to conductor 471 via conductor 484 and thus communicates electrically with the positive terminal of the voltage source 462. The collector of transistor 482 is electrically connected to one end of clock coil winding 452 and supplies energizing current thereto when the transistor is biased for conduction.

When the switch T/Cl closes, the base of transistor 482 finds ground and draws current and thus biases the transistor into conduction resulting in coil winding 432 being energized. This results in output pulses from the clock circuit 446, as previously described in connection with FIG. 28. Thus, by establishing voltage on conductor 489 as a result of the transistor 488 being biased for conduction (which in turn is a result of the cycle shaft rotating and closing switch 151), operates to start a series of pulses from the output of the Clock.

A normally open switch T/C2 is electrically disposed in a conductor 484, one end of which is secured to a main latch line 486 and the other end of which is connected to conductor 469 through an intermediary conductor 487. Besides switch T/C2, conductor 484 also includes normally open switch S12 (the state of which is dependent on the conditions of the S-side of the CH.1). Since the T/C coil and the S-side of CH.1 are both energized at approximately the same instant that the S set transistor 488 switches voltage to conductor 489, the main latch line 486 carries voltage which is available for latching the various channels in an energized condition in the manner previously described with reference to FIG. 22–24.

Electrical conductors 491, 492, 493, 495 and 496 are connected to main latch line 486 and serve as latch lines for CHs.1, 2, 3, 4, 5, and 6 respectively. Each latch line includes an M and S switch (with the exception of CH.6 which includes only one switch) the operation of which has been previously described.

A normally open switch T/C3 electrically connects coil T/C with conductor 486 and acts as a latching switch which enables the coil to remain energized after removal of voltage from conductor 479.

Output pulses from Clock 446 travel over output conductor 448 to the common input conductor 427 of L/A. The latch line 429 of the L/A is electrically connected to the main latch line 486 and draws latching voltage therefrom. The L/A finds ground through the conductor 466 to which it is electrically joined.

As previously described with reference to FIG. 26, the L/A alternates between a set condition in which both its X and Y side are set and a normal condition in which both its X and Y side are not set. Each pulse received on conductor 427 operates to switch the L/A from whatever condition it is in to its other condition. Because the electrical potential on main latch line 486 is removed after each complete code is transcribed by the translator and then reestablished for a subsequent code and the fact that the last pulse of a 6-bit code is even, the L/A always receives the first clock pulse while in its nonset condition. Thus, immediately prior to the first pulse from the Clock, the form C switch L/AY3, which is controlled by the Y side of the L/A and which comprises a normally closed side L/AY3*a* and a normally open side L/AY3*b*, is in its normal condition. A conductor 499 is electrically connected to the output conductor 448 of the Clock and also to switch L/AY3. The first pulse out of the Clock thus travels through the normally closed side L/AY3*a* to a conductor 501 connected thereto. The first clock pulse is not operable to change the L/A from its normal state to its set state until the pulse terminates, (as previously described). Thus side L/AY3*a* is the path which the first pulse must travel. The second pulse, however, will find side L/AY3*b* closed and thus the path it must travel.

In addition to passing through switch L/AY3*a* on to conductor 501, the first pulse also passes through a pulse shaper 502 via a conductor 503 which is electrically connected to the output line 448. The pulse shaper operates to transform the full-wave rectified pulsing DC on line 448 to a train of square-wave pulses wherein each pulse is approximately 5 milliseconds in duration and the time between pulses is approximately 3⅓ milliseconds (for an approximate total period of 8⅓ milliseconds).

The pulse shaper 502 comprises a transistor 506, a first Zener diode 507 and a second Zener diode 508. The emitter of transistor 506 is electrically joined to the conductor 503 over which clock output pulses travel to the shaper. The collector of transistor 506 is connected through a resistor 509 to the output gate 306 which comprises a pair of form C switches controlled by the NBI. The base of transistor 506 is connected to the emitter through a resistor 511 and to ground through the series connection of Zener diode 507, resistor 512 and conductor 467. The second Zener diode 508 is electrically connected across the output transistor 506 on the remote side of resistors 509 and 512.

The input to the Clock 446 has been previously described as a pulsing DC achieved by fully rectifying an AC source of voltage. In its rectified form the source provides half sine waves which rise from 0 voltage to about 35 volts maximum during each half cycle. When the clock is putting out these pulses on line 448 they can only reach the NBI control gate through the emitter-collector path of transistor 506. This path through the transistor is only available when the transistor is conducting which occurs when the base of the transistor is able to find ground. The base of transistor 506 finds ground through the first Zener diode 507 which conducts only after a voltage of 8.2 volts is applied across it. Thus, after the half sine wave of the pulsing DC source has increased from 0 to 8.2 volts, the first Zener diode 507 conducts, and the base of transistor 506 is able to find ground. This biases the transistor to a conducting state making it possible for the transistor to pass subsequent portions of the wave to the gate 306. The Zener diode 508 is selected to conduct at 6.8 volts and thus the voltage to the gate 306 will either be 6.8 volts or zero since the only voltage output signals from transistor 506 are 8.2 volts or more. As the voltage sine wave descends and passes below 8.2 volts, the Zener 507 becomes nonconducting and prevents the base of the transistor from finding ground, thereby causing the transistor to cease conducting and thus terminates the signal to the gate 306.

This unique arrangement of two Zener diodes and a transistor produces a highly effective and simplified pulse shaper which is not limited to the particular values given above for successful operation. The conduction voltage of the first Zener diode 507 must be greater than that of the second Zener diode 508, however, in order to produce a clean square wave. The time which is required to increase the voltage from 0 to the conduction voltage of the first Zener diode constitutes one-half of the time between pulses and is adjustable by adjusting the conduction voltage of the Zener diode which results in a proportionate variation of the length of the pulse.

The gate 306 comprises two form C-switches NBIY3 and NBIY4 controlled by the Y-side of the NBI. When the Y-side of the NBI is not set the NBIY3*a* side of switch NBIY3 is closed and connects the M-output line to the negative terminal of the voltage source 462. The NBIY3*b* side is open and thus prevents the output pulse from the wave shaper 502 from passing over the output M line. Under the same conditions, (NBI not set), the side NBIY4*a* of switch NBIY4 is closed and communicates the pulse shaper output conductor 513 with the S-output conductor, whereby the output pulse passes over the S output line. The side NBIY4*b* is open preventing communication between the negative side of source 462 and the S line. Thus, when a pulse passes out of the pulse shaper 502 and the NBI is not set, the M line becomes negative and the S line carries the output pulse. These conditions define a space signal.

The M and S output conductors communicate with the transmission lines 514 and 516, respectively, through a pair of form C switches T/C4 and T/C5 which are controlled by the T/C coil. The M-output conductor is connected to transmission line 514 through the normally open side T/C5*b* of switch T/C5 while the S-conductor is connected to the line 516 through the normally open side T/C4*b* of switch T/C4. When the T/C coil is energized, the two normally open sides T/C4*b* and T/C5*b* close and complete the circuit between output conductors M and S and transmission lines 514 and 516, respectively.

Thus the T/C coil is extremely important in that its energization results in voltage on latch line 486, output pulses from Clock 446 and communication between the output of the translator and a pair of transmission lines over which the typewritten information is to be sent.

When the Y-side of the NBI is set the M output conductor communicates with the output conductor 513 of the pulse shaper through side NBIY3*b* and the S-output conductor communicates with the negative terminal of the voltage source 462 through the side NBIY4*b*. Under these conditions a pulse out of the pulse shaper appears on the M-conductor while the S-conductor is connected to a negative voltage. These conditions characterize a mark signal. By changing the conditions of switches NBIY3 and NBIY4, the NBI operates the gate 306 and thereby determines whether a pulse from the clock appears on the transmission lines 514 and 516 as a mark or a space.

The conductor 501, to which the L/A directs the first pulse from the Clock, is electrically connected to a form C-switch S13 which is controlled by the S-side of CH.1 and which includes a normally closed side S13*a* and a normally open side S13*b*. Since the S-side of CH.1 is set (as are the S-sides of all of the channels) the first pulse over conductor 501 passes through switch side S13*b* to conductor 518 which leads through an isolation diode 519 to a form C-switch M22 which is controlled by the M-side of CH.2 and which includes a normally closed side M22*a* and a normally open side M22*b*. A conductor 521 electrically joined to conductor 518 leads through a diode 522 to the set line of the 1st BL. Thus when the first pulse passes through the S13*b* side of switch S13 it operates to set the 1st BL which is then latched in a set condition through its latch line 523 which communicates with the main latch line 486. A normally open switch 1st BLY2 is controlled by the Y-side of the 1st BL and is electrically disposed in a conductor 524 which is joined to the main latch line 486 and to conductor 487 which in turn is joined to conductor 469 which leads to the positive terminal of voltage source 462. Thus when the 1st BL is set the main latch line 486 obtains its potential through switch 1st BLY2 and need only rely on that switch in order to maintain the necessary voltage for continued latching of the channel circuits.

The X-side of the 1st BL controls normally closed switch 1st BLX1 which is electrically disposed in the conductor 463 which joins the switch 151 to the conductor 464 (through the normally closed side SC/MR1*b* of switch SC/MR1), which leads to the conductor 466 that communicates with the negative side of the voltage source 462. The S set transistor 488 and all of the T-transistors associated with a closed BW switch find their ground through switch 151 and switch 1st BLX1 and thus depend on switch 1st BLX1 being closed (and side SC/MR1*b* of switch SC/MR1 being closed) for their operation. When the leading edge of the first pulse enters the set line of the 1st BL it energizes the X coil and causes the normally closed 1st BLX1 switch to open whereby the channels all lose their mark and space coil energization from the T transistors and the S-set transistor. As described above, however, the first pulse also induces the Y-side of the 1st BL to set and thereby provides a path through switch 1st BLY2 for maintaining the energization conditions previously established within the channels. The loss of voltage which occurs when the S-set transistor 488 becomes nonconductive does not deenergize coil T/C due to the fact that the T/C coil has a latch line through switch T/C3 which connects to main latch line 486.

The M22*a* side of form C switch M22 leads to the NBI/S conductor through a conductor 526. The M22*b* side of that switch leads to the NBI/M conductor through a conductor 527. Thus, if CH.2 is in a space condition, the mark side will not be set and the M22 switch will be in its normal state whereby the NBI/S conductor will receive the first pulse. On the other hand, if CH.2 is in a mark condition, the M side will be set and the M22*b* side of switch M22 will carry the first pulse and direct it to the NBI/M conductor.

The NBI/M conductor leads to the set line of the NBI whereby a pulse carried by the NBI/M conductor results in both sides of the NBI setting and thereafter remaining set by virtue of the NBI latch line 529 which is electrically joined to the main latch line 486. When the NBI is in this set condition, the gate 306 sends out mark signals to the transmission lines as previously described.

The NBI/S line is joined to the reset line of the NBI whereby a pulse directed over the NBI/S conductor operates to reset the NBI and restore it to its normal condition. When the NBI is in its normal state, the gate 306 produces a space signal in response to a clock pulse (also previously described). Since the reset line includes normally open switch NBIY2, a pulse directed on the NBI/S line when the NBI is already in its normal state will be precluded from reaching the NBI circuit and thus have no effect thereon (which is the result desired). Similarly, the set line of the NBI includes normally closed switch NBIY1 which is open when the NBI is set and thus excludes signals on the NBI/M conductor from reaching the NBI circuit when the NBI is already in a set condition.

The first pulse of a code passes through the form C switch M22 (which is controlled by the M-side of CH.2) and places the NBI in a condition which reflects the condition the of CH.2 (i.e., if CH.2 is in a mark condition the NBI is set and if CH.2 is in a space condition the NBI is reset). The second pulse from the Clock then passes to the gate 306 and creates either a mark signal or a space signal depending on whether or not CH.2 is in a mark condition or a space condition, respectively.

Thus, the NBI is put in a condition which reflects the information in CH. *n* (where *n* is greater than 1) in response to the *n*—1 pulse passing through a switch controlled by Ch.*n*. It now becomes clear why it is necessary for the NBI to receive CH.1 mark signals (there being no *n*—1 pulse with respect to CH.1).

When the first pulse terminates, the L/A sets and the normally closed side L/AY3*a* of the switch L/AY3 open while the normally open side L/AY3*b* of the same switch closes. Under these conditions the next pulse out of the Clock (which is the second pulse) passes from conductor 499 through switch L/AY3*b* to conductor 531. The second pulse also passes through the pulse shaper to the output gate 306 from which it emerges either a mark or a space signal depending on the previously established conditions of the NBI. The second pulse also enters the L/A circuit (as all code pulses) and operates to reset the L/A so that it resumes its normal condition after the second pulse terminates.

Conductor 531 connects to a form C-switch S23 the condition of which is controlled by the S-side of CH.2 and which includes a normally open side S23*a* and a normally closed side S23*b*. The S-side of CH.2 being set, the pulse passes through side S23*a* to conductor 532, which includes an isolation diode 533 and which leads to a form C-switch M32 the condition of which is controlled by the M-side of CH.3 and which includes a normally closed side M32*a* and a normally open side M32*b*.

The conductor 532 is electrically joined to the reset line of CH.1 by a conductor 534. When the second pulse travels over conductor 534 to the reset line of CH.1 it operates to reset the S-side of the channel which results in the form C-switch S13 being reset to its normal state.

The resetting of the S-side of CH.1 also results in switch S12 resetting to its normal state (which is open) and thus illustrates the necessity of the 1st BL and switch 1st BLY2 to provide an alternate path for maintaining latching potential on the main latch line 486.

The pulse passes through switch M32 to either conductor NBI/M or NBI/S depending on whether CH.3 is in a mark condition or a space condition, and in this way places the NBI in the proper condition to have the gate 306 put out a signal which corresponds to the condition of CH.3 in response to the third clock pulse.

The activity of second pulse includes one function which was not performed by the first pulse; namely, the resetting of a CH.1. The activities of the second pulse are typical of the activities of the clock pulses in general in that they include the function of generating a mark or space signal for transmission, resetting the next previous channel, and putting the NBI in a condition which reflects the condition of the next subsequent channel.

The function of resetting the next previous channel is extremely important in that it enables all the pulses to be directed over either line 501 or 531 regardless of the number of channels involved. This becomes more apparent after the following description of the path followed by the third pulse.

The third clock pulse, like the first and second pulses, passes through the gate 306 and transmits either a mark or space signal on the transmission lines 514 or 516 in accordance with the condition of the NBI. Also the pulse enters the L/A and prepares it to change the state of switch L/AY3 when the pulse terminates. The pulse is directed to conductor 501 in that it is an odd numbered pulse. Since the second pulse reset the S-side of CH.1, the third pulse passes through the S13*a* side of switch S13 to switch S33 which is controlled by S-side of CH.3 and which includes a normally closed side S33*a* and a normally open side S33*b*. The S-side of CH.1 remains reset for the duration of the code, and thus all subsequent pulses which pass over conductor 501 pass through the S13*a* side of switch S13 on to a form C-switch associated with one of the subsequent odd-numbered channels. The S-side of CH.3 is reset by the fourth pulse and thus the fifth pulse passes through the S13*a* side of switch S13 and the S33*a* side of switch S33 from which it is able to perform the functions necessary to properly condition the NBI for the sixth pulse and reset the S-side of the fourth pulse to clear the path for the sixth pulse.

Since the activity of the third, fourth, and fifth pulses is identical with the activity described with reference to the second pulse it is not necessary to trace their paths in detail. All the odd-numbered pulses are directed to conductor 501 and all even-numbered pulses are directed to conductor 531 and a pulse on either conductor will continue to travel until it encounters a form C-switch associated with the S-side of a channel which is still in set condition. A switch of this description will direct the pulse to a form C-switch associated with the M-side of the next higher numbered channel and this switch will direct the pulse to either the set or reset side of the NBI depending on whether or not that channel is in a mark or space condition. The energized S-switch will also direct the pulse to a conductor which leads to the reset line of the next previous channel.

The very last pulse (which in this case is the sixth pulse) is directed over conductor 531. Since there are no seventh or eighth pulses it is not necessary for the sixth pulse to condition the NBI for a subsequent pulse nor is it strictly necessary for the sixth pulse to reset the CH.5 for the purpose of clearing the path for the next odd pulse. Thus the activity of the sixth pulse in generating an output signal which reflects the condition of CH.6 is really the only activity of the sixth pulse which is similar to the activity performed by the prior pulses.

The sixth pulse passes through the normally closed side S23*b* of switch S23 to conductor 536 which leads to switch S43 which is in its normal state by virtue of the fact that the fifth pulse operated to reset CH.4. Thus the pulse passes from conductor 536 through the normally closed side S43*b* of switch S43 to conductor 537. Conductor 537 is electrically joined to conductor 538 which is electrically joined to both the reset line of CH.5 and the reset line of the 1st BL. Conductor 538 is also electrically joined to conductor 539 which includes an isolation diode 541 and which electrically connects to the main latch line 486. The leading edge of the sixth pulse operates to reset CH.5 and at the same time reset the 1st BL resulting in switch 1st BLY2 opening and thus disconnecting the main latch line 486 from the source of positive potential via line 469. While it is desirable for the system to be completely cleared at the termination of the sixth pulse, it is not desirable for the system to clear before that time and thus the conductor 539 enables the sixth pulse itself to supply the main latch line 486 with potential during the duration of the pulse. Thus the main latch line 486 and all of the latch lines which are fed therefrom hang on the sixth pulse. At the termination of the sixth pulse, the system is completely cleared and all channels as well as the T/C coil, the 1st BL, the NBI, the L/A and the Clock resume their normal conditions preparatory to receiving the next six-bit code for transmission.

The cycle which occurs for each code differs only in the channels which have their mark sides set, and thus in the sequence of mark and space signals which are transmitted to the transmission lines 314 and 516. The transmit cycle described above produces a sequence of mark and space signals which corresponds to the sequence of mark and space conditions in the channels whereby the *n*th pulse is a mark if the *n*th channel has its mark side set and is a space if the *n*th channel does not have its mark side set.

The two form C switches which connect the M and S output conductors to the transmission lines are, as previously described, controlled by the T/C coil. Thus when the coil is deenergized at the termination of the sixth pulse, the switches T/C5 and T/C4 assume their normal state which results in the M and S output conductors being electrically separated from the transmission lines. When the translator is in this condition it can receive signals from a remote typewriter and present them to the typewriter for purposes of operating the typewriter as will be described in detail below. It is important at this time to note that the change of the translator from a transmitter to a receiver is performed automatically and the translator acts as a transmitter only for the precise time necessary to transmit information and thereafter automatically resumes the condition necessary to act as a receiver. This is a highly desirable feature in that an unattended typewriter is automatically capable of receiving messages without the necessity of special conditioning by an attendant.

The foregoing detailed description of the preferred embodiment of the transmit portion of the translator of the present invention was made with reference to a typewriter performing a print cycle. The print cycle includes the operation of the six selector latches associated with the typewriter and it is through these latches that the BW switches are operated for the purpose of setting the mark side of selected channels. During a function cycle there is generally only one switch which is operated to uniquely identify the function and it is through this switch along that preselected channels must be instructed to set their mark sides. In order to accomplish this result it is necessary to provide a matrix between the function identifying switch and the T transistors so that the proper conditions will exist in the six channels to identify the particular function which is being performed.

d. Function Matrix

All of the switches previously described as being mounted on the transmit typewriter and operative to uniquely identify a particular function operation are shown above the line 500 indicating that they are physically mounted on the typewriter and not in the translator housing. Each of the several switches is electrically disposed such that one side has a path to the ground line 463 while the other side is electrically connected to the function matrix 546. Matrix 546 is comprised of 21 diodes which are electrically joined in such a way as to establish a preselected code in the translator in response to a given switch being operated. Each of the conductors which joins a BW switch with its associated T-transistor, with the exception of the conductor which joins the BW4 switch and the T4 transistor, is electrically joined by a branch line to the function matrix. When one of the function identifying switches closes, a circuit is formed between one or more T-transistors and the groundline 463 through the function matrix 546 and the particular switch which has closed. Those T-transistors which see ground through the function matrix react in precisely the same way as when their associated BW switch is closed. Thus, the function matrix provides the logic by which preselected transistors conduct whenever a particular function identifying switch closes.

For reasons which will be discussed in detail below all binary characters which represent a function operation are characterized by the presence of a binary weight of 16 (mark condition in CH.5) and the absence of a binary weight of 4 (space condition in CH.3). This accounts for the absence of a connection between the switch BW4 and the matrix 546, which was mentioned above.

A conductor 547 connects the conductor 542 between switch BW16 and transistor T16 to a conductor 548 within the matrix 546. The conductor 548 is in turn electrically connected to a conductor 549 which leads out of the matrix to the normally closed down shift side 303*a* of the switch 303 which also has a normally open side 303*b*. The other end of down shift side 303*a* is connected to a conductor 551 to which one side of the normally open upshift side 303*b* is also connected. The conductor 551 is electrically joined to a line 552 which serves as a link between all of the other function identifying switches and transistor T16. The conductor 552 is also electrically joined through the normally closed shift arm switches 306 and 307 to conductor 463. Since one of the shift arm switches (which were previously discussed with reference to FIGS. 15 and 16) is in its activated condition at all times other than during a shaft from one case to the other case, the shift arm switches will normally establish an open circuit between conductors 463 and 552.

The normally open space switch 250, which is actuated each time a space function is performed by the typewriter, is electrically joined at one of its sides to a ground return line 550 which is electrically connected to line 463. The other side of switch 250 is electrically joined to the cathodes of matrix diodes 553 and 554. The anode of diode 553 is electrically connected to the conductor 552 which as previously described leads to transistor T16 through downshift side 303*a* of switch 303, while the anode of diode 554 is electrically joined to the conductor 540 between switch BW1 and transistor T1 by conductor 556. When the space switch 250 closes in response to the occurrence of a space function cycle by the typewriter, transistors T16 and T1 (and only these transistors) find ground through the closed switch and its associated diodes and thus are biased from a nonconducting to a conducting condition. This results in CHs.1 and 5 being placed in a mark condition and the first and fifth pulses generated by the transmitter being mark signals while all of the other pulses are space signals. Since the space function is uniquely identified by the binary weight 17, the signal which the transmitter transmits in response to switch 250 closing uniquely identifies the function cycle.

As previously described with reference to the print cycle, it is necessary for the S-set transistor 468 to find ground before the system can start transmitting. The switch 151 which is operated by the cycle shaft 14 (see FIG. 7) does not close during a function cycle and thus some alternate means must be provided for biasing transistor 488 into conduction. A conductor 557, including an isolation diode 558, electrically joins the conductor 559 (which connects transistor 488 to switch 151) to conductor 542 which joins switch BW16 to transistor T16. Since all function codes include a binary weight of 16, the conductor 542 leads to ground each time a function code is to be transmitted. The connection of conductor 559 to conductor 542 results in the S-set transistor 488 finding ground each time a function cycle is to be transmitted. Once the selected T-transistors have been biased to a conducting state and the S-set transistors simultaneously conditioned, in a like manner the operation of the transmitter is identical with that previously described with reference to a print cycle.

Since each function cycle is characterized by a different binary weight, a different combination of T-transistors must be biased to conduction for each separate function cycle. Accordingly, one side of the normally open backspace switch 192 is electrically joined to line 550 while the other side is electrically joined to a pair of matrix diodes 561 and 562. Diode 561 connects switch 192 to the line 552 for the purpose of providing transistor T16 with a path to ground while the diode 562 is electrically joined to transistor T2 via conductor 563 whereby transistor T2 finds ground through switch 192 when it closes. The combination of transistor T2 and T16 gives a signal with a total binary weight of 18 which is the characteristic binary weight that uniquely identifies a backspace function.

Although not previously described with reference to the mechanical operation of the IBM Selectric typewriter, it is possible to equip such a typewriter with a power tab and as in the case of all other function operations it is possible to uniquely identify a power tab operation by the closing of a switch. Accordingly a normally open switch 564 represents a switch associated with the power tab mechanism and which closes each time the power tab operates. One side of the switch is connected to the conductor 550 while the other side of the switch is electrically joined to three matrix diodes 566, 567 and 568. Diode 566 electrically joins switch 564 to conductor 552, diode 567 electrically joins the switch to conductor 563, and diode 568 electrically joins the switch to conductor 556. Thus when switch 564 closes, transistors T16, T2 and T1 all conduct and cause a signal to be transmitted which has a total binary weight of 19, which uniquely identifies a power tab operation.

The normally open index switch 237 and the normally open carrier return switch 236 are electrically joined in parallel relationship to one another, one end of the parallel circuit being electrically joined to the conductor 550 by a conductor 571 and the other end of the circuit being electrically joined to one end of a parallel circuit formed by normally open double line feed switch 235 and normally closed single line feed switch 246. The other end of the parallel combination of switches 235 and 246 is electrically jointed to a pair of matrix diodes 272 and 273, the former of which is electrically jointed to the line 552, and the latter of which is electrically joined to the conductor 543 via conductor 574. As previously described with reference to FIG. 10, most typewriters do not include a separate index key button and are thus only capable of indexing (linespacing) through operation of the carrier return key lever. The index mechanism, including an index interpose, is present in the typewriter, however, since it is necessary for performing continuous line feeding (indexing) in response to holding the carrier return key lever button in its extreme downward position and thereby depressing bail 240 (see FIG.10*a*).

When a carrier return operation is performed by the typewriter the normally open switch 236 closes and a circuit is formed through single line feed switch 246 and carrier return switch 236 by which transistors T16 and T8 are able to find ground and conduct (a carrier return operation being characterized by the binary weight of 24). Because the carrier return (and index) operation requires 360 degrees of revolution of the operational cam shaft instead of 180 degrees for other typewriter cycling, the carrier return (and index) switch remains closed for double the cycle time which carries the closed switch condition into the second code time period resulting in transmission of not one but two carrier return signals during a single carrier return or index operation unless some means is provided for preventing the second signal from being established. For this reason the single line feed switch 246, which is actuated by the index mechanism, must operate prior to termination of the last code pulse to prevent resetting the code when switch 1st BLX1 recloses. When operated, switch 246 changes from its normally closed state to an open state. This opens the circuit between the matrix and groundline 463 so that no code signals are established in the translator for transmission during the second code period of the carrier return or index cycle. If the carrier return button is depressed to its most downwardly position for repeated indexing, the first carrier return and index operation will be followed by repeated index operations as evidenced by repeated closing of index switch 237 and opening of switch 246 before commencement of the second code period. When this occurs a current path is formed through single line feed switch 246 and index switch 237 by which index code signals are repeatedly established in the translator for transmission. The index operation function is performed for as long as the carrier return key lever button is depressed. For each index operation performed the translator receives and transmits an index code signal. In this way the repeat operation of indexing can be transmitted in the form of a carrier return code from one typewriter to another.

In the event that it is desired to double line feed the receive typewriter along with a carrier return, the switch 235 is actuated by the line feed control lever 239 and thereby closed to complete a circuit around switch 246. Under these conditions, there will be two line feed signals established in the translator for each carrier return operation (the second signal coming during the second 180° of the carrier return cycle since switch 246 is ineffective to break the ground circuit). Thus even though the transmit typewriter may itself be conditioned to single line feed it can transmit a signal which induces a double line feed operation at the remote typewriter by reason of the storing ability of the receive circuitry. The line feed conditions of the transmit typewriter and the remote typewriter are maintained independent by the fact that the mechanism operated at the transmit typewriter for determining the line feed conditions at the remote typewriter is totally independent of the line feed mechanism of the transmit typewriter.

since double line feed operation at the receive typewriter requires two complete 129 ms. cycles for each operation of the transmit typewriter carrier return-index operation it is necessary to disable the index operation of the transmit typewriter to prevent the transmit repeat index from overrunning the receive typewriter when double line feeding the receive typewriter from the transmitter. For this reason the lug 245 on control lever 239 prevents repeat operation at the transmit typewriter when the control is set for double linefeeding the remote typewriter.

When the typewriter is in a lower case condition and upshifted to an upper case condition the switch 303 changes from its normal state to its actuated state whereby side **303*a* thereof opens and side 303*b* closes. The upshift is also accompanied by the switches 306 and 307 both being in their normally closed condition for the brief time required for the shift arm to change from its lower case position to its upper case position. The change of state of switch 303 which opens side 303*a* prevents translator T16 from seeing ground through conductor 548. An alternate groundpath exists, however, over conductor 547, connecting conductor 576, diode 581, conductor 577 and side 303*b* of switch 303 which connects to conductor 551. Conductor 551, as previously described, is connected to conductor 552 which includes the switches 306 and 307 and is connected to the ground line 463 when both switches 306 and 307 are closed. When the groundpath is through the upshift side 303*b* instead of downshift side 303*a*, the transistor T32, as well as transistor T16 finds ground and conducts. The transistor T32 is electrically connected to conductor 577 by a conductor 578 while a diode 579 in conductor 578 and a diode 581 in conductor 576** prevent the signal from traveling in the wrong direction. Thus an upshift is characterized by a code which has a total binary weight of 48 (16 plus 32) and thus is distinguishable from the downshift signal which has a total binary weight of only 16.

It follows that when a typewriter is operating in upper case (switch side **303*b* closed and switch side 303*a* open) a space function will result in transistor T32 conducting as well as transistors T16 and T1 as previously described. Thus, the space function cycle which takes place while the typewriter is operating in upper case is identified by a binary code having a total binary weight of 49 and generated by the closing of the space switch 250**. Thus, the same identical space cycle function and the closing of the same identical switch which identifies the space operation results in one of two possible binary codes depending upon whether the typewriter is operating in upper case or lower case.

The same is true of the backspace wherein the binary weight of the lower case backspace code is 18, as previously described, and the upper case backspace code is identified by a binary code with an additional weight of 32 thus giving it a total binary weight of 50.

By having a separate upper case code and lower case code for space and backspace as well as for tabulator, carrier return and index, it is possible to confirm the proper case each time one of these function cycles is performed by the typewriter. The details of precisely how the case confirmation operates is best deferred until the receive portion of the translator is described.

Because of the fact that the closing of a single switch will result in one of two binary characters being transmitted by the translator, depending on whether the typewriter is operating in upper case or lower case, it is possible for the operation of a single switch to identify two distinct operations. Thus the switch 248, which is associated with the index key button (the index key button being disconnected from the index interposer, as shown in FIG. 10) is employed as both a remote off switch and a bell switch. One side of switch 248 is electrically joined to conductor 550, which leads to ground, while the other side of the switch is electrically joined to matrix diodes 582, 583 and 584. Diode 582 is electrically connected to conductor 552, diode 583 is electrically connected to conductor 574 leading to transistor T8, and diode 584 is electrically connected to conductor 563 leading to transistor T2. When switch 248 closes and the typewriter is operating in lower case, transistors T16, T8 and T2 all conduct to form a binary code having a total binary weight of 26. This binary code uniquely identifies to the remote typewriter a remote typewriter OFF operation and it responds thereto by turning off. When the typewriter is operating in an upper case condition and switch 248 is closed, the transistor T32 conducts along with transistors T16, T8 and T2 to establish a binary code having a total binary weight of 58. This code uniquely identifies to the remote typewriter a bell ringing operation and not a remote off operation. As will be described more fully below, the operation of switch 248 while the typewriter is in upper case produces a bell ringing not only in the remote typewriter but also in the transmit typewriter so that the operator does not mistakenly believe he is turning the remote typewriter off when in fact all he is doing is ringing a bell at the remote typewriter.

Another switch which produces dual operation is switch 586 which is mechanically associated with the portion of the ribbon mechanism that determines whether or not the typewriter types in black or red. This portion of the typewriter was not previously described but is an available mechanism on IBM Selectric typewriters and one which can be easily made to include an identifying switch. One side of the switch 586 is electrically jointed to groundline 550 while the other side of the switch is electrically joined to diodes 587, 588 and 589. These diodes are electrically joined to conductors 552, 574 and 556 respectively, whereby the closing of switch 586 while the typewriter is operating in lower case produces a binary code having a total weight of 25. When the typewriter is operating in upper case an additional binary weight of 32 is added to the 25 to give a code having a total binary weight of 57. By operating switch 586 while the typewriter is in lower case a code is transmitted which uniquely identifies to the remote typewriter that it is to print with the black portion of the ribbon, and by actuating the same switch while the typewriter is in the upper case a code is transmitted which uniquely identifies to the remote typewriter that it is to print with the red portion of the ribbon.

A switch 591 is illustrated as having one of its sides electrically joined to conductor 550 and its other side connected to matrix diodes 592, 593, 594 and 595. While these diodes are included in the matrix and are electrically joined to conductors 552, 574, 563 and 556 respectively, the switch 591 is not in fact mounted on the typewriter so as to uniquely identify any particular typewriter function. The switch is only shown as an available means for identifying some auxiliary function which the typewriter might be especially equipped to perform. Thus the codes having the binary weights of 27 and 59 are open and available in the event a typewriter includes functions other than those described.

All function switches are capable of developing two weighted codes, each weight differing from the other by a weight of 32 as determined by the condition of the switch 303 controlled by shift release arm 278.

Since 16–32 binary weighting switch 303 is conditioned so as to indicate a new case condition prior to its actual occurrence it is possible for an operator to depress the shift key and the spacebar simultaneously (as can, may and does occur) and still have the correct case-conditioned space code set into the translator so that the receive typewriter will receive the dual information in parallel.

Without the 16–32 weighting switch 303 and its integration into the function matrix and under the circumstances described above, either an erroneous code would be generated or one or the other of the codes would be completely missed.

The IBM Selectric typewriter is designed to prevent (through various interlocking mechanisms) input from the keyboard of two selector latch codes simultaneously (as the translator also does); to prevent print and case shift operations from occurring simultaneously, and to prevent print and space operations from occurring simultaneously, but no provision is made to prevent simultaneous operation of the functions and the case shift since no purpose would be served. In fact, the absence of an interlock system in the latter situation is used to advantage in the present invention by simultaneously case-shifting and function-operating the receive typewriter under the conditions discussed above.

By virtue of the matrix 546 it is possible to uniquely identify all typewriter function operations in terms of six-bit binary character codes.

e. Receive Logic

Those components which are illustrated in FIGS. 29–32 and have been described above are employed by the translator for the purpose of transmitting information from a transmit typewriter to a transmission line which leads to a receive typewriter. Before describing the detailed operation of the receive portion of the translator with reference to the preferred embodiment illustrated in FIGS. 29–32, the overall logic and operational sequences involved in the receive portion of the translator will be described with reference to FIGS. 33–37.

Before the serial information which the transmit portion of the translator places on transmission lines 514 and 516 can be employed to operate a remote typewriter, it is necessary for it to be translated back into corresponding parallel information since the typewriter responds only to information in parallel form. There are many problems involved in receiving serial information, translating it into corresponding parallel information and subsequently operating a typewriter in accordance with the particular binary code represented by the information. It is first necessary to receive the serial pulses and temporarily store them so that as the last pulse of the code is received there is present in parallel form a binary code which corresponds to the binary code of the serial pulses received by the translator. Secondly, this information must be identified as either identifying a print cycle or a function cycle and if the system identifies the code as that representing a function cycle it must be determined whether it is a memory function (requires the operation of the translator memory to be described below) or a nonmemory function (does not require the memory of the translator). At the same time as the translator identifies the information, the information must be stored in a more permanent memory.

The more permanent memory portion of the present invention plays a vital role in the successful operation of the communication system in that it overcomes the problem presented by the fact that no two electric typewriters operate at the identical speed. Because of inherent nonsyncronous relationship between any two typewriters, it is not uncommon for the transmit typewriter to operate somewhat faster than the receive typewriter. If no memory portion is provided separate from the input portion, it is possible for one code to still be in the translator (where it must remain during the operation of the typewriter in response thereto) while a subsequent code is being received. This can cause the remote typewriter to attempt to change the tilt and/or rotate position of the type head before the head returns to its home position. When this occurs the various steel bands previously described as operative to position the head for printing a selected character or symbol are placed under unusual strain and often break. Thus, before a system can be successfully employed it must overcome this problem and to do so the present invention provides a memory which stores a code for a portion of the cycle responsive thereto. While the cycle is being completed, the input portion is free to receive a new code, and transfer it to the memory after the previously stored code is released. As will be shown in detail below, the memory portion of the translator enables two typewriters to get out of synchronization by as much as one complete binary code and still function accurately. Each time that the carrier is returned for the purpose of typing a new line, the transmit typewriter and the receive typewriter are synchronized so that any difference in operating speeds is only cumulative for a single line. Since two properly operating typewriters will only have operating speeds that differ slightly, the receive typewriter will not fall more than a single code character behind during a single line of operation and thus the present invention in providing a memory capable of storing one full binary code completely solves the vexing problem of maintaining typewriter synchronization.

Attempts by others to solve the typewriter synchronization problem have lead to reducing the speed of the transmit typewriter so that it always transmits at a slower rate than the receive typewriter is capable of receiving information.

When using conventional tape transmission methods (e.g., punched paper tape, magnetic tape) this means that the cycle clutch operates on both typewriters during each typewriter pring cycle. Assuming a 10-word typing line and each word consisting of an average of five letters, the cycle clutch operates 50 times. By using the present invention and running the typewriters wide open (the preferred method) the cycle clutch may be held open for an entire word at a time thus reoperating the cycle clutch only after each space so that the cycle clutch operates only 10 times per line—an increase of 500 percent in cycle clutch life expectancy. Since experience shows that the cycle clutch is the first and most often replaced expensive and major part assembly in the typewriter this feature of the present invention is of great importance.

FIG. 33 illustrates in block diagram form the overall logic of the input portion of the translator which operates to translate the incoming serial information into corresponding parallel information. This input portion of the receiver of the translator employs a plurality of channels similar to those channels previously described with reference to the transmit portion of the translator. Where the number of bits in a binary character being translated by the translator is *n*, the number of channels in the input section of the receive portion of the translator is *n*−1. Thus in the case of the six-bit code of the present invention, there are five channels. Each channel has a mark section and a space section which are independently capable of being either in a normal or set condition. The input section illustrated in FIG. 33 functions to energize the channels so that a mark condition (both the mark and the space sides set) is established in CH. *n* if the *n*th pulse of a code is a mark signal, or a space condition (the space side only set) is established in CH. *n* when the *n*th code pulse is a space signal. Once the first five channels have been properly energized and the sixth pulse is received, the code is immediately transferred to a memory and the input section is cleared preparatory to receiving the next binary code. Since it is not necessary to temporarily store the information of the sixth pulse while a subsequent pulse is being received, the sixth pulse is placed directly into the memory along with the information from the first five channels, thus explaining the absence of a sixth input channel to correspond to the sixth pulse.

The incoming serial signal on transmission lines 514 and 516 is directed to the Line Alternator L/A which has four output paths to which the pulse can be directed. The four output paths from the L/A include an M/Odd path, an M/Even path, an S/Odd path and an S/Even path. When an incoming pulse is an odd-numbered pulse (1, 3 or 5) it will be directed to the S/Odd path if it is received on line 516 (thus a space signal) and to the M/Odd path if it is received on line 514 (and thus a mark signal). Similarly for even-numbered pulses, (2, 4 and 6) a signal on line 514 is directed to the M/Even path while a signal on conductor 516 is directed to the S/Even path.

Each of the output paths from the L/A includes two channel operated gates, each of which is capable of directing a pulse to a branch path which leads to one of the channels. More particularly, the S-side of CHs. 2 and 4 control gates in the M/Odd and S/Odd paths and the branch paths from these gates lead to the next preceding odd channel (3 and 5, respectively). The S-sides of the odd-numbered channels (with the exception of CH.1) control gates in the M/Even and S/Even paths, and the branch paths from these gates direct pulses to the next preceding even channels (4 and 6). The gates direct pulses to their branch path if the S-side of their associated channel has not been set. When the S-side of a channel has been set, the gates associated therewith direct pulses further down the same main path.

If the first pulse received by the L/A is a mark signal, it will be directed to the M/Odd path which leads to gate S2*a* which is controlled by the S-side of CH.2. Since all of the channels are initially in their normal state, the pulse will be directed to the branch path 601, in accordance with the conditions set out above. The path 601 leads to both the M and the S sides of CH.1 and thus is operative to set both sides of the channel, thereby placing it in a mark condition. Since the first pulse was a mark signal CH.1 is correctly set to reflect the first code bit.

If the first pulse to the L/A is a space signal, it will be directed to the S/Odd path leading to gate S2*b*. Since the S-side of CH.2 is not set, the pulse is directed by the gate to the branch path 602 which leads only to the S-side of CH.1 resulting in the S-side of CH.1 being set. When the S-side of CH.1 is set and the M-side is not, the channel is in a space condition and once again the channel correctly reflects the information of the first pulse bit received by the L/A.

The second pulse into the L/A will be directed to either the M/Even or the S/Even line depending on whether it is a mark signal or a space signal. If it is a mark signal it will be directed to gate S3*a* and from there to a branch path 603 leading to the mark and space sides of CH.2. If the signal is a space signal, it will be directed to gate S3*b* and from there over branch path 604 to the space side of CH.2. Thus, whether the signal is a space signal or a mark signal, the space side of CH.2 is set and gates S2*a* and S2*b* are thereby changed from their normal state to their set state (they subsequently do not direct pulses to their branch paths).

In general, the *n*th pulse received is directed to a gate controlled by CH. *n*+1 and directed by that gate to CH. *n* to put that channel in either a mark or space condition. Since a channel in either the space or mark condition has its S-side set, the *n*th pulse will always be operative to change the state of the gates controlled by the CH. *n*. In this way the *n*+2 pulse will be directed through the CH. *n* gate to another gate instead of to the branch path associated with the CH. *n* gate.

Accordingly, the third pulse passes over either the M/Odd path or the S/Odd path to either gate S4*a* or S4*b*. Gates S4*a* and S4*b* associated branch paths 606 and 607 respectively. Since each pulse is operative not only to properly set the channel to which it corresponds but also to condition the pulse paths for subsequent pulses, the number of paths from the L/A does not have to be increased above four for an increased number of channels.

When the sixth pulse passes through the L/A it is directed either to path M/Even or S/Even and passes directly through the channel controlled gates disposed in those lines (the third pulse having energized the S-side of CH.3 and the fifth pulse having energized the S-side of CH.5). Instead of the sixth pulse being directed to CH.6, however, it is directed over either line 608 or 609 to the memory circuit (to be described below). The sixth pulse is also directed to a line 611 by either line 612 or 613. Line 611 leads to the memory control circuit the operation of which will be described below.

A path 614 off of transmission lines 514 and 516 directs all incoming pulses to a set control and memory release, SC/MR, circuit, the details of which will be disclosed below. Similarly a path 616 off of transmission lines 514 and 516 directs all incoming pulses to a discriminator which performs the important function of preventing spurious signals from causing erroneous operation of the translator. The details of the discriminator are also described below.

The overall operation of the input section of the receive portion of the translator is to gather and tentatively retain the pulses which comprise a single code character and are transmitted in serial form over transmission lines. When all of the pulses have been received by the translator they can then be transferred simultaneously (thus in parallel form) to a memory section, thereby enabling input section to be available for the next code character even though the information contained in the previous code has not been entirely released from the translator. The particular logic of the channel controlled gates gives the present invention many advantages over presently known systems for the same or similar purposes.

As previously mentioned, it is often necessary to store a binary code character in the translator for a number of milliseconds after it has been received. In order to receive binary characters as fast as they may be transmitted, it becomes necessary to transfer a character from the input section to the memory section the instant all of the pulses of a given code have been received. In this way new information can be received by the input section while the memory section retains the previous information for the time required. Circuits for this purpose are described in U.S. Pat. No. 3,453,379. A detailed description of a preferred embodiment of the receive portion of the translator will follow with reference being made to FIGS. 29–32. The following description of the preferred embodiment of the receive portion of the translator includes several features important to the present invention which have not been described to this point, even in general terms. These features have not been described since a full understanding of their operation is best appreciated in the environment of the specific embodiment of the invention to be set out below.

Referring now to FIGS. 29–32, input signals are received over transmission lines 514 and 516 and directed through normally closed switches T/C5*a* and T/C4*a*. If the incoming signal is a space signal it travels over line 516 and through switch T/C4*a* to conductor 741 which is electrically joined to the base of a transistor 742. When the base of transistor 742 is pulsed, the transistor is biased into a conducting state which results in the base of a second transistor 743 seeing ground through a conductor 744 which is electrically joined to conductor 467 which leads to the negative side of source 462. When the base of transistor 743 sees ground, the transistor conducts and the positive voltage which is applied to the emitter of the transistor by conductor 746, which is connected to conductor 471, appears at the collector of the transistor and thus on a connecting conductor 747. Thus the results of a space signal on conductor 516 is a positive pulse on conductor 747.

If the incoming pulse is a mark signal, it is received on transmission line 514 which leads through switch T/C5*a* to a conductor 748 which includes a variable resistor 749 and a fixed resistor 751. The conductor 748 is electrically joined to the base of a transistor 752 and a signal received by the base of the transistor places the transistor in a conducting state. When transistor 752 conducts ground line 744 is seen by the base of a transistor 753 through transistor 752 whereby the transistor 753 conducts. When transistor 753 conducts, the positive voltage established on the emitter thereof by the conductor 746 appears on the collector of transistor 753 which is electrically connected to a conductor 754. Thus, a mark signal on conductor 514 results in a positive pulse on conductor 754.

The conductor 747 is electrically joined through an isolation diode 756 to the common side of a form C-switch L/AY5 having a normally closed side L/AY5*a* and a normally open side L/AY5*b*. Depending on which side of the L/AY5 switch is closed (which is dependent on the condition of the Line Alternator, L/A) a pulse on conductor 747 will be directed to either the S/Odd line or the S/Even line. The conductor 754 is electrically joined through an isolation diode 757 to the common side of a form C-switch L/AY4 which comprises a normally closed side L/AY4*a* and a normally open side L/AY4*b*. A pulse on conductor 754 passes to either conductor M/Odd or M/Even depending on the side of the switch L/AY4 which is closed.

The Line Alternator L/A is in its normal state when the first pulse is received, and thus the first pulse is directed to either the M/Odd or the S/Odd conductor depending on which of incoming lines 514 or 516 it is received over.

Each of conductors 754 and 747 is electrically joined through an isolation diode to a conductor 758 which connects to the set line of the Line Alternator L/A. Thus as the first pulse is passing to either the M/Odd or the S/Odd line it is also operating to set the L/A so as to change the conditions of the switches L/AY4 and L/AY5. As previously described, the condition of the L/A does not change in response to a set pulse until the pulse terminates, and thus the first pulse is properly directed to either the M/Odd or the S/Odd line. Once the pulse has terminated, however, the L/AY4*b* switch closes as does the L/AY5*b* switch whereby the next pulse received is directed to either the M/Even or the S/Even line depending on whether it appears on conductor 754 or 747. The second pulse also passes over conductor 758 to the L/A but is directed to the reset portion thereof whereby at the termination of the second pulse, the L/A resets so that the third pulse is properly directed to either the M/Odd or the S/Odd conductors. In this way the L/A operates to direct input pulses in the manner necessary to establish in the input channels the same sequence of mark and space signals as that transmitted from the transmit typewriter.

The L/A is a good example of a subcircuit of the translator which operates as part of both the transmit and receive portions of the translator. As the detailed description of the receiver progresses it will be noticed that several other subcircuits operate as part of the transmit section of the translator and as part of the receive section of the translator. By providing a design which makes possible this duality of operation the preferred embodiment of the invention is capable of being manufactured at a relatively low cost and packaged in a relatively small housing.

If the first pulse is a mark signal, it is directed over the M/Odd conductor to the form C-switch S24 having a normally closed side S24*a* and a normally open side S24*b*. Since both sides of all of the channels are initially in their normal state, the first pulse will find the S24*a* side of switch S24 closed and will be directed over the conductor 759 to which the switch side S24*a* is electrically joined. The conductor 759 leads to the set line of CH.1 which results in both the M and the S side of CH.1 being set. If the first pulse is a space signal it is directed to the S/Odd line which leads to the form C-switch S25 which includes a normally closed side S25*a* and a normally open side S25*b*. The pulse will be directed through side S25*a* to the conductor 761 which is electrically joined to the direct line of CH.1 and which results in the S side only of CH.1 being set.

Thus, if the first pulse is a mark signal it results in CH.1 being conditioned to a mark state; if the first pulse is a space signal it results in CH.1 being conditioned to a space state.

As previously described, CH.1 responds to a set signal by setting on the leading edge of the pulse and not requiring the pulse to terminate before setting. Thus as soon as a pulse enters CH.1, it sets the S side thereof (whether it is received on conductor 761 or conductor 759) and any switches controlled by the S-side of CH.1 change their state. The switch associated with the S-side of CH.1 which is of particular interest to the receive portion of the translator is switch S14 which is normally open. One side of switch S14 is electrically joined to a normally open switch D1 and the other side of the switch is electrically joined through a resistor 762 to the base of a transistor 763. The emitter of transistor 763 is electrically joined to the conductor 469 which leads to the positive terminal of the voltage supply 462 while the collector of the transistor is electrically joined to the main latch line 486. When the base of transistor 763 is able to see ground the transistor conducts and the main latch line is connected to the conductor 469 through the transistor. As long as transistor 763 is conducting, the main latch line is in communication with the positive side of the source of potential and furnishes voltage to the various latch lines associated with the several channels. The switch D1 is electrically joined to conductor 764 which in turn is electrically joined to the conductor 467 which leads to the negative terminal of the voltage supply 462 via conductor 468. Thus the base of transistor 763 will see ground when switch S14 and switch D1 are both closed. As previously mentioned above, the switch S14 closes in response to the leading edge of the first pulse. The switch D1 is normally open and closes when a discriminator coil D is energized.

The discriminator coil D forms part of a transient signal discriminator provided to prevent transient signals from introducing errors in the system and to reset the channels in case less than a full code character is received. This is of importance because, without the resetting feature, a code containing either more or less pulses than proper would leave the energized channels latched so that the next proper incoming code would drive the improper code out of the system but would, itself, end in an improper position in the translator, then followed by the same events with relation to the next code, and so on.

The other portion of the discriminator is formed by a capacitor 766 which is joined in electrical parallel with coil D. The conductors 754 and 747 are electrically joined through isolation diodes to a conductor 767 which is electrically joined to the junction between the coil D and the capacitor 766. The capacitor 766 is selected to lose its charge after approximately 4 ms. When charged, the capacitor maintains a voltage across the coil D for the 4 ms. required for the capacitor to discharge. At the end of 4 ms. time the voltage across the coil is removed and the coil is deenergized. Thus the effect of a transient signal or improper code received by the system is the setting of one or more channels and a temporary communication between conductor 469 and main latch line 486. 4 ms. after the transient signal or improper code terminates, the coil D is deenergized and switch D1, which is normally open and only closes when coil D is energized, opens. This disconnects the base of transistor 763 from ground and operates to place the transistor 763 in a nonconducting state. In this way the source of potential from line 469 is removed from main latch line 486. Thus while the S-side of CH.1 will set in response to a transient signal it will not be able to remain latched for more than 4 ms. after which time it will be released.

Since the time between pulses of a character code is less than 4 ms. the capacitor 766 is recharged before the coil D is deenergized and thus the switch D1 remains closed for the entire duration of the code.

The operation of the transient discriminator circuit is extremely important in that it prevents the possible loss of an entire message. If a transient signal is able to set CH.1 and the channel remains set, the next code received by the system will have each of its pulse signals directed to the wrong channel and thus a completely erroneous code will be received. Further, since the input section of the receive portion of the translator is capable of receiving a new code almost the instant the sixth pulse of the previous code has terminated, the extra pulse created by the erroneous first transient pulse will be carried over to the next incoming code and cause it to present an erroneous pattern in the channels of the receiver. Thus the discriminator circuit operates to prevent more than the loss of only a single character.

The conductors 754 and 747 are electrically joined through isolation diodes to a conductor 768 which leads to the base of a transistor 769 through a resistor 771. The conductor 768 is also joined to a capacitor 772 which is in parallel with the resistor 771 while charging and in series while discharging and is electrically joined to conductor 464 which is joined to the conductor 466 which leads to the ground terminal of the voltage source 462. The capacitor 772 is selected to hold a charge for approximately 100 ms. As long as capacitor 772 is charged, the base of transistor 769 will be properly biased to place the transistor in a conducting state whereby current will flow through the collector of the transistor to the emitter which leads to ground via conductor 773, conductor 464, and conductor 466. The conductor of transistor 769 is electrically joined to one end of the coil SC/MR, the other end of which is electrically joined to the conductor 469 which carries a positive potential. Thus when the transistor 769 is conducting the coil SC/MR will lead to ground and be energized. The energization of coil SC/MR results in the form C-switch SC/MR1 being changed from its normal state to its energized state. The switch SC/MR1 includes a normally open side SC/MR1*a* and a normally closed side SC/MR1*b*. In the description of the transmit portion of the translator, the conductor 463 was shown as leading to ground through switch 1st BLX1 and switch SC/MR1*b*. It is this ground path which enables the base of the various T-transistors to see ground for purposes of biasing the transistors to a conduction state. The energization of coil SC/MR identifies to the circuit that it is going to receive information. In order to prevent a transmit operation from interfering with the receive operation, the switch SC/MR1*b* is open to effectively disconnect the line 463 from ground. In this way the channels which are employed both to receive and transmit information are available only to receive and are not affected by an attempt to transmit information during a receive operation.

The second pulse received is directed to either the M/Even or the S/Even line and encounters either switch S34 or S35, respectively. If the pulse is a mark signal it passes through switch side S34*a* to the set line of CH.2 with both the mark and the space side of the channel being set. If the signal is a space signal it will travel through switch side S35*a* to the direct line of CH.2 resulting in the space side only of the channel being set. The second pulse, like the first pulse, and like each of the pulses to follow, travels over conductor 767 to the discriminator to prevent the switch D1 from opening, travels over conductor 758 to the L/A to induce it to change its state after the pulse terminates, and travels over conductor 768 to the base circuit of the transistor 769 to keep the coil SC/MR energized.

The third pulse will be directed to either the M/Odd or the S/Odd line and will encounter either switch S24 or S25. Since the S-side of CH.2 was set by the second pulse the switch side S24*b* will be closed as will be the switch side S25*b*. Thus if the pulse is a mark signal and is directed over conductor M/Odd it will travel through switch side S24*b* to switch S44. If the pulse represents a space signal and travels on the S/Odd line it will pass through switch side S25*b* to the switch S45.

By having all of the channels in their normal states at the start of a receive operation, and successively setting the channels to a mark or space condition, and further by having the *n*th pulse directed to the *n*th channel through a switch controlled by the *n*+1 channel, it is possible to limit the number of necessary conductors to four. This number of conductors does not increase if the number of channels is increased since the basic logic of the system is not affected by the number of channels. As each pulse enters the system it is directed to the first channel which has not yet had its S-side set. Thus the fourth pulse is directed to CH.4 through either switch S54 or S55 and induces the channel to assume either a mark or a space condition depending on whether the signal is received on the M/Even line or S/Even line. If the fifth pulse is a mark signal it travels on the M/Odd line through normally open side S24*b* and through normally open side S44*b* to the set line of CH.5 resulting in both the mark and the space sides of that channel setting. If the fifth pulse is a space signal it travels over conductor S/Odd through normally open side S25*b* and normally open side S45*b* to the direct line of CH.5 resulting in the S-side only of CH.5 being set.

It is necessary to temporarily store the pulses as they enter the system so that they exit together at the same time for simultaneous transmission. The instant the sixth (last) pulse enters the system, all of the necessary information has been received to create the necessary parallel signal. Since the sixth pulse is the last pulse, it is not necessary to wait for any further pulses and the storage of the sixth pulse in an input channel is thus unnecessary. It is necessary, however, to store the entire parallel signal for a sufficient period of time to enable the receive typewriter to properly complete the cycle called for by the particular code formed by the pulses. During the time in which the parallel signal is being stored it may be necessary to start receiving the next signal and thus the input section of the receiver formed by the five channels must be available to receive pulses even though the previously received information is still being employed by the typewriter. Thus, once the sixth pulse enters the system and can be identified as either a space signal or a mark signal all of the pulses must be transferred to a memory section and the input section must be cleared preparatory to receiving a new set of code pulses.

Accordingly, the sixth pulse which travels over either the M/Even or S/Even conductor is not directed to a CH.6 but instead is directed to several different parts of the translator for effecting the desired operation outlined above.

In instances where the system is to be used only for one-way transmission then only those components required for transmit operations should be included in the transmit translator and typewriter, and only those components required for receive operations should be included in the receive translator and typewriter. This application is attractive in widespread news and weather transmission.

I claim:

1. A circuit for converting a synchronous group of mark and space form signal bits into a corresponding sequence of serial signal bits for transmission through means which utilizes fewer conducting paths than the number of bits in said group, comprising:

a plurality of bit storage means each having a separate input for receiving a separate one of said bits of said synchronous group, each of said storage means having a first portion coupled to said input thereof and which is a circuit of the form that has one state when a mark bit is received and has an alternate state when a space bit is received, each of said storage means having a second portion which is a bistable circuit of the form that may be set to one state in response to a set signal and may be reset to an alternate state in response to a reset signal, input means for directing each bit of said synchronous group to said input of a separate one of said storage means and for concurrently transmitting a set signal to said second portion of each of said storage means, a clock pulse source for generating a sequence of clock pulses, output means coupled between said clock pulse source and said transmission means for transmitting signal bits to said transmission means in response to said clock pulses, said output means having means for establishing a first state at which a mark bit is transmitted in response to a clock pulse and for establishing an alternate state at which a space bit is transmitted in response to a clock pulse and having a control for switching said output means between said states thereof in response to control signals, and, control signal conditioning means coupled to said clock pulse source to receive clock pulses therefrom and being coupled to said output means control to apply said control signals thereto and being coupled to said plurality of bit storage means for conditioning said output means to transmit a mark bit in response to a clock pulse if a set one of said storage means is storing a mark signal and for conditioning said output means to transmit a space bit if said one storage means is storing a space bit and for resetting said one of said storage means and for similarly conditioning said output means in response to each succeeding clock pulse in accordance with the bit stored in successive set ones of said plurality of storage means.

2. A circuit as defined in claim 1 wherein said control signal conditioning means comprises a first plurality of gate means each being controlled by a separate one of said storage means and each having an input which is coupled to an output thereof when the associated one of said storage means is storing one form of bit and which is decoupled from said output thereof when said associated storage means is storing the other form of bit, said outputs of each of said first plurality of gate means being coupled to said control of said output means for transmitting said control signals thereto, and means for directing successive ones of said clock pulses to successive ones of said inputs of said first plurality of gate means.

3. A circuit as defined in claim 2 wherein said means for directing successive ones of said clock pulses to successive ones of said first plurality of gate means comprises a second plurality of gate means each being controlled by a separate one of said storage means and each having an input and first and second outputs wherein said input is coupled to said first output when the associated storage means is set and is coupled to said second output when the associated storage means is reset, means coupling said first output of each of said second plurality of gate means to said input of a succeeding one of said first plurality of gate means and coupling said second output of each of said second plurality of gate means to said input of a succeeding one of said second plurality of gate means, means for transmitting clock pulses to said input of a first of said second plurality of gate means, and means for resetting each of said storage means following passage of a clock pulse to said first output of the one of said second plurality of gate means associated therewith.

4. A circuit as defined in claim 3 wherein said resetting means comprises conductive means connecting said first output of each of said second plurality of gate means with the reset signal input of the one of said storage means which controls the preceding one of said second plurality of gate means, and wherein said means for transmitting clock pulses comprises line alternator means connected between said clock pulse source and said inputs of a first and second of said second plurality of gate means for transmitting alternate clock pulses to said first thereof and for transmitting the intervening clock pulses to said second thereof, and wherein said second output of said first of said second plurality of gate means is connected to the input of the third thereof and said second output of the second thereof is connected to the input of the fourth thereof.

5. A circuit as defined in claim 1 wherein said of said bit storage means is a circuit element of the form having a latch signal terminal and means connected thereto for holding said first and second portions of said bit storage means in the existing state when a latch signal is supplied to said terminal, said circuit further comprising a latch means having an output coupled to said latch signal terminals of each of said bit storage means for transmitting said latch signal to each thereof in response to a predetermined one of said sequence of clock pulses, and means for deactivating said latch means following conversion of said group of signal bits into serial form.

6. A translator circuit for converting a parallel form binary code character defined by six mark-space signal bits into a corresponding code character in serial form, said parallel form code character being generated from a typewriter to identify a typewriter operation, comprising:

six bit-storage devices, each of said devices excepting the first thereof having a separate input for receiving and temporarily storing a separate one of said parallel form signal bits, the first to fourth of said storage devices also having a bistable circuit element of the form which may be set to a first state by a set signal and which may be reset to an alternate state by a reset signal, input means having a conductor for receiving a first of said parallel form signal bits and having a plurality of additional conductors for separately transmitting the second to sixth of said parallel form signal bits to said inputs of the second to sixth of said storage devices and having a set signal conductor for transmitting said set signal to said bistable elements of the first to fourth of said storage devices upon receipt of said parallel form code character from said typewriter, a clock pulse source for producing a sequence of at least six pulses in response to a control signal, said source having a clock pulse output and having a control signal input coupled to said input means for initiating a sequence of said clock pulses upon receipt of said parallel form code character at said input means, output means, having an input coupled to said output of said clock pulse source, for transmitting said serial form code character in response to said sequence of clock pulses, said output means being a circuit element which may be switched between one state at which a mark bit signal is transmitted in response to a clock pulse and an alternate state at which a space bit is transmitted in response to a clock pulse and having control means for switching said output means between said states in response to control signals, next bit interpreter means having an output coupled to said control means of said output means for switching said output means between said states thereof, said next bit interpreter means being a bistable circuit which may be set to cause said output means to transmit a mark bit in response to the next clock pulse and which may be reset to cause said output means to transmit a space bit in response to the next clock pulse, said next bit interpreter means having input means for receiving set and reset signals, five first gate means each having a pulse input and a first output coupled to said input means of said next bit interpreter means for transmitting a signal thereto to set said next bit interpreter and having a second output coupled to said input means of said next bit interpreter for transmitting a signal thereto to reset said next bit interpreter, each of said five first gate means being controlled by a separate one of the second to sixth of said storage devices for transmitting a clock pulse from the input to the first output when the controlling storage device is storing a mark bit and for transmitting said clock pulse to the second output when the controlling storage device is storing a space bit, four second gate means each having a pulse input and a first and a second output and each being controlled by a separate one of the first four of said storage devices, each of said second gate means having means for coupling the input thereof to the first output thereof when the controlling storage device is set and for coupling said input thereof to the second output thereof when the controlling storage device is reset, conductor means coupling the first output of each one of said second gate means with the input of the one of said first gate means which is controlled by the storage device next subsequent to the storage device controlling said one second gate means, conductor means coupling the second output of the first of said second gate means to the input of the one of said first gate means which is controlled by the third storage device, and coupling the second output of the second of the second of the second gate means to the input of the one of the first gate means which is controlled by the fourth storage device, and coupling the second output of the third of said second gate means to the input of the one of said first gate means which is controlled by the sixth of said storage devices, and coupling the second output of the fourth of said second gate means to the input of the one of the first gate means which is controlled by the fifth of said storage devices, means connected between said gate means and said storage devices for resetting each of said first to fourth storage devices following the initial passage of a clock pulse through the one of said second gate means which is controlled thereby, and line alternator means connected between said clock pulse output and the first and second of said second gate means for alternately directing said clock pulses to said input of the first and second of said second gate means.

7. A circuit for converting a serial sequence of mark-space form signal bits into a corresponding parallel group of synchronous signal bits comprising:

a plurality of bit storage means each having a first and a second portion with each portion being a circuit element of the form which has a normal state and which assumes an alternate state in response to a set pulse, each of said bit storage means having a first input for transmitting a set pulse to at least said first portion thereof and having a second input for transmitting a set pulse to said second portion thereof, receiving means for receiving said serial sequence of signal bits and for transmitting pulses in response thereto and a plurality of gate means connected between said receiving means and said storage devices, each of said gate means having means for directing a pulse to said first input of a separate one of said storage devices if said pulse corresponds to a mark bit and for directing said pulse to said second input of said one storage means if said pulse corresponds to a space bit, and having means for directing said pulse to a subsequent one of said gate means if at least one portion of an associated one of said storage devices is set.

8. A circuit as defined in claim 7 wherein each of said gate means comprises a mark gate having an input and having a first output coupled to said first input of said separate one of said storage devices and having a second output coupled to the input of a succeeding one of the mark gates, a space gate having an input and having a first output coupled to said second input of the mark gates, a space gate having an input and having a first output coupled to said second input of said separate one of said storage devices and a second output coupled to the input of a succeeding one of the space gates, said gate means having a normal condition at which said inputs of said mark and space gates are coupled to said first outputs thereof and being switchable to an alternate condition at which said inputs are coupled to said second outputs thereof, and means for switching said mark and space gates from said normal condition to said alternate condition when either of said portions of said associated storage device is set, and wherein said receiving means further comprises means for directing said pulses corresponding to a mark bit to said input of the mark gate of the first of said gate means and for directing said pulses corresponding to a space bit to said input of the space gate of the first of said gate means.

9. A circuit as defined in claim 8 wherein said second outputs of said mark and space gates of a first of said gate means are coupled to the inputs of the mark and space gates of the third of said gate means and the second outputs of the mark and space gates of the second of said gate means are coupled to the inputs of the mark and space gates of the fourth of said gate means, and wherein said receiving means has a line alternator means for transmitting odd numbered ones of said pulses to said first gate means and for transmitting even numbered ones of said pulses to said second gate means.

10. A circuit as defined in claim 7 wherein said means at said gate means for directing said pulses to said inputs of a separate one of said storage devices is connected between each of said gate means and the inputs of the storage device associated with the preceding one of said gate means.

11. A circuit as defined in claim 7 wherein said first input of each of said storage devices is branched to transmit said set pulses to each of said portions thereof and wherein said second input of each of said storage devices transmits said set pulses only to said second portions thereof whereby said storage device stores a mark bit when both of said portions thereof are set and stores a space bit when only said second portion thereof is set, and wherein said one of said gate means associated with each of said storage devices is controlled by said second portion thereof whereby said gate means switches condition when either form of bit is stored in said storage device.

12. A circuit for converting a serial sequence of mark-space form signal bits into a corresponding parallel group of synchronous signal bits comprising:

a plurality of bit storage means forming a sequence thereof each having first and second portions with each portion being a circuit element of the form which has a normal reset state and which assumes an alternate set state in response to a set pulse, each of said storage means having a first input for transmitting a set pulse to both of said portions and having a second input for transmitting a set pulse to said second portion only, line alternator means having an input for receiving said serial sequence of signal bits and having four outputs, said line alternator means having means for transmitting a pulse to a first of said outputs when a mark bit is received which is an odd numbered bit in said sequence thereof and for transmitting a pulse to a second of said outputs when a space bit is received which is an odd numbered bit in said sequence thereof and for transmitting a pulse to a third of said outputs when a mark bit is received which is an even numbered bit in said sequence thereof and for transmitting a pulse to the fourth of said outputs when a space bit is received which is an even numbered bit in said sequence, and a plurality of switching gates each having an input and a first and second output and having a normal condition at which said input is coupled to said first output and an operated condition at which said input is coupled to said second output, a separate pair of said gates being controlled by an associated separate one of each of said storage devices with the exception of the first of said storage devices and having means for operating each pair of gates when said second portion of said associated storage device is set, each of said pairs of gates including a mark gate and a space gate, said first output of each of said mark gates being connected to said first input of the one of said storage devices which precedes the storage device that controls said mark gate and said first output of each of said space gates being connected to the second input of said preceding storage device, the input of the mark gate controlled by the second storage device being connected to said first output of said line alternator means, the input of the space gate controlled by said second storage device being connected to said second output of said line alternators means, the input of the mark gate controlled by the third of said storage devices being connected to said third output of said line alternator means, and the input of the space gate controlled by said third storage device being connected to said fourth output of said line alternator means, pulse conductor means connecting said second output of each particular one of said mark and space gates with the input of the corresponding gate that is connected to an input of the storage device that follows the storage device which operates said particular gate, with the exception of the gates operated by the penultimate one of said storage devices and the gates operated by the one of said storage devices which precedes said penultimate one, and additional pulse conductor means connecting said second outputs of the mark and space gates controlled by said penultimate storage device with said first and second inputs respectively of the final one of said storage devices and connecting said second outputs of the mark and space gates controlled by said storage device preceding said penultimate one with said first and second inputs respectively of said penultimate one.

13. In a converter circuit wherein code characters defined by a plurality of mark-space signal bits which are processed in both sequential serial form and in synchronous parallel form are translated from one of said forms to the other, code character storage means comprising, a plurality of individual bit storage devices each having first and second portions with first and second pulse inputs respectively, each of said portions being a circuit element of the form which has a normal state and which is set to an alternate state upon receipt of a set pulse at said input thereof, input means coupled to said first and second inputs of each individual one of said bit storage devices for receiving an individual one of said signal bits and for directing a set pulse to both of said inputs of said individual one of said storage devices if said bit is a mark bit and for directing a set pulse only to said second input if said bit is a space bit, a plurality of gate means each having a normal condition and an alternate operated condition and having a pulse input which is coupled to a first pulse output at said normal condition and which is coupled to a second pulse output at said operated condition, and means coupling each of said gate means and said second portion of a separate individual one of said bit storage devices for operating said gate when said second portion of the associated individual one of said bit storage devices is set, whereby the condition of each of said gate means identifies the presence of either form of signal bit in said associated one of said storage devices enabling the direct transfer of signal bits between each one of said storage devices and dissimilar circuit components without progressively shifting said signal bits through others of said plurality of storage devices.

* * * * *

UNITED STATES PATENT OFFICE

CERTIFICATE OF CORRECTION

Patent No. 3,646,573 Dated February 29, 1972

Inventor(s) Lawrence Holmes, Jr.

It is certified that error appears in the above-identified patent and that said Letters Patent are hereby corrected as shown below:

Column 5, line 32, "considerably" should be --considerable--.

Column 13, line 46, "205" should be --206--.

Column 21, line 39, "travelling" should be --traveling--.

Column 27, line 26, "381" should be --383--.

Column 27, line 47, "38" should be --386--.

Column 33, line 23, "432" should be --452--.

Column 38, line 29, "314" should be --514--.

Column 39, line 68, "468" should be --488--.

Column 40, line 51, "jointed" should be --joined--.

Column 40, line 57, "interpose" should be --interposer--.

Column 41, line 62, "translator" should be --transistor--.

Column 52, line 3, (claim 5) "said" (first occurance) should be --each--.

Column 53, line 65-67, (claim 8), delete "of the mark gates, a space gate having an input and having a first output coupled to said second input".

Signed and sealed this 2nd day of January 1973.

(SEAL)
Attest:

EDWARD M. FLETCHER, JR.
Attesting Officer

ROBERT GOTTSCHALK
Commissioner of Patents